(12) United States Patent
Matsunaga et al.

(10) Patent No.: US 12,095,373 B2
(45) Date of Patent: Sep. 17, 2024

(54) POWER CONVERSION APPARATUS

(71) Applicants: DENSO CORPORATION, Kariya (JP); TOYOTA JIDOSHA KABUSHIKI KAISHA, Toyota (JP); MIRISE TECHNOLOGIES CORPORATION, Nisshin (JP)

(72) Inventors: Hideya Matsunaga, Nisshin (JP); Kouhei Shinomiya, Nisshin (JP)

(73) Assignees: DENSO CORPORATION, Kariya (JP); TOYOTA JIDOSHA KABUSHIKI KAISHA, Toyota (JP); MIRISE TECHNOLOGIES CORPORATION, Nisshin (JP)

( * ) Notice: Subject to any disclaimer, the term of this patent is extended or adjusted under 35 U.S.C. 154(b) by 128 days.

(21) Appl. No.: 17/680,745

(22) Filed: Feb. 25, 2022

(65) Prior Publication Data

US 2022/0278621 A1 Sep. 1, 2022

(30) Foreign Application Priority Data

Feb. 26, 2021 (JP) .................. 2021-030371
Feb. 26, 2021 (JP) .................. 2021-030372
(Continued)

(51) Int. Cl.
*H02P 27/08* (2006.01)
*H02M 1/00* (2006.01)
*H02M 1/08* (2006.01)
(Continued)

(52) U.S. Cl.
CPC ....... *H02M 3/1586* (2021.05); *H02M 1/0058* (2021.05); *H02M 1/08* (2013.01);
(Continued)

(58) Field of Classification Search
CPC .... H02M 3/1586; H02M 1/0058; H02M 1/08; H02M 7/53871; H02P 21/22; H02P 27/08; H02P 2201/11
See application file for complete search history.

(56) References Cited

U.S. PATENT DOCUMENTS 7,808,125 B1 * 10/2010 Sachdeva ............... H02M 7/49
363/55
9,812,984 B2 * 11/2017 Yoscovich ............... H02J 3/38
(Continued)

FOREIGN PATENT DOCUMENTS

| JP | 2009-194964 A | 8/2009 |
|----|---------------|--------|
| JP | 2009-219299 A | 9/2009 |
| JP | 2015-194448 A | 11/2015 |

*Primary Examiner* — Rina I Duda
(74) *Attorney, Agent, or Firm* — Oliff PLC

(57) ABSTRACT

In a power conversion apparatus, first to xth converters are connected in parallel to each other. A control unit outputs, based on command information related to an output of the power conversion apparatus, control information. A pulse generator selects, based on the control information, a number n of converters from the first to xth converters, n being an integer more than or equal to 2 and smaller than x. The number n is defined as a multiply-driven number n. The pulse generator generates, based on the control information, at least one multiple drive-pulse train that comprises n drive pulses for multiply driving the n selected converters. A variable determiner changes the multiply-driven number n.

7 Claims, 42 Drawing Sheets

(30) Foreign Application Priority Data

| | | |
|---|---|---|
| Feb. 26, 2021 | (JP) | 2021-030373 |
| Oct. 26, 2021 | (JP) | 2021-174810 |
| Oct. 26, 2021 | (JP) | 2021-174811 |
| Oct. 26, 2021 | (JP) | 2021-174812 |

(51) Int. Cl.
*H02M 3/158* (2006.01)
*H02M 7/5387* (2007.01)
*H02P 21/22* (2016.01)

(52) U.S. Cl.
CPC ........ *H02M 7/53871* (2013.01); *H02P 21/22* (2016.02); *H02P 27/08* (2013.01); *H02P 2201/11* (2013.01)

(56) References Cited

U.S. PATENT DOCUMENTS

| | | | |
|---|---|---|---|
| 10,115,841 B2* | 10/2018 | Adest | H01L 31/02021 |
| 2009/0200970 A1 | 8/2009 | Kimura | |
| 2009/0230899 A1 | 9/2009 | Arimura et al. | |
| 2014/0226377 A1* | 8/2014 | Goetz | H02M 3/1582 363/65 |
| 2015/0145462 A1* | 5/2015 | Ulrich | H02M 5/458 363/37 |
| 2015/0276919 A1 | 10/2015 | Matsumura | |
| 2015/0364982 A1* | 12/2015 | Chae | H02M 3/157 323/299 |
| 2016/0301348 A1* | 10/2016 | Mao | H02K 3/28 |

* cited by examiner

RECALCULATION OF PHASE DIFFERENCE IS NEEDED

SECOND, FOURTH SELECTED CONVERTERS ARE NOT DRIVEN

RECALCULATION OF PHASE DIFFERENCE IS UNNEEDED

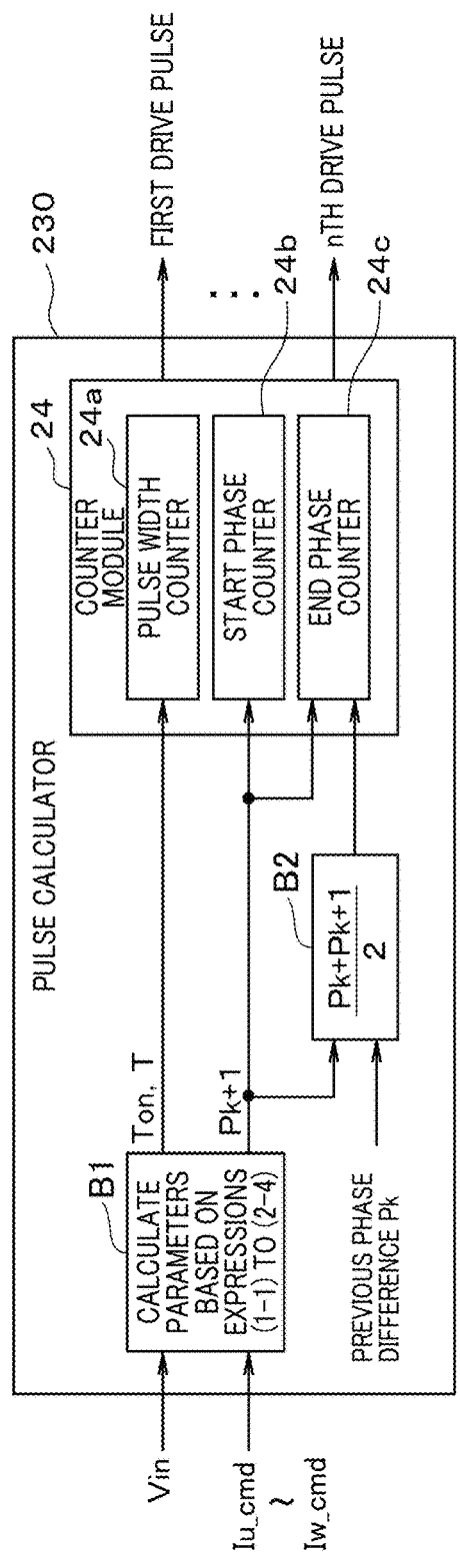
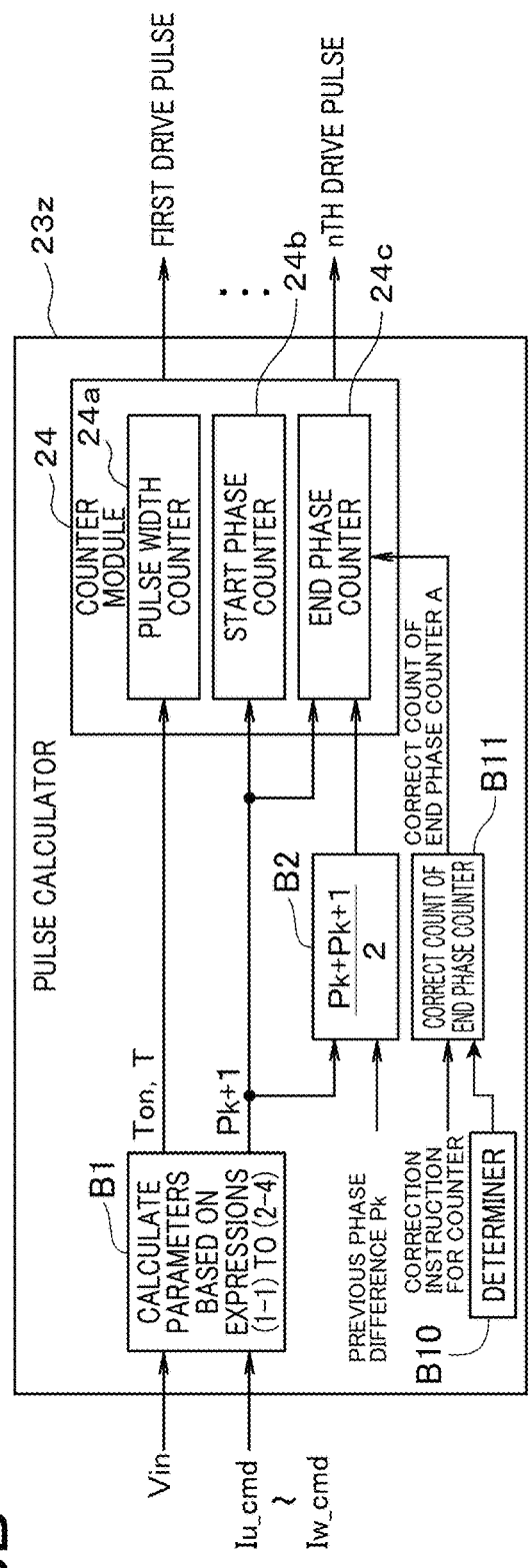
FIG.28A
FIG.28B

POWER CONVERSION APPARATUS

CROSS-REFERENCE TO RELATED APPLICATION

This application is based on and claims the benefit of priority from each of
1. Earlier Japanese Patent Applications No. 2021-30371, 2021-30372, and 2021-30373 filed on Feb. 26, 2021
2. Earlier Japanese Patent Applications No. 2021-174810, 2021-174811, and 2021-174812 filed on Oct. 26, 2021

The description of each of these earlier Japanese Patent Applications is incorporated herein by reference.

TECHNICAL FIELD

The present disclosure relates to power conversion apparatuses.

BACKGROUND

Known power conversion apparatuses supply power to a permanent-magnet synchronous motor serving as a power source of, for example, a hybrid vehicle. Such a known power conversion apparatus includes multi-phase converters.

SUMMARY

A power conversion apparatus according to an aspect of the present disclosure includes first to xth converters connected in parallel to each other. x being an integer more than or equal to 2. The power conversion apparatus includes a pulse generator. The pulse generator is configured to
1. Select a number n of converters from the first to xth converters, n being an integer more than or equal to 2 and smaller than x, the number n being defined as a multiply-driven number n
2. Generate at least one multiple drive-pulse train that comprises n drive pulses for multiply driving the n selected converters The power conversion apparatus includes a variable determiner configured to variably determine the multiply-driven number n.

BRIEF DESCRIPTION OF THE DRAWINGS

Other aspects of the present disclosure will become apparent from the following description of embodiments with reference to the accompanying drawings in which:

FIG. 28A is a block diagram of the pulse calculator according to the fourth embodiment as a comparative example for the second modification;

FIG. 28B is a block diagram of a pulse calculator according to the second modification;

DETAILED DESCRIPTION OF EMBODIMENTS

Figure 1:
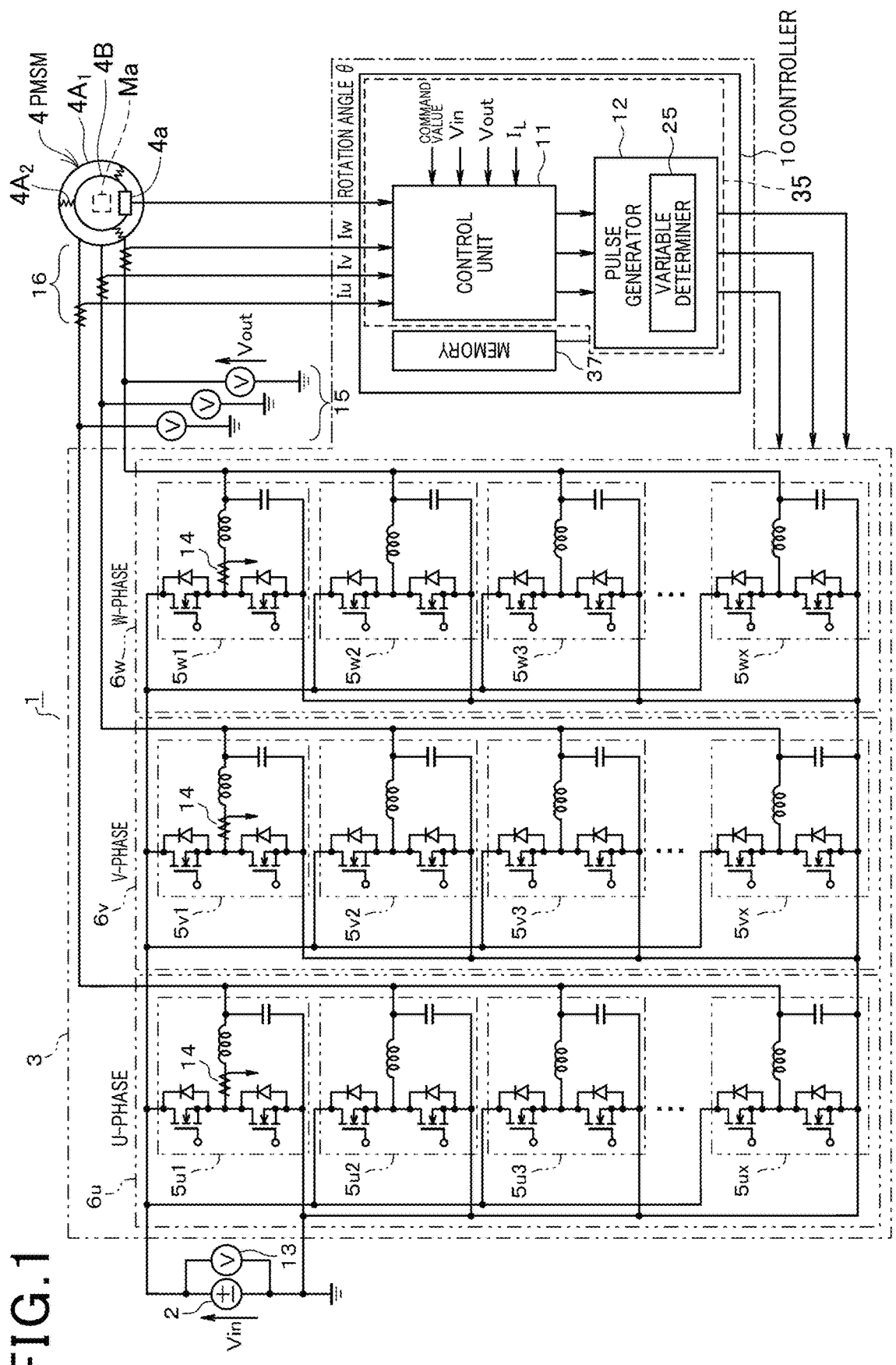
FIG. 1 is a circuit block diagram schematically illustrating an example of the overall configuration of a drive system according to the first embodiment of the present disclosure.

Japanese Patent Application Publications No. 2009-219299 and 2009-194964, which will be referred to as first and second patent publications, disclose a power conversion apparatus for supplying power to a permanent-magnet synchronous motor serving as a power source of, for example, a hybrid vehicle.

Specifically, the power conversion apparatus disclosed in the first patent publication is comprised of multi-phase converters connected to the respective phase windings of a permanent-magnet synchronous motor.

Each of the multiphase converters for the corresponding phase disclosed in the first patent publication is comprised of a controller and plural converters connected in parallel to one another, and the controller periodically applies, in accordance with pseudo-sinusoidal command current values, drive pulses to the respective converters while changing phases of the respective drive pulses to thereby output a corresponding-phase sinusoidal voltage. This aims to reduce ripples on an output current from each of the multiphase converters.

The second patent publication discloses a method of controlling the width of each drive pulse to be applied to a power converter using (i) feedback control of command current values based on corresponding actual current values flowing in a permanent-magnet synchronous motor, and (ii) feedforward control of the command current values.

An increase in the number of converters connected in parallel to one another for each of the multiphase converters disclosed in the first patent publication enables the magnitude of the ripples on the corresponding-phase output current to be lowered. The increased number of converters connected in parallel to one another for each of the multiphase converters may cause the period of the drive pulses to be shorter as the absolute sinusoidal command current values become lower, resulting in the width of each of the drive pulses for driving the parallelly-connected converters being narrower.

The narrower of the width of each of the drive pulses for driving the parallelly-connected converters, i.e., multiple converters, may make it harder for the controller to apply the drive pulses to the respective parallelly-connected converters properly. This may result in the waveform of the output current generated by the parallelly-connected converters being distorted, causing an increase in noise.

In addition, the method of controlling the width of each drive pulse to be applied to the power converter disclosed in the second patent publication needs the feedback control and the feedforward control, making the control system for the power converter complicated. If the method disclosed in the second patent publication is applied to a method of controlling each of the parallelly-connected converters disclosed in the first patent publication, this application may result in a degree of the complexity of the control system for the power converter being greater as the number of drive pulses to be applied to the parallelly-connected converters is larger.

No correction of the width of each drive pulse to be applied to the power converter would result in the output current generated by the power converter being distorted, causing an increase in noise.

In view of the circumstances set forth above, the present disclosure seeks to provide power conversion apparatuses, each of which is capable of reducing distortion in an output current of the corresponding one of the power conversion apparatuses with simpler control configuration and/or smaller computational burden even if, for example, an absolute command current value is low.

A first exemplary measure of the present disclosure provides a power conversion apparatus that includes first to xth converters connected in parallel to each other, x being an integer more than or equal to 2, a control unit configured to output, based on command information related to an output of the power conversion apparatus, control information, and a pulse generator. The pulse generator is configured to:
1. Select, based on the control information, a number n of converters from the first to xth converters, n being an integer more than or equal to 2 and smaller than x, the number n being defined as a multiply-driven number n
2. Generate, based on the control information, at least one multiple drive-pulse train that comprises n drive pulses for multiply driving the n selected converters The power conversion apparatus includes a variable determiner configured to variably determine the multiply-driven number n.

Variably determining the multiply-driven number n enables reduction in the multiply-driven number n to thereby maintain a sufficient width of each drive pulse even if a command current value as the command information is a relatively low value. This therefore makes it possible to output the drive pulses to the respective selected converter accurately, thus reducing a degree of distortion on an output-current waveform of the power conversion apparatus.

A second exemplary measure of the present disclosure provides a power conversion apparatus. The power conversion apparatus includes first to xth converters connected in parallel to each other, x being an integer more than or equal to 2. The power conversion apparatus includes a control unit configured to output, based on command information related to an output of the power conversion apparatus, control information. The power conversion apparatus includes a pulse generator configured to
1. Select, based on the control information, a number n of converters from the first to xth converters, n being an integer more than or equal to 2 and smaller than x, the number n being defined as a multiply-driven number n
2. Generate, based on the control information, a plurality of multiple drive-pulse trains, each of which comprises n drive pulses for multiply driving the n selected converters
3. Generate a multiple interpolation-pulse train comprising interpolation pulses that smoothly interpolate between at least one adjacent pair of the multiple drive-pulse trains A third exemplary measure of the present disclosure provides a motor driving apparatus. The motor driving apparatus includes at least one converter configured to generate an output for driving a motor, and a control unit configured to output, based on command information related to the output of the at least one converter, control information. The motor driving apparatus includes a pulse generator configured to generate, based on the control information, at least one drive pulse for driving the at least one converter, and a back-electromotive-force (BMF) corrector configured to correct a width of the drive pulse in accordance with a BMF voltage generated in the motor when the motor is driven.

This enables the BMF voltage of the motor to be installed in a sequence of correcting the width of the at least one drive pulse. This therefore reduces an adverse effect due to the BMF voltage from each phase current of the motor, enabling each phase current of the motor to have an ideal sinusoidal waveform without harmonic current distortion. This makes it possible for the motor driving apparatus to provide the motor with a higher degree of efficiency, a lower level of noise, and a higher level of electromagnetic compatibility (EMC).

The following describes embodiments of the present disclosure with reference to the accompanying drawings. In the embodiments, descriptions of like parts between the embodiments, to which like reference characters are assigned, are omitted or simplified to avoid redundant descriptions.

First Embodiment

The following describes a drive system 1 installable in a vehicle, such as a hybrid vehicle. Specifically, the drive system 1 includes a battery 2 serving as a power source, a three-phase inverter 3 as an example of a power conversion apparatus, and a three-phase permanent-magnet synchronous motor (PMSM) 4 as an example of a motor, which will be referred to simply as a motor 4.

As the battery 2, one of various types of batteries, such as a lithium-ion battery or a nickel-hydrogen battery can be used.

The motor 4 is comprised of, for example, a stator 4A and a rotor 4B having one or more permanent magnets Ma; the rotor 4B is coupled to, for example, a drive shaft of the hybrid vehicle. The stator 4A includes, for example, a stator core, and three-phase coils, i.e. U, V, and W-phase coils 4A 1. The rotor is configured to be rotatable relative to the stator core. The three-phase coils 4A1 are wound in and around the stator core. That is, the motor 4 is capable of rotating the rotor 4B based on magnetic interactions between a magnetic field generated by the one or more permanent magnets Ma of the rotor 4B and a rotating magnetic field generated by the three-phase coils 4A 1. Rotation of the rotor 4B of the motor 4 causes rotational power, i.e., torque, to be transferred to driving wheels of the hybrid vehicle.

Specifically, the three-phase inverter 3 according to the first embodiment is connected between the battery 2 and the motor 4, and configured to convert a direct-current (DC) voltage, i.e., an input voltage, $V_{in}$ outputted from the battery 2 and inputted to the three-phase inverter 3 into three-phase alternating-current (AC) voltages, and to apply the three-phase AC voltages to the three-phase coils 4A1, i.e., U-, V-, and W-phase coils 4A1, of the motor 4, thus rotatably driving the motor 4.

The three-phase inverter 3 includes multiphase converters 6u, 6v, and 6w for the respective three-phase coils 4A1 of the motor 4. The multiphase converter 6u for the U-phase is comprised of multiple x converters 5u connected in parallel to one another; x is a positive integer more than or equal to 2. Similarly, the multiphase converter 6v for the V-phase is comprised of multiple x converters 5v connected in parallel to one another, and the multiphase converter 6w for the W-phase is comprised of multiple x converters 5w connected in parallel to one another.

FIG. 1 shows the parallelly-connected converters 5u with respective subscripts 1, 2, ..., x. Similarly, FIG. 1 shows the parallelly-connected converters 5v with respective subscripts 1, 2, ..., n, and the parallelly-connected converters 5w with respective subscripts 1, 2, ..., x.

The following may simply describe one of or each of the converters 5u1 to 5ux, 5v1 to 5vx, and 5w1 to 5wx as a converter 5.

The three-phase inverter 3 includes a controller 10 for controlling each of the multiphase converters 6u, 6v, and 6w.

The following describes an example of how the controller 10 drives the parallelly-connected converters 5u1 to 5ux of the multiphase converter 6u as follows.

Specifically, the controller 10 is configured to
1. Perform selection of converters in the parallelly-connected converters 5u1 to 5ux of the multiphase converter 6u
2. Perform a multiple-drive sequence, i.e., a parallel-drive sequence, of the selected converters
3. Repeat the multiple drive of the selected converters at a predetermined period T while each adjacent pair of the selected converters in each of the multiple-drive sequences has a phase difference of Td, which is set to, for example, T/n, therebetween; n represents the number of converters 5 selected to be multiply driven The period T represents a total on-and-off duration of the upper- and lower-arm switches SW1 and SW2 of each selected converter such that the upper- and lower-arm switches SW1 and SW2 each selected converter are repeatedly driven at the period T.

This enables a total current It that flows through the selected converters to be shared as a value It/n by the respective selected converters. This also smooths currents outputted from the respective selected converters. The smoothed currents outputted from the respective selected converters are combined with one another, and thereafter a combined output current is applied to the motor 4. Combination of the smoothed currents outputted from the respective selected converters enables ripples on the respective smoothed currents to cancel out each other, making it possible for the multiphase converter 6u to output an output current having a desired waveform, such as a sinusoidal waveform, without distortion therein.

The controller 10 similarly drives the parallelly-connected converters 5v1 to 5vx of the multiphase converter 6v in the same procedure as the parallelly-connected converters 5u1 to 5ux of the multiphase converter 6u. Additionally, the controller 10 drives the parallelly-connected converters 5w1 to 5wx of the multiphase converter 6w in the same procedure as the parallelly-connected converters 5u1 to 5ux of the multiphase converter 6u.

Figure 3:
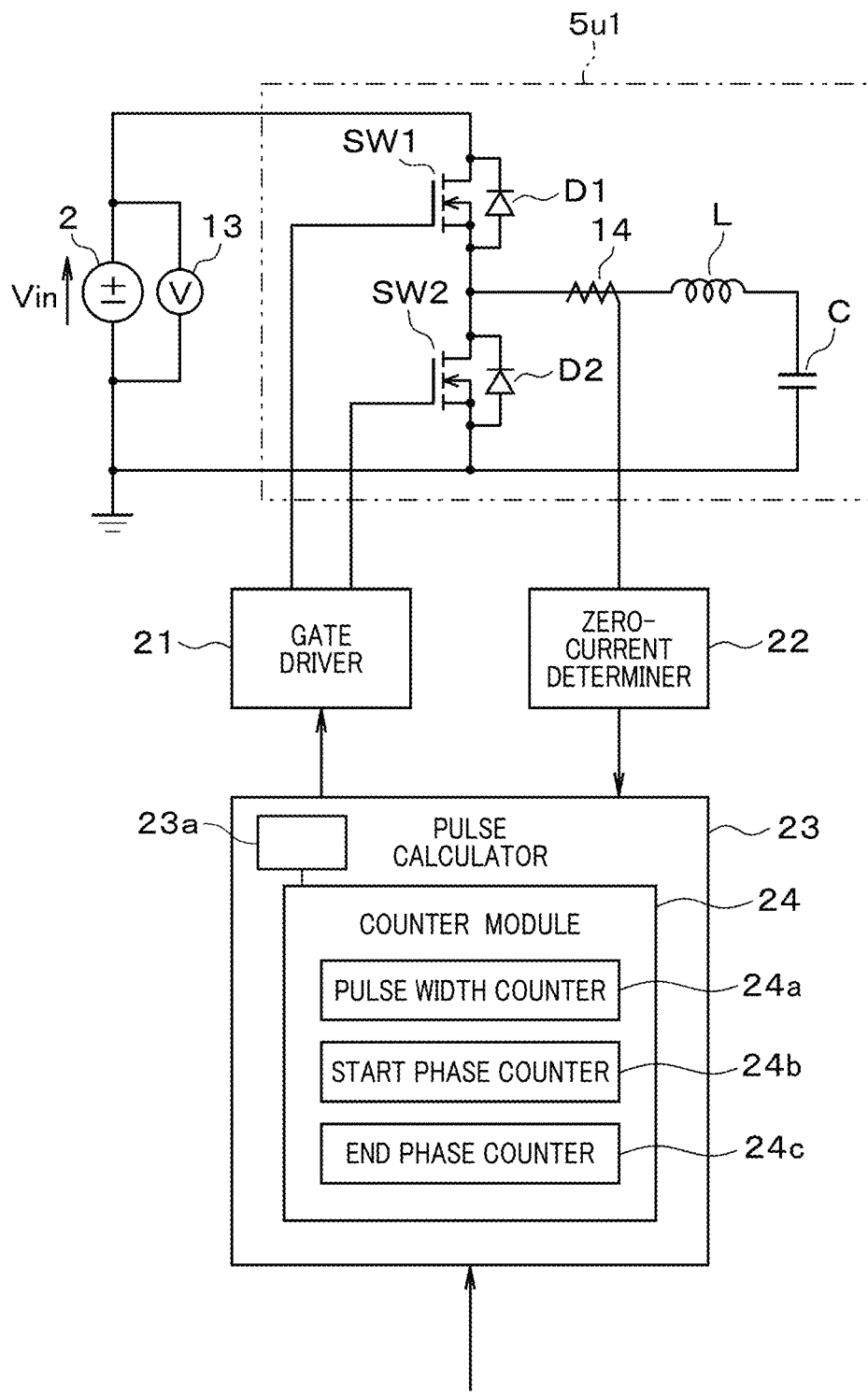
FIG. 3 is a circuit block diagram schematically illustrating a converter included in the multiphase converter and a functional configuration of the pulse generator illustrated in FIG. 2.

Each of the converters 5 is designed as, for example, a buck converter. Specifically, as illustrated in FIG. 3, each of the converters 5 is comprised of an upper-arm switch SW1, a lower-arm switch SW2, an inductor L, and a capacitor C. Each of the upper- and lower-arm switches SW1 and SW2 has first and second terminals and a control terminal. The first terminal of the upper-arm switch SW1 is connected to a positive terminal of the battery 2, and the second terminal of the upper-arm switch SW1 is connected to the first terminal of the lower-arm switch SW2. The second terminal of the lower-arm switch SW2 is connected to a negative terminal of the battery 2 via a common ground line.

The inductor L has opposing first and second ends, and the capacitor C has opposing first and second electrodes facing each other with an interval therebetween. The connection point between the upper- and lower-arm switches SW1 and SW2 is connected to the first end of the inductor L, and the second end of the inductor L is connected to the first electrode of the capacitor C. The second electrode of the capacitor C is connected to the negative terminal of the battery 2 via the common ground line.

Each of the upper- and lower-arm switches SW1 and SW2 is comprised of a power switch device, such as an N-channel power MOSFET, which is an example of power switch devices. That is, the first and second terminals of each of the upper- and lower-arm switches SW1 and SW2 serve as the respective drain and source of the corresponding one of the N-channel MOSFET, and the control terminal of each of the upper- and lower-arm switches SW1 and SW2 serves as the gate of the corresponding one of the N-channel power MOSFET.

Each of the converters 5 is comprised of flyback diodes D1 and D2. Each of the flyback diodes D1 and D2 is connected in antiparallel to the corresponding one of the upper- and lower-arm switches SW1 and SW2. Each of the flyback diodes D1 and D2 enables a load current to flow therethrough upon the corresponding one of the switches, in other words, power switches, SW1 and SW2 being turned off. The upper-arm switch SW1 and the flyback diode D1 constitute an upper-arm switch device, and the lower-arm switch SW2 and the flyback diode D2 constitute a lower-arm switch device.

The controller 10 of the three-phase inverter 3 is configured to perform various tasks for controlling each of the multiphase converters 6u, 6v, and 6w. For example, the controller 10 is comprised of a control processor 35 comprised of many cores, and a memory device 37 comprised of at least one volatile memory and at least one nonvolatile memory.

The memory device 37 stores various programs. At least one of the programs stored in the memory device 37 causes the control processor 35 to functionally serve as a control unit 11 and a pulse generator 12. In other words, the control processor 35 is programmed to functionally include the control unit 11 to perform one or more tasks allocated therefor, and include the pulse generator 12 to perform one or more tasks allocated therefor. That is, the memory device 37 serves as a nonvolatile storage medium in which various programs and data items can be stored.

The drive system 1 includes a voltage sensor 13 disposed across the battery 2. The voltage sensor 13 is configured to measure the input voltage $V_{in}$ outputted from the battery 2, and send, to the controller 10, the measured input voltage Via.

In particular, the converter 5u1 in the converters 5u1 to 5ux, which serves as a measuring converter for measuring a current, i.e., an inductor current $I_L$, flowing through the corresponding inductor L, will also be referred to as a primary converter 5u1. Similarly, the converter 5v1 in the converters 5v1 to 5vx, which serves as a measuring converter for measuring an inductor current $I_L$ flowing through the corresponding inductor L, will also be referred to as a primary converter 5v1, and the converter 5w1 in the converters 5w1 to 5wx, which serves as a measuring converter for measuring an inductor current $I_L$ flowing through the inductor L, will also be referred to as a primary converter 5w1.

For example, each of the remaining converters 5u2 to 5ux, 5v2 to 5vx, 5w2 to 5wx will also be referred to as a secondary converter.

The drive system 1 also includes current sensors 14, each of which is mounted on an electrically conductive path extending from the connection point between the upper- and lower-arm switches SW1 and SW2 to the first end of the inductor L of the corresponding one of the primary converters 5u1, 5v1, and 5w1. Each of the current sensors 14 is configured to measure the inductor current $I_L$ flowing through the inductor L of the corresponding one of the primary converters 5u1, 5v1, and 5w1, and send, to the control unit 11, the measured inductor current $I_L$.

The drive system 1 includes voltage sensors 15, each of which is electrically connected to a corresponding one of electrically conductive paths between the multiphase converters 6u, 6v, and 6w and the motor 4. Each of the voltage sensors 15 is configured to measure an output voltage $V_{out}$ across the capacitor C of the corresponding one of the multiphase converters 6u, 6v, and 6w, and send, to the control unit 11, the measured voltage $V_{out}$ across the capacitor C of the corresponding one of the multiphase converters 6u, 6v, and 6w.

To the controller 10, request torque is inputted. The request torque, which is for example generated by, for example, an electronic control unit (ECU) 500 installed in the hybrid vehicle, is required for the hybrid vehicle to move.

The control unit 11 is configured to calculate, for each phase of the motor 4, a command current value $I_O$ every predetermined update cycle in accordance with, for example, the request torque; the command current values $I_O$ for each phase of the motor 4 have a desired pseudo sinusoidal waveform with a predetermined AC frequency, i.e., a predetermined AC period. The command current values $I_O$ are an example of command information related to the output of the inverter 3.

The update cycle of the command current values $I_O$ is set to be sufficiently shorter than the predetermined AC period of the desired pseudo sinusoidal waveform of the command current. This enables each adjacent pair of the command current values $I_O$ whose waveform changes at the predetermined AC frequency to have a very short interval.

The control unit 11 is configured to output, for each phase of the motor 4, control information including the command current value $I_O$ every update cycle to the pulse generator 12.

The drive system 1 includes current sensors 16, each of which is mounted on a corresponding one of the electrically conductive paths between the respective multiphase converters 6u, 6v, and 6w and the motor 4. Each of the current sensors 16 is configured to measure a corresponding one of U-, V-, and W-phase phase currents Iu, Iv, and Iw that flow through the respective electrically conductive paths between the multiphase converters 6u, 6v, and 6w and the motor 4, and output the corresponding one of the measured U-, V-, and W-phase phase currents Iu, Iv, and Iw to the motor 4.

The drive system 1 further includes a rotational position sensor, such as a resolver, 4a provided in the motor 4. The rotational position sensor 4a is configured to measure a rotational position θ of the rotor 4B, i.e., the rotational position θ of the motor 4, and output the measured rotational position θ of the rotor 4B to the control unit 11. The control unit 11 is configured to calculate an angular velocity ω of the rotor 4B based on the rotation angle θ of the motor 4, i.e., the rotor 4B.

The input voltage $V_{in}$ measured by the voltage sensor 13, the output voltage $V_{out}$ for each phase of the motor 4, the U-, V-, and W-phase phase currents Iu, Iv, and Iw, and the angular velocity ω of the motor 4 are outputted from the control unit 11 to be inputted to the pulse generator 12 as feedback information.

The pulse generator 12 is configured to
1. Select converters 5 to be multiply driven in the (3×x) converters 5 included in the three-phase inverter 3 in accordance with, for example, the command current values Io for each phase of the motor 4 and/or a command rotational speed, i.e., a command RPM, for the motor 4; the command rotational speed is for example generated by, for example, the ECU 500 installed in the hybrid vehicle
2. Multiply drive the selected converters 5 in the (3×x) converters 5 in accordance with the feedback information inputted thereto The command RPM is an example of the command information related to the output of the inverter 3.

Figure 2:
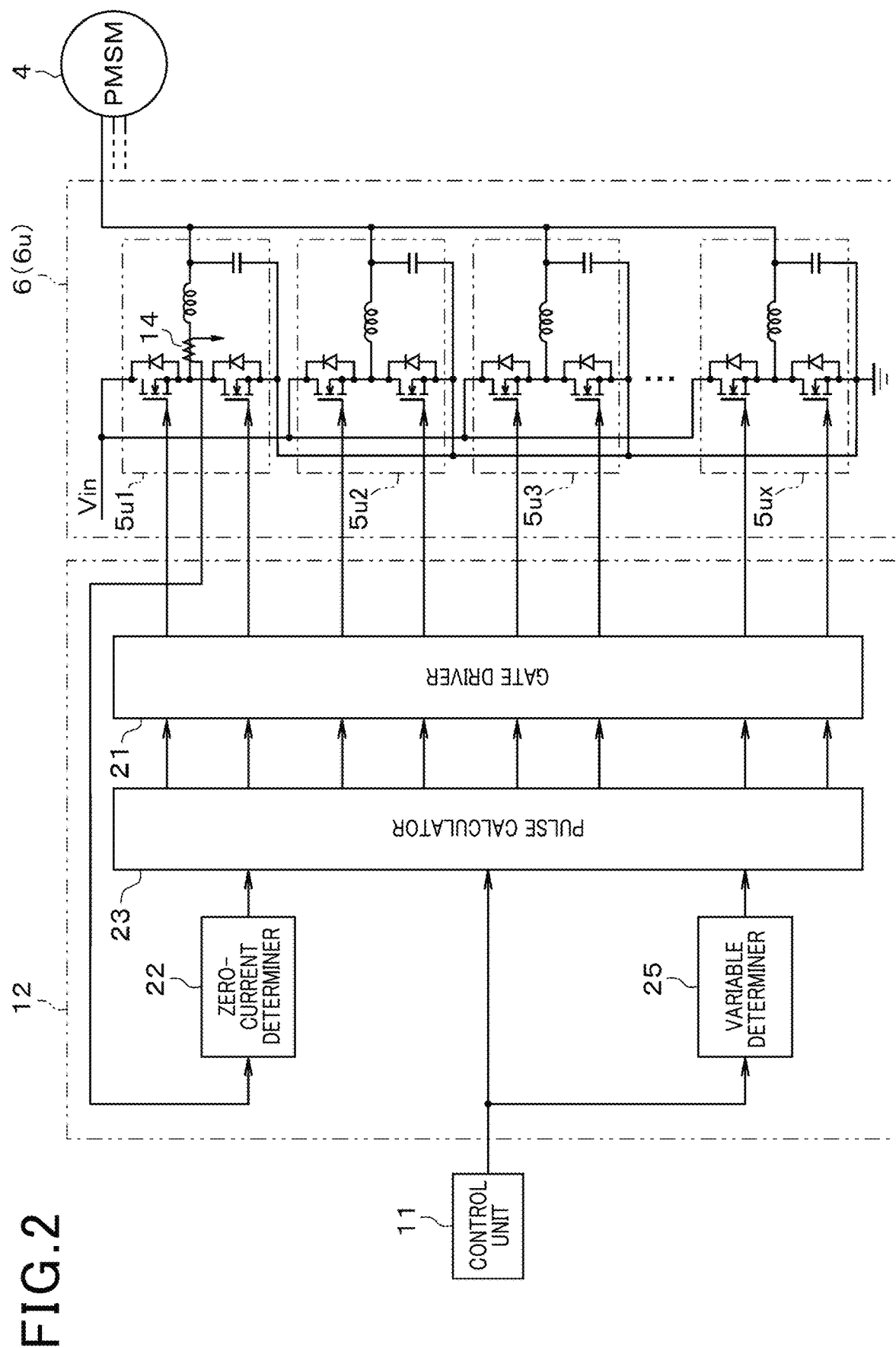
FIG. 2 is a circuit block diagram schematically illustrating a multiphase converter for the U-phase and a pulse generator illustrated in FIG. 1.

For example, the pulse generator 12 includes, as functionally illustrated in FIG. 2, a gate driver 21, a zero-current determiner 22, a pulse calculator 23, and a variable determiner 25. As illustrated in FIG. 3, the pulse calculator 23 includes a pulse controller 23a and a counter module 24 that includes, for example, a pulse width counter 24a, a start phase counter 24b, and an end phase counter 24c.

The variable determiner 25, which serves as, for example, a multiple-drive controller and is included in the pulse generator 12, is configured to variably determine, based on a present value of the command RPM and/or the command current values $I_O$ for each of the U-, V, and W-phases, the number n of converters 5 to be multiply driven in each of the multiphase converters 6u, 6v, and 6w; the number n of converters 5 to be multiply driven will be referred to as a multiply-driven number n.

The zero-current determiner 22 is configured to output, to the pulse calculator 23, zero-timing information each time of determining that the inductor current $I_L$ becomes zero.

The pulse calculator 23 is configured to
1. Select, based on the driven-number selection information received from the variable determiner 25, converters 5 to be driven in the parallelly-connected converters 5 of each of the multiphase converters 6u, 6v, and 6w
2. Analyze the feedback information about the input voltage $V_{in}$, the output voltage $V_{out}$ for each phase, each of the phase currents Iu, Iv, and Iw, and the angular velocity ω to thereby calculate, for each of the multiphase converters 6u, 6v, and 6w, values of the respective parameters for each multiphase (multiple) drive-pulse train that instructs the selected converters 5 in the parallelly-connected converters 5 of the corresponding one of the multiphase converters 6u, 6v, and 6w to operate in a boundary current mode.

For example, the parameters for each multiphase drive-pulse train include
(i) The period T that represents a total on-and-off duration of the upper- and lower-arm switches SW1 and SW2 of each selected converter such that the upper- and lower-arm switches SW1 and SW2 each selected converter are repeatedly driven at the period T
(ii) An on-duration $T_{on}$ and an off-duration $T_{off}$ of each of the upper- and lower-arm switches SW1 and SW2 during each period T
(iii) The phase difference $T_d$ between each adjacent pair of drive pulses in the multiphase drive-pulse train The boundary current mode for each converter 5 represents an operation mode including a necessary condition where an off-state switch, which is one of the switches SW1 and SW2, is switched to be in an on state each time the inductor current $I_L$ becomes zero.

The values of the parameters set for drive pulses included in the multiphase drive-pulse train for any selected converter are identical to those of the parameters set for drive pulses included in the multiphase drive-pulse train for another selected converter.

The pulse calculator 23 or the gate driver 21 is configured to generate, based on the values of the parameters, i.e., the period T, on-duration $T_{on}$, off-duration $T_{off}$, and phase difference Td, the multiphase drive-pulse train every predetermined period T.

The gate driver 21 is configured to perform on-and-off switching operations of the upper- and lower-arm switches SW1 and SW2 of the selected converters 5 in accordance with the multiphase drive-pulse train every predetermined period T.

The following describes how the gate driver 21 controls the upper- and lower-arm switches SW1 and SW2 of each of the selected converters 5 of the U-phase multiphase converter 6u.

Note that the polarity of the inductor current $I_L$ is defined such that the polarity of the inductor current $I_L$ is positive when the inductor current $I_L$ is flowing from the connection point between the switches SW1 and SW2 through the inductor L toward the corresponding U-phase winding as a part of a positively flowing U-phase current Iu. Additionally, the polarity of the inductor current $I_L$ is defined such that the polarity of the inductor current $I_L$ is negative when the inductor current $I_L$ is flowing from the corresponding U-phase winding to the connection point between the switches SW1 and SW2 through the inductor L as a part of a negatively flowing U-phase current Iu.

Let us define a first switching mode in which the command current values $I_O$ for the U-, V-, or W-phase are more than or equal to zero, and a second switching mode in which the command current values $I_O$ for the U-, V-, or W-phase are less than zero.

For example, when multiply driving the selected converters 5 in the multiphase converter 6u in the first switching mode for the U-phase, the gate driver 21 is configured to perform alternate on-off switching operations of the upper-arm switch SW1 of each of the selected converters 5 while holding the lower-arm switch SW2 of each of the selected converters 5 in the off state. The on state of the upper-arm switch SW1 of each of the selected converters 5 causes the capacitor C to be charged while the inductor current $I_L$ flowing through the inductor L from the connection point between switches SW1 and SW2 toward the U-phase winding to gradually increase.

Specifically, when performing the on-off switching operations, the gate driver 21 turns on the upper-arm switch SW1 of each of the selected converters 5 and holds the upper-arm switch SW1 in the on state for the on-duration $T_{on}$. After the on-duration $T_{on}$ has elapsed since the turn-on of the upper-arm switch SW1 of each of the selected converters 5, the gate driver 21 turns off the upper-arm switch SW1 of the corresponding one the selected converters 5. The flyback diode D2 of the lower-arm switch SW2 of each of the selected converters 5 enables the inductor current $I_L$ to continuously flow therethrough and through the inductor L while the inductor current $I_L$ gradually decreases even if the upper-arm switch SW1 is in the off state.

When determining the time that the gradually decreasing inductor current $I_L$ becomes zero based on the zero-timing information received from the zero-current determiner 22 or the turn-off duration $T_{off}$ has elapsed since the turn-off of the first switch SW1, the gate driver 21 turns on the upper-arm switch SW1 of each of the selected converters 5.

That is, the gate driver 21 repeats the alternate on-off switching operations of the upper-arm switch SW1 of each of the selected converters 5 while holding the lower-arm switch SW2 of each of the selected converters 5 in the off state in the first switching mode for the U-phase.

In other words, the gate driver 21 instructs each of the selected converters 5 of the multiphase converter 6u to operate in the boundary current mode to thereby turn on the upper-arm switch SW1 in response to detection that the positive inductor current $I_L$ becomes zero.

In contrast, when multiply driving the selected converters 5 in the multiphase converter 6u in the second switching mode for the U-phase, the gate driver 21 is configured to perform alternate on-off switching operations of the lower-arm switch SW2 of each of the selected converters 5 while holding the upper-arm switch SW1 of each of the selected converters 5 in the off state. The on state of the lower-arm switch SW2 of each of the selected converters 5 causes the inductor current $I_L$ to be discharged from the capacitor C toward the connection point between switches SW1 and SW2 through the inductor L while the inductor current $I_L$ to gradually decrease.

Specifically, when performing the on-off switching operations, the gate driver 21 turns on the lower-arm switch SW2 of each of the selected converters 5 and holds the lower-arm switch SW2 in the on state for the on-duration $T_{on}$. After the on-duration $T_{on}$ has elapsed since the turn-on of the lower-arm switch SW2 of each of the selected converters 5, the gate driver 21 turns off the lower-arm switch SW2 of the corresponding one of the selected converters 5. The flyback diode D1 of the upper-arm switch SW1 of each of the selected converters 5 enables the inductor current $I_L$ to continuously flow therethrough and through the inductor L while the inductor current $I_L$ gradually increases even if the lower-arm switch SW2 is in the off state.

When detecting the timing at which the gradually increasing inductor current $I_L$ becomes zero or the turn-off duration $T_{off}$ has elapsed since the turn-off of the second switch SW2, the gate driver 21 turns on the lower-arm switch SW2 of each of the selected converters 5.

That is, the gate driver 21 repeats the alternate on-off switching operations of the lower-arm switch SW2 of each of the selected converters 5 while holding the upper-arm switch SW1 of each of the selected converters 5 in the off state in the second switching mode for the U-phase. In other words, the gate driver 21 instructs each of the selected converters 5 of the multiphase converter 6u to operate in the boundary current mode to thereby turn on the lower-arm switch SW2 in response to detection that the inductor current $I_L$ becomes zero.

The above information about how the gate driver 21 controls the upper- and lower-arm switches SW1 and SW2 of each of the selected converters 5 of the U-phase multiphase converter 6u is identically established for each of the V-phase multiphase converter 6v and the W-phase multiphase converter 6w as long as the term U-phase is replaced with the corresponding one of the V-phase and W-phase.

Figure 4:
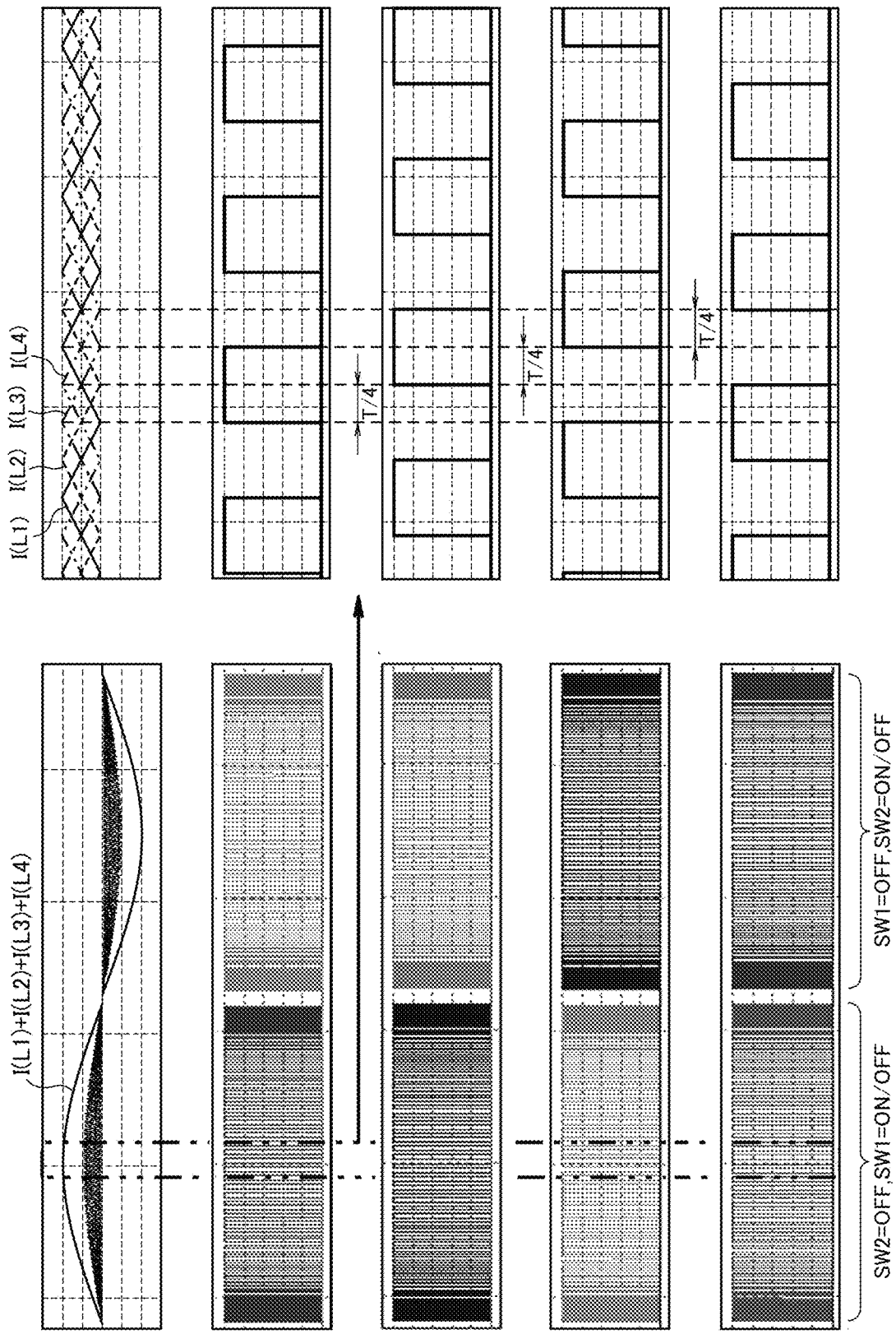
FIG. 4 is a sequential waveform diagram schematically illustrating how inductor currents are changed over time if a multiply-driven number n is set to 4.

FIG. 4 schematically illustrates how the inductor currents $I_L$ are changed over time if the multiply-driven number n is set to 4 so that, for example, the converters 5u1 to 5u4 are selected to be multiply driven, and the phase difference Td is set to T/n. In FIG. 4, the inductor current $I_L$ flowing in the converter 5u1 is referred to as an inductor current $I_{(L1)}$, the inductor current $I_L$ flowing in the converter 5u2 is referred to as an inductor current $I_{(L2)}$, the inductor current $I_L$ flowing in the converter 5u3 is referred to as an inductor current 43), and the inductor current $I_L$ flowing in the converter 5u4 is referred to as an inductor current 44).

FIG. 4 shows how a composite inductor current, which is defined as the composition of the inductor currents $I_{(L1)}$ to $I_{(L4)}$ (see $I_{(L1)}+I_{(L2)}+I_{(L3)}+I_{(L4)}$ in FIG. 4), for the U-phase multiphase converter $6u$ is changed over time, and shows how respective four drive pulses P1 to P4 in the multiphase drive-pulse train PT are supplied to the selected converters $5u1$ to $5u4$ at the period T.

Specifically, each adjacent pair of the drive pulses in the multiphase drive-pulse train PT has the phase difference $T_d$ of T/4.

Because each of the inductor currents $I_{(L1)}$ to $I_{(L4)}$ gradually increases and gradually decreases during each period T, the corresponding one of the inductor currents $I_{(L1)}$ to $I_{(L4)}$, which has a substantially triangular shape, flows through the corresponding inductor L.

The information described for the U-phase multiphase converter $6u$ is identically established for each of the V-phase multiphase converter $6v$ and the W-phase multiphase converter $6w$ as long as the ter iii U-phase is replaced with the corresponding one of the V-phase and W-phase.

The control unit 11 of the controller 10 calculates, for each of the three-phase U, V, and W of the motor 4, the command current value $I_O$ every predetermined update cycle in accordance with the feedback information such that the command current values $I_O$ for the corresponding one of the three-phase U, V, and W of the motor 4 have the desired pseudo sinusoidal waveform with the predetermined AC frequency, i.e., the predetermined AC period. Then, the control unit 11 outputs, for each of the three-phase U, V, and W of the motor 4, control information including the command current value $I_O$ to the pulse calculator 12 every predetermined update cycle.

In addition, the feedback information about the input voltage $V_{in}$, the output voltage $V_{out}$ for each phase, each of the phase currents Iu, Iv, and Iw, and the angular velocity ω are input to the pulse generator 12 for example every predetermined update cycle.

As illustrated in FIG. 4 as an example, the controller 10 is configured to
1. Generate, based on the calculated values of the parameters, i.e., the period T, on-duration $T_{on}$, off-duration $T_{off}$, and phase difference $T_d$, a multiphase drive-pulse train for selected converters 5 from the parallelly-connected converters $5u1$ to $5wc$ of the U-phase multiphase converter 6; the multiphase drive-pulse train has drive pulses whose number matches with the multiply-driven number n (see 4 in FIG. 4)
2. Perform on-and-off switching operations of the switches SW1 and SW2 of the respective selected converters 5 in accordance with the multiphase drive-pulse train
3. Repeat generation of the multiphase drive-pulse train and perform the on-and-off switching operations of the switches SW1 and SW2 of the respective selected converters 5 based on the generated multiphase drive-pulse train every predetermined period T The above configuration of the controller 10 results in, for example each update cycle of the command current values Io, the composition of the inductor currents, i.e., the output currents, which have the phase difference $T_d=T/n$, outputted from the respectively selected n converters 5 in the U-phase multiphase converter $6u$ being supplied as the U-phase current Iu through the U-phase coil 4A1 of the stator 4A of the motor 4.

As in the case with the U-phase multiphase converter $6u$, the above configuration of the controller 10 results in, for each update cycle of the command current values Io, the composition of the inductor currents, which have the phase difference $T_d=T/n$, outputted from the respective n selected converters 5 in the V-phase multiphase converter $6v$ being supplied as the V-phase current Iv through the V-phase coil 4A1 of the stator 4A of the motor 4. Similarly, as in the case with the U-phase multiphase converter $6u$, the above configuration of the controller 10 results in, for each update cycle of the command current values Io, the composition of the inductor currents, which have the phase difference $T_d=T/n$, outputted from the respective selected n converters 5 in the W-phase multiphase converter $6w$ being supplied as the W-phase current Iw through the W-phase coil 4A1 of the stator 4A of the motor 4.

This therefore makes it possible to control each of the three-phase currents Iu, Iv, and Iw such that the corresponding one of the three-phase currents Iu, Iv, and Iw changes to have, for example, a sinusoidal waveform that matches with a desired pseudo sinusoidal waveform of the command current values $I_O$ for the corresponding phase of the motor 4.

It is preferable that a maximum output level of each of the three-phase currents Iu, Iv, and Iw is set to be smaller than a saturation current level of the inductor L and to satisfy one or more restrictive heat-generation requirements of the three-phase inverter 3. The one or more restrictive heat-generation requirements are determined such that the level of heat generated by the three-phase inverter 3 is restricted as long as the maximum output level of each of the three-phase currents Iu, Iv, and Iw is set to satisfy the one or more restrictive heat-generation requirements of the three-phase inverter 3.

The multiply-driven number n of selected converters 5 in each of the three-phase multiphase converters $6u$, $6v$, and $6w$ is preferably set based on the maximum output level of each of the three-phase currents Iu, Iv, and Iw. The frequency corresponding to the period T of drive pulses included in each of the selected multiphase drive-pulse sequences is preferably set to be higher than an audible frequency range.

It is desirable that the multiply-driven number n variably determined by the variable determiner 25 is set to be as large as possible, because, the larger the multiply-driven number n, the higher level of ripple cancelation among the combined output currents from the selected n converters 5 of each of the three-phase multiphase converters $6u$, $6v$, and $6w$. Because, however, an excessive increase in the multiply-driven number n may cause control operations carried out by the controller 10 to be more complicated, it is preferable that the multiply-driven number n is set based on the processing capacity of the controller 10; the processing capacity of the controller 10 is determined based on all the resources of the controller 10.

Figure 5:
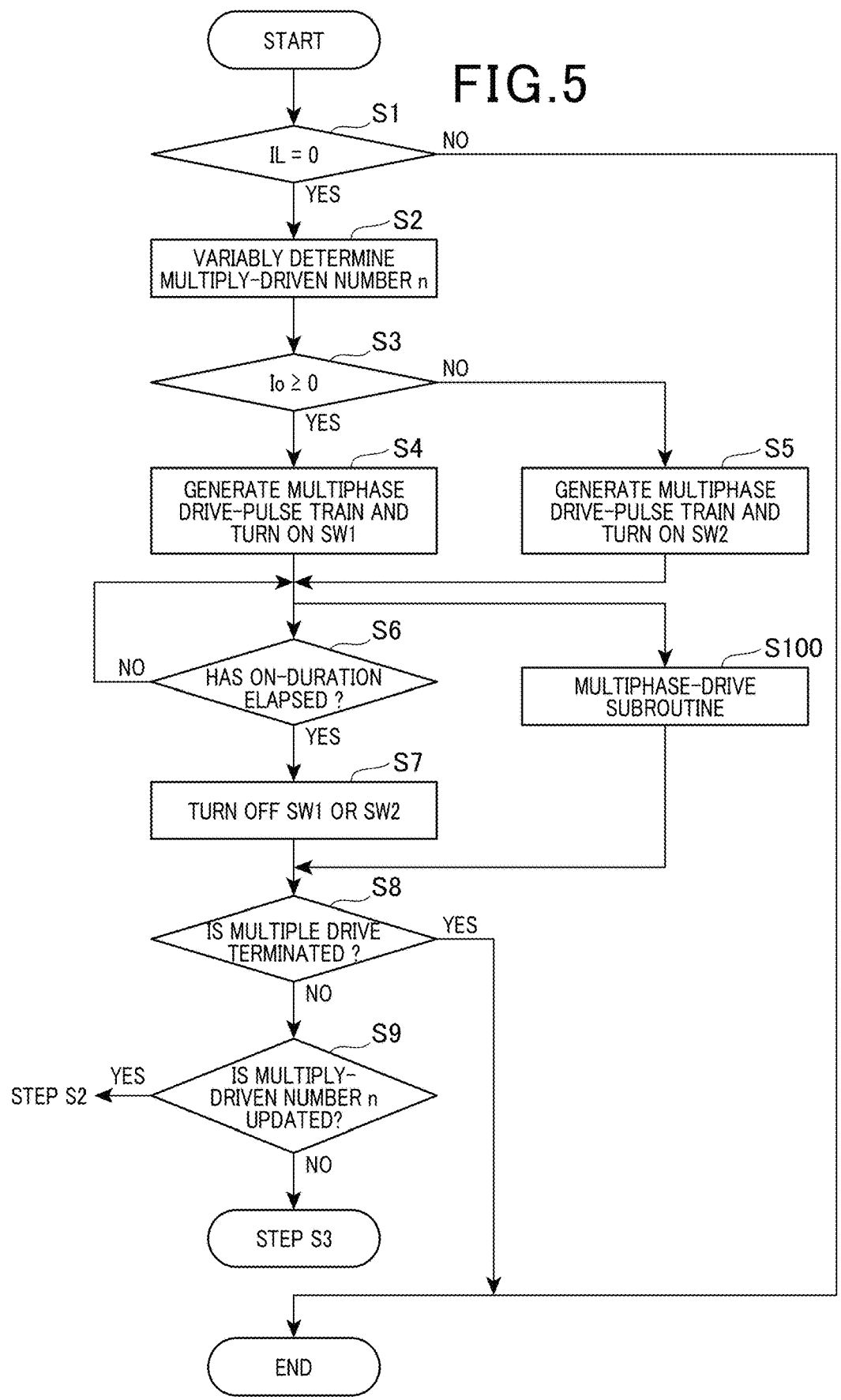
FIG. 5 is a flowchart schematically illustrating an example of the procedure of U-phase multiple drive routine carried out by the controller illustrated in FIG. 1 according to the first embodiment.

Next, the following describes in detail a U-phase multiple drive routine of the U-phase multiphase converter $6u$ carried out by the controller 10 with reference to FIG. 5. Because a V-phase multiple drive routine of the V-phase multiphase converter $6v$ carried out by the controller 10 and a W-phase multiple drive routine of the W-phase multiphase converter $6w$ carried out by the controller 10 are substantially identical to the U-phase multiple drive routine of the U-phase multiphase converter $6u$, the description of each of the V-phase multiple drive routine and the W-phase multiple drive routine is omitted.

When starting the U-phase multiple drive routine of the U-phase multiphase converter $6u$, the controller 10, i.e., the control processor 35, serves as the zero-current determiner 22 to determine whether the inductor current $I_L$ becomes zero in step S1 of FIG. 5.

In response to determination that the inductor current $I_L$ does not become zero (NO in step S1), the controller 10 terminates the U-phase multiple drive routine.

Otherwise, in response to determination that the inductor current $I_L$ becomes zero (YES in step S1), the controller 10 serves as the variable determiner 25 to variably determine the multiply-driven number n, i.e., variably select the converters 5u1 to 5un included in the converters 5u1 to 5ux as first to nth selected converters 5u1 to 5un, and output the determined multiply-driven number n to the pulse calculator 23 in step S2.

Next, the controller 10 serves as the pulse calculator 23 to determine whether the command current value Io inputted thereto every update cycle is more than or equal to zero in step S3.

In response to determination that the command current value Io inputted thereto every update cycle is more than or equal to zero (YES in step S3), the U-phase multiple drive routine proceeds to step S4. Otherwise, in response to determination that the command current value Io inputted thereto every update cycle is less than zero (NO in step S3), the U-phase multiple drive routine proceeds to step S5.

Note that the multiply-driven number n for the selected converters 5u1 to 5un results in an absolute average current I between the selected converters 5u1 to 5un being defined as I=Io/n. Because the inductor current $I_L$ in each converter 5 in the drive system 1 according to the first embodiment repeats a gradual increase and a gradual decrease relative to zero, a peak current $I_{LP}$ of the inductor current $I_L$ in each converter 5 can be expressed by $I_{LP}=2I$.

In step S4, the controller 10 serves as the pulse calculator 23 to calculate, based on the feedback information, values of the respective parameters, i.e., the period T, on-duration $T_{on}$, off-duration $T_{off}$, and phase difference $T_d$, for a multiphase drive-pulse train for the selected converters 5u1 to 5un in accordance with, for example, the following expressions (1-1) to (1-4):

$$T_{on1} = 2 \cdot I \times \frac{L}{V_{in} - V_{out}} \qquad (1-1)$$
$$= I_{LP} \times \frac{L}{V_{in} - V_{out}}$$
$$T_{off1} = 2 \cdot I \times \frac{L}{V_{out}} \qquad (1-2)$$
$$= I_{LP} \times \frac{L}{V_{out}}$$
$$T = T_{on1} + T_{off1} \qquad (1-3)$$
$$T_d = \frac{T}{n} \qquad (1-4)$$

where:

$T_{on1}$ represents the on-duration of the upper-arm switch SW1 of each selected converter;

$T_{off1}$ represents the off-duration of the upper-arm switch SW1 of each selected converter;

$V_{in}$ represents the input voltage inputted to each selected converter;

$V_{out}$ represents the output voltage, i.e., the U-phase voltage Vu, across the U-phase coil 4A1 of the motor 4; and L represents an inductance of the inductor L.

Then, in step S4, the controller 10 serves as the gate driver 21 to supply the first drive pulse included in the multiphase drive-pulse train to the gate of the upper-arm switch SW1 of the first selected converter 5u1 to thereby turn on the upper-arm switch SW1 in accordance with the first drive pulse.

In step S5, the controller 10 serves as the pulse calculator 23 to calculate, based on the feedback information, values of the respective parameters, i.e., the period T, on-duration $T_{on}$, off-duration $T_{off}$, and phase difference $T_d$, for the multiphase drive-pulse train for the selected converters 5u1 to 5un in accordance with, for example, the following expressions (2-1) to (2-4):

$$T_{on2} = 2 \cdot I \times \frac{L}{V_{out}} \qquad (2-1)$$
$$= I_{LP} \times \frac{L}{V_{out}}$$
$$T_{off1} = 2 \cdot I \times \frac{L}{V_{in} - V_{out}} \qquad (2-2)$$
$$= I_{LP} \times \frac{L}{V_{in} - V_{out}}$$
$$T = T_{on2} + T_{off2} \qquad (2-3)$$
$$T_d = \frac{T}{n} \qquad (2-4)$$

where:

$T_{on2}$ represents the on-duration of the lower-arm switch SW2 of each selected converter; and $T_{off2}$ represents the off-duration of the lower-arm switch SW2 of each selected converter.

Then, in step S5, the controller 10 serves as the gate driver 21 to supply the first drive pulse included in the multiphase drive-pulse train to the gate of the lower-arm switch SW2 of the first selected converter 5u1 to thereby turn on the lower-arm switch SW2 in accordance with the first drive pulse.

Figure 6:
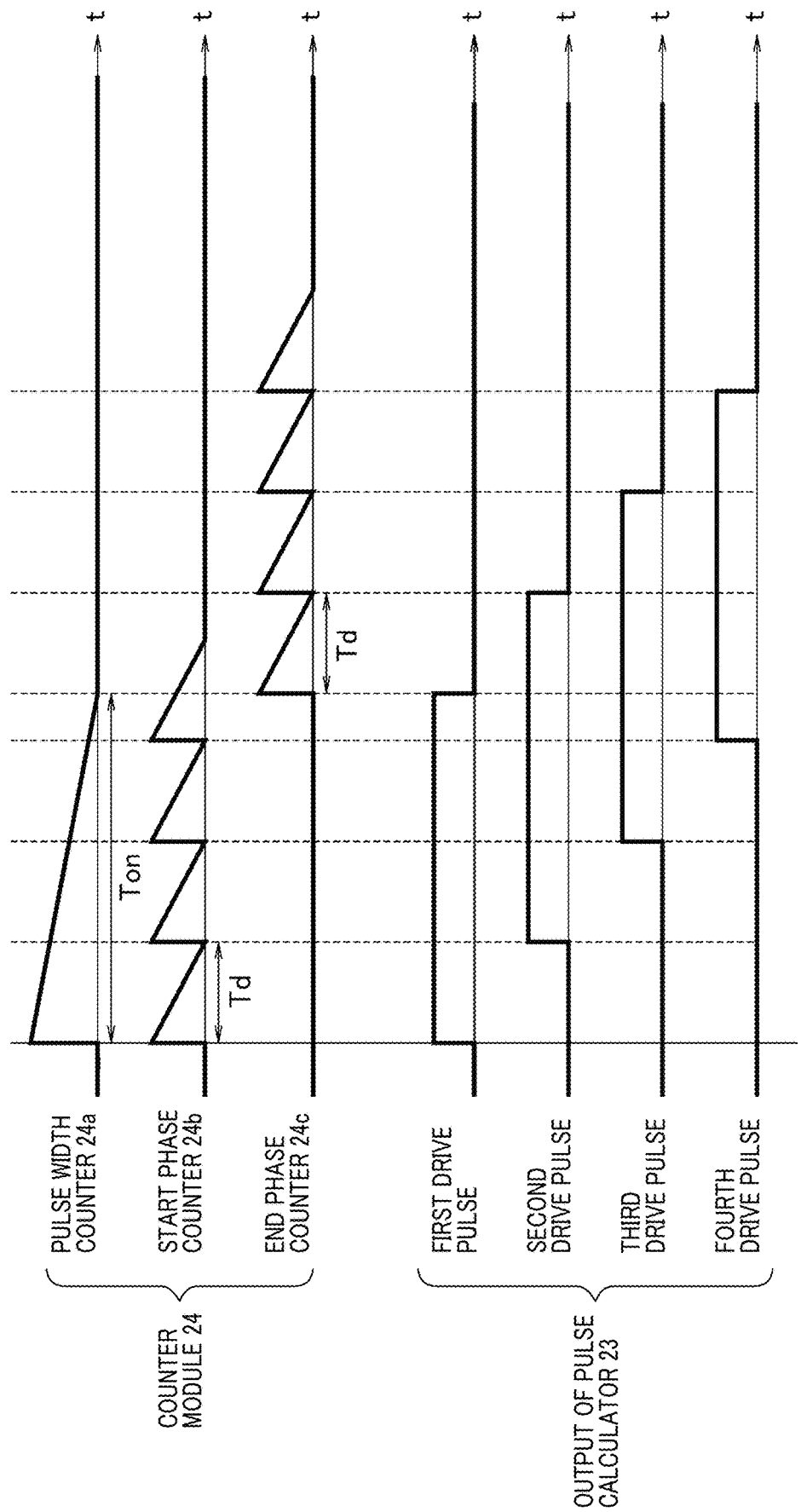
FIG. 6 is a timing chart schematically illustrating an example of how the pulse calculator illustrated in FIG. 2 generates each drive pulse included in a multiphase drive-pulse train for driving four selected converters.

The following describes an example of how the pulse calculator 23 or the gate driver 21 generates each drive pulse included in the multiphase drive-pulse train for driving the selected converters 5u1 to 5un with reference to FIG. 6.

The pulse controller 23a of the pulse calculator 23 sets the count of the pulse width counter 24a to a predetermined value corresponding to the on-duration Ton and decrements the count of the pulse width counter 24a in response to determination that the inductor current $I_L$ becomes zero by the zero-current determiner 22, thus measuring, by the count of the pulse width counter 23a, an actual on-duration of the upper- or lower-arm switch SW1 or SW2. The pulse width counter 24a is configured such that the count is reset to the predetermined value when the count becomes zero.

In response to the operation in step S4 or S5, i.e., the turn-on of the switch SW1 or SW2 of the first selected converter 5u1, the controller 10 serves as the pulse calculator 23 to perform a multiphase-drive subroutine (see S100 in FIG. 5) for driving the second to nth selected converters 5u2 to 5un described later.

Following the operation in step S4 or S5, the controller 10 serves as the pulse calculator 23 to determine whether the on-duration Ton has elapsed since the turn-on of the upper-arm switch SW1 or the lower-arm switch SW2 of the first selected converter 5u1 in accordance with, for example, the actual on-duration measured by the pulse width counter 24a in step S6.

In response to determination that the on-duration Ton has not elapsed since the turn-on of the upper-arm switch SW1 or the lower-arm switch SW2 (NO in step S6), the controller 10 serves as the gate driver 21 to hold the upper-arm switch SW1 or the lower-arm switch SW2 of the first selected converter 5u1 is in the on state, and repeats the determination in step S6.

Otherwise, in response to determination that the on-duration Ton has elapsed since the turn-on of the upper-arm switch SW1 or the lower-arm switch SW2 (YES in step S6), the controller 10 serves as the gate driver 21 to (i) stop the supply of the drive pulse to the gate of the upper-arm switch SW1 or the lower-arm switch SW2 of the first selected converter 5u1 to thereby turn off the upper-arm switch SW1 or the lower-arm switch SW2 of the first selected converter 5u1 and (ii) hold the off state of the upper-arm switch SW1 or the lower-arm switch SW2 in the turn-off duration Toff in step S7.

Simultaneously with the pulse width counter 24a, the pulse controller 23a causes the start phase counter 24b to operate. The start phase counter 24b aims to determine the start timing of each of a second drive pulse to an nth drive pulse included in the multiphase drive-pulse train to the corresponding one of the second to nth selected converters 5u2 to 5un.

Specifically, the pulse controller 23a of the pulse calculator 23 is configured to
1. Perform a start phase measuring task of setting the count of the start phase counter 24b to a predetermined value corresponding to the phase difference $T_d$, decrementing the count, and resetting the count of the start phase counter 24b when the count becomes zero
2. Repeat the start phase measuring task until the number of repetitions of the start phase measuring task becomes the multiply-driven number n The following describes an example of the multiphase-drive subroutine for each of the second to nth multiply-driven converters 5u2 to 5un carried out by the controller 10 with reference to FIG. 7.

In response to the operation in step S4 or S5, the controller 10, i.e., the control processor 35, serves as the pulse calculator 23 to determine whether the switch SW1 or SW2 of an (m−1)th selected converter 5u(m−1) included in the first to nth selected converters 5u1 to 5un is turned on in step S11; m is an integer more than or equal to 2 and less than or equal to n.

If the switch SW1 or SW2 of the first selected converter 5u1 is turned on, the pulse calculator 23 makes an affirmative determination for the second converter 5u2 (YES in step S11) whereas makes a negative determination for the third to nth converters 5u3 to Sun (NO in step S11).

The multiphase-drive subroutine proceeds to step S12 in response to the affirmative determination in step S11. In contrast, the determination in step S11 is repeated in response to the negative determination in step S11.

In step S12, the controller 10 serves as the pulse calculator 23 to determine whether the phase difference $T_d$, which corresponds to, for example, $T_{on}/n$, has elapsed since the turn-on of the switch SW1 or SW2 of the (m−1)th selected converter 5u(m−1) using, for example, the start phase counter 24b in step S12.

If the phase difference $T_d$ has not elapsed since the turn-on of the switch SW1 or SW2 of the (m−1)th selected converter 5u(m−1) (NO in step S12), the determination in step S12 is repeated.

Otherwise, if the phase difference $T_d$ has elapsed since the turn-on of the switch SW1 or SW2 of the (m−1)th selected converter 5u(m−1) (YES in step S12), the multiphase-drive subroutine proceeds to step S13.

In step S13, the controller 10 serves as the gate driver 21 to supply an mth drive pulse to the gate of the switch SW1 or SW2 of the mth selected converter 5um to thereby turn on the switch SW1 or SW2 of the mth converter 5um.

Following the operation in step S13, the controller 10 serves as the pulse calculator 23 to determine whether the on-duration Ton has elapsed since the turn-on of the switch SW1 or SW2 of the mth converter 5um in step S14.

Specifically, in response to the turn-off of the switch SW1 or SW2 of the (m−1)th converter 5u(m−1), the pulse controller 23a causes the end phase counter 24c to operate in step S14. The end phase counter 24c aims to determine the end timing of each of the second drive pulse to the nth drive pulse included in the multiphase drive-pulse train to the corresponding one of the second to nth selected converters 5u2 to 5un.

For example, the pulse controller 23a of the pulse calculator 23 sets the count of the end phase counter 24c to the predetermined value corresponding to the phase difference $T_d$ and decrements the count in step S14. The end pulse counter 24c is configured such that the count is reset to the predetermined value when the count becomes zero.

Specifically, the pulse controller 23a of the pulse calculator 23 is configured to
1. Perform an end phase measuring task of setting the count of the end phase counter 24c to the predetermined value corresponding to the phase difference $T_d$, decrementing the count, and resetting the count of the end pulse counter 24c when the count becomes zero
2. Repeat the end phase measuring task until the number of repetitions of the end phase measuring task becomes the multiply-driven number n In response to determination that the on-duration Ton has not elapsed since the turn-on of the switch SW1 or SW2 of the mth converter 5um (NO in step S14), the controller 10 serves as the gate driver 21 to hold the switch SW1 or SW2 is in the on state, and repeats the determination in step S14.

Otherwise, in response to determination that the on-duration Ton has elapsed since the turn-on of the switch SW1 or SW2 of the mth converter 5um (YES in step S14), the controller 10 serves as the gate driver 21 to (i) stop the supply of the drive pulse to the switch SW1 or SW2 of the mth converter 5um to thereby turn off the switch SW1 or SW2 of the mth converter 5um and (ii) hold the off state of the switch SW1 or SW2 of the mth converter 5um in the turn-off duration Toff in step S15.

Following the operation in step S15, the multiphase-drive subroutine returns to step S8 of the main routine, i.e., the U-phase multiple drive routine.

Because the multiphase-drive subroutine is performed for each of the second to nth selected converters 5u2 to 5un, the switch SW1 or SW2 of each of the second to nth selected converters 5u2 to 5un is sequentially turned on and thereafter turned off while the phase difference $T_d$ calculated by the start phase counter 24b is maintained between each adjacent pair of the first to nth drive pulses included in the multiphase drive-pulse train.

In step S8, the controller 10 serves as the pulse calculator 23 to determine whether to terminate the multiple driving of selected converters.

If the controller 10 determines not to terminate the multiple driving of selected converters (NO in step S8), the multiphase-drive subroutine proceeds to step S9, and otherwise (YES in step S8), the multiphase-drive subroutine is terminated.

In step S9, the controller 10 serves as the pulse calculator 23 to determine whether to update the multiply-driven number n to another number in step S9. If it is determined not to update the multiply-driven number n to another number (NO in step S9), the controller 10 returns to the operation in step S4, and repeatedly performs the operations in steps S4, S5, and S7 to S10 or the operations in steps S4, and S6 to S10 in accordance with the period T.

Otherwise, if it is determined to update the multiply-driven number n to another number (YES in step S10), the controller 10 returns to the operation in step S2, and variably determines the multiply-driven number n to a specified value, thus updating the multiply-driven number n to the specified value in step S2, and thereafter repeatedly performs the operations in steps S3 to S5, and S7 to S10 or the operations in steps S3, S4, and S6 to S10 in accordance with the period T.

That is, the multiphase drive-pulse train is repeatedly supplied to the selected converters $5u1$ to $5un$ at the period T, so that the selected converters $5u1$ to $5un$ are multiply driven at the period T.

The gate driver 21 turns off the switch SW1 or SW2 using hard switching. A sufficient increase in a charging time of the capacitor C provided at the output of each of the switches SW1 and SW2 as compared with the switching time of the corresponding one of the switches SW1 and SW2 enables a period for limiting a voltage increase to become longer, making it possible to perform zero-volt switching of each of the switches SW1 and SW2. This results in switching loss of each of the switches SW1 and SW2 being substantially zero. If the capacitance of the capacitor C is insufficient to perform zero-voltage switching, an additional capacitor can be added in parallel to the capacitor C.

As described above, the pulse calculator 23 is configured to sequentially output the first to nth drive pulses in the multiphase drive-pulse train to the respective first to nth multiply-driven converters $5u1$ to $5un$ with the phase difference $T_d$ being maintained between each adjacent pair of the first to nth drive pulses.

The resonance time of each converter 5 is determined based on the output capacitance of each of the switches SW1 and SW2, the junction capacitance of each of the flyback diodes D1 and D2, and the inductance of the inductor L. It is preferable that a turn-on timing for each of the switches SW1 and SW2 is determined at the lowest peak of a resonating voltage at each half period thereof; the resonating voltage resonates based on the sum of the above capacitances and the inductance of the inductor L. The lowest peak of the resonating voltage at each half period thereof substantially matches with a point of time at which the inductor current $I_L$, which has overshot zero due to turn-off of the switch SW1 or SW2, approaches zero again. This makes it possible to perform zero-current switching and pseudo zero-voltage switching of each of the switches SW1 and SW2, resulting in switching loss of each of the switches SW1 and SW2 being substantially zero.

The following describes an example of the configuration, functions, and technological purpose of the variable determiner 25.

As described above, the variable determiner 25 included in the pulse generator 12 is configured to variably determine, based on a present value of the command RPM and/or the command current values $I_O$, such as an absolute maximum value thereof, for each of the U-, V, and W-phases, the multiply-driven number n of converters 5 to be multiply driven in each of the multiphase converters $6u$, $6v$, and $6w$. The command current values $I_O$ for each of the U-, V, and W-phases change depending on change of the command RPM.

For example, the variable determiner 25 is configured to calculate an update value of the multiply-driven number n of converters 5 based on a present value of the command RPM and/or the command current values $I_O$, and output the calculated multiply-driven number n to the pulse calculator 23 (see step S2 in FIG. 5). One functional component in the controller 10 except for the variable determiner 25, such as the control unit 11, can calculate an updated value of the multiply-driven number n of converters 5 based on a present value of the command RPM and/or the command current values $I_O$, and the variable determiner 25 can update a present value of the multiply-driven number n of converters 5 to the updated value.

For example, if a command current value Io inputted thereto every update cycle is more than or equal to zero in the first switching mode, the variable determiner 25 can calculate, based on the feedback information, values of the respective parameters, i.e., the period T, on-duration $T_{on}$, off-duration $T_{off}$, and phase difference $T_d$, for a multiphase drive-pulse train for the selected converters $5u1$ to $5un$ in accordance with, for example, the following expressions (3-1) to (3-4):

$$T_{on1} = 2 \cdot I \times \frac{L}{V_{in} - V_{out}} \qquad (3\text{-}1)$$

$$= I_{LP} \times \frac{L}{V_{in} - V_{out}}$$

$$= \frac{2I_o}{n} \times \frac{L}{V_{in} - V_{out}}$$

$$T_{off1} = 2 \cdot I \times \frac{L}{V_{out}} \qquad (3\text{-}2)$$

$$= \frac{2I_o}{n} \times \frac{L}{V_{out}}$$

$$T = T_{on1} + T_{off1} \qquad (3\text{-}3)$$

$$T_d = \frac{T}{n} \qquad (3\text{-}4)$$

Additionally, the pulse calculator 23 or the variable determiner 25 is configured to instruct the gate driver 21 not to turn on the switches SW1 and SW2 of one or more secondary converters 5 which are unselected by the pulse calculator 23 based on the multiply-driven number n. For example, the pulse calculator 23 or the variable determiner 25 can instruct the gate driver 21 to maintain both the switches SW1 and SW2 of the one or more unselected secondary converters 5 in the off state.

Figure 8:
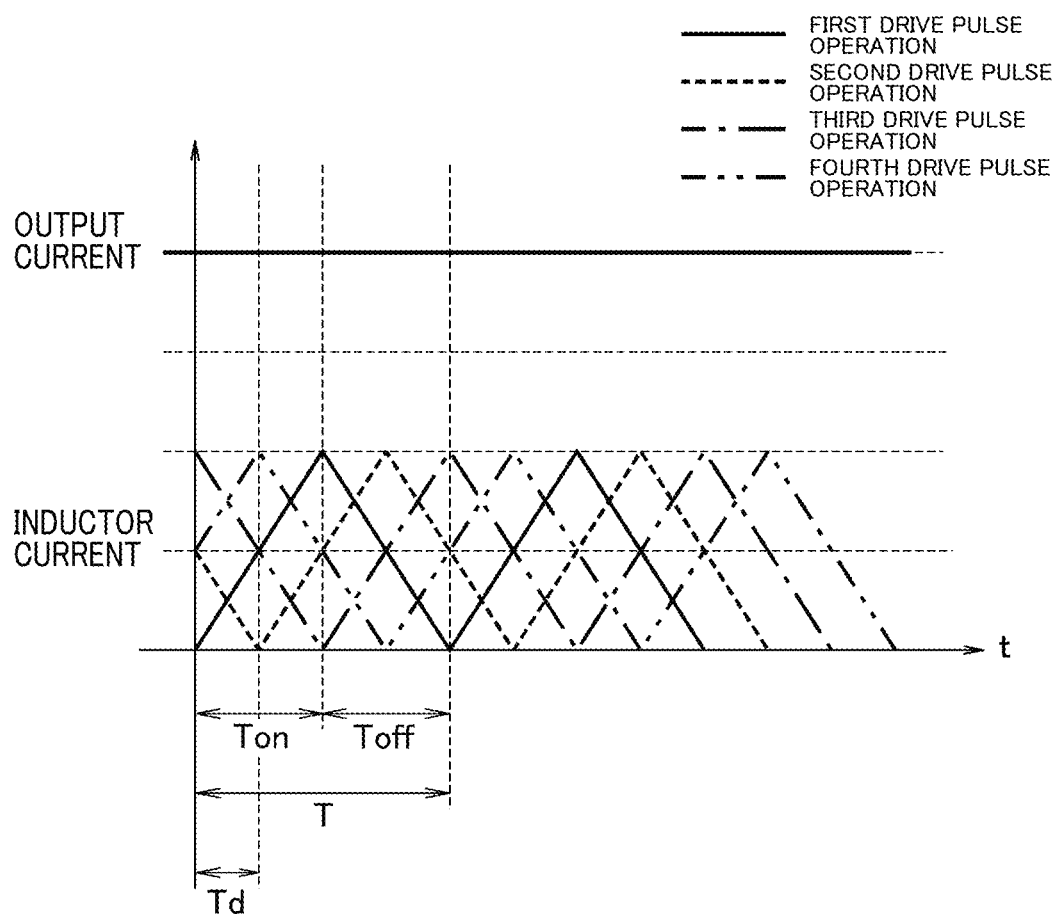
FIG. 8 is a timing chart schematically illustrating a relationship between an output current and an inductor current in a first case where the multiply-driven number of converters is set to 4.
Figure 9:
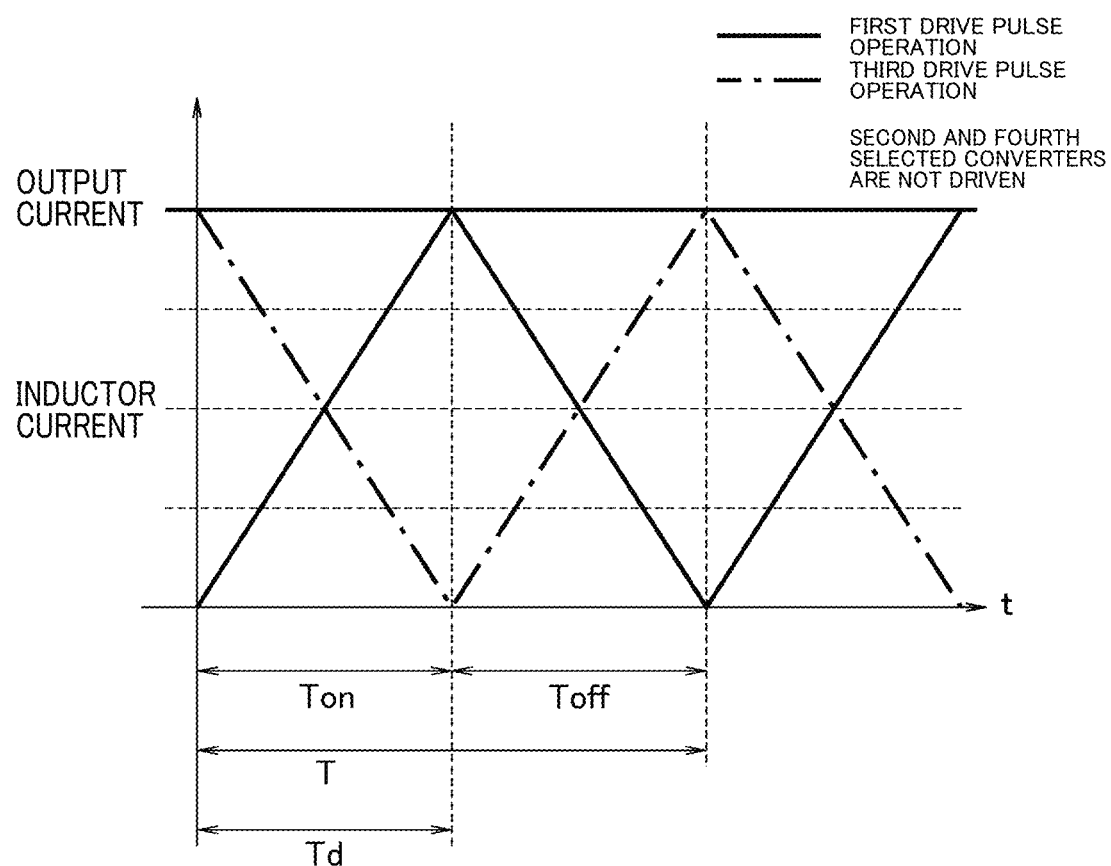
FIG. 9 is a timing chart schematically illustrating a relationship between an output current and an inductor current in a first case where the multiply-driven number of converters is set to 2.

Let us consider a first case where the multiply-driven number n of converters 5 is set to 4 (see FIG. 8), and a second case where the multiply-driven number n of converters 5 is set to 2 (see FIG. 9) upon the command current values $I_O$ inputted to the controller 10 for the first case being identical to the command current values $I_O$ inputted to the controller 10 for the second case.

As clearly seen by comparison between the first case and the second case, the period T for the second case is wider than the period T for the first case, resulting in the width, i.e., the on-duration Ton, of each drive pulse in the second case being wider than that of each drive pulse in the first case.

The variable determiner 25 can be configured to change a value of the multiply-driven number n to an updated value based on change of the command current values $I_O$ inputted to the controller 10.

Figure 10:
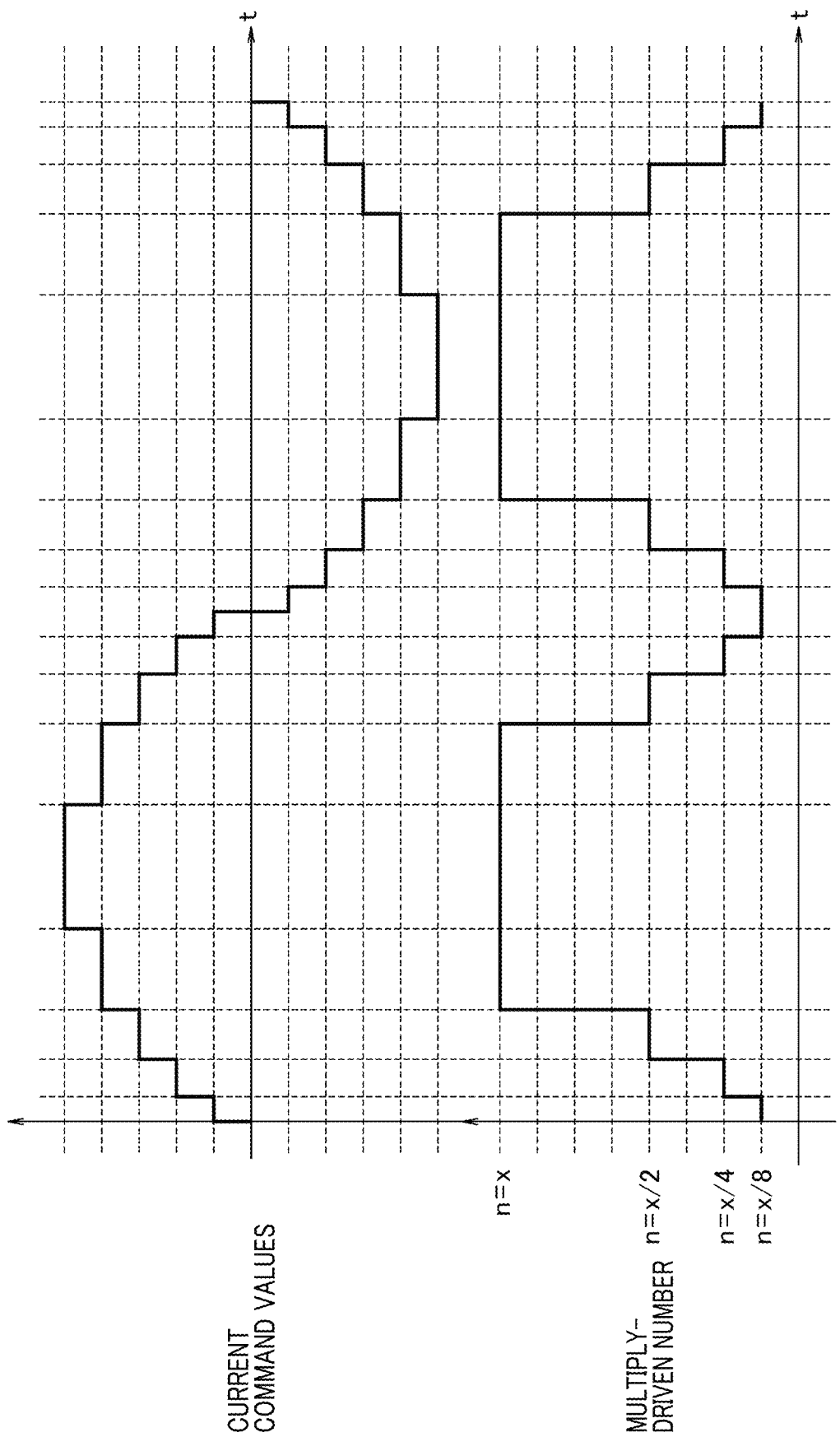
FIG. 10 is a graph schematically illustrating a first example of how a variable determiner illustrated in FIG. 2 sets the multiply-driven number.

For example, as illustrated in FIG. 10, the variable determiner 25 can increase the multiply-driven number n as the command current values $I_O$ increase, and decrease the multiply-driven number n as the command current values $I_O$ decrease.

Note that FIG. 10 shows an example that a multiply-driven number update cycle of the multiply-driven number n is synchronous with the update cycle of the command current values $I_O$, so that each point of time at which the multiply-driven number n is updated is synchronous with a corresponding point of time at which the command current values $I_O$ is updated, but the present disclosure is not limited thereto.

Specifically, the multiply-driven number update cycle of the multiply-driven number n can be asynchronous with the update cycle of the command current values $I_O$, so that each point of time at which the multiply-driven number n is updated can be asynchronous with a corresponding point of time at which the command current values $I_O$ is updated.

Figure 11:
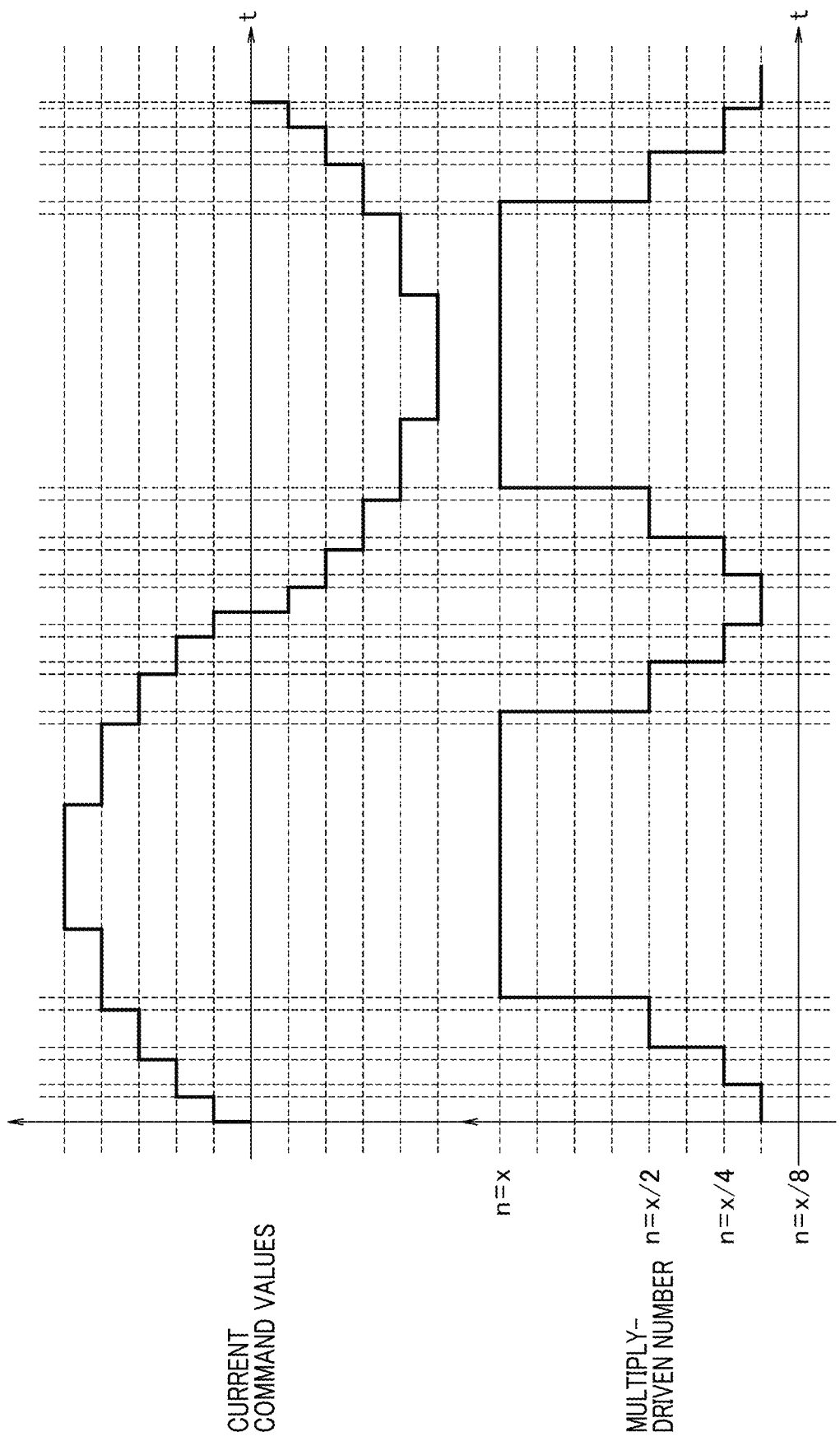
FIG. 11 is a graph schematically illustrating a second example of how the variable deter miner sets the multiply-driven number.

For example, as illustrated in FIG. 11, the multiply-driven number update cycle of the multiply-driven number n can be larger than the update cycle of the command current values $I_O$, so that each point of time at which the multiply-driven number n can be delayed with respect to a corresponding point of time at which the command current values $I_O$ is updated. This example illustrated in FIG. 11 reduces the multiply-driven number n as compared with the example illustrated in FIG. 10, and therefore maintains a sufficient width of each drive pulse even if the command current values $I_O$ are relatively low values. This makes it possible for the controller 10 to output drive pulses to each selected converter 5 accurately.

Figure 12:
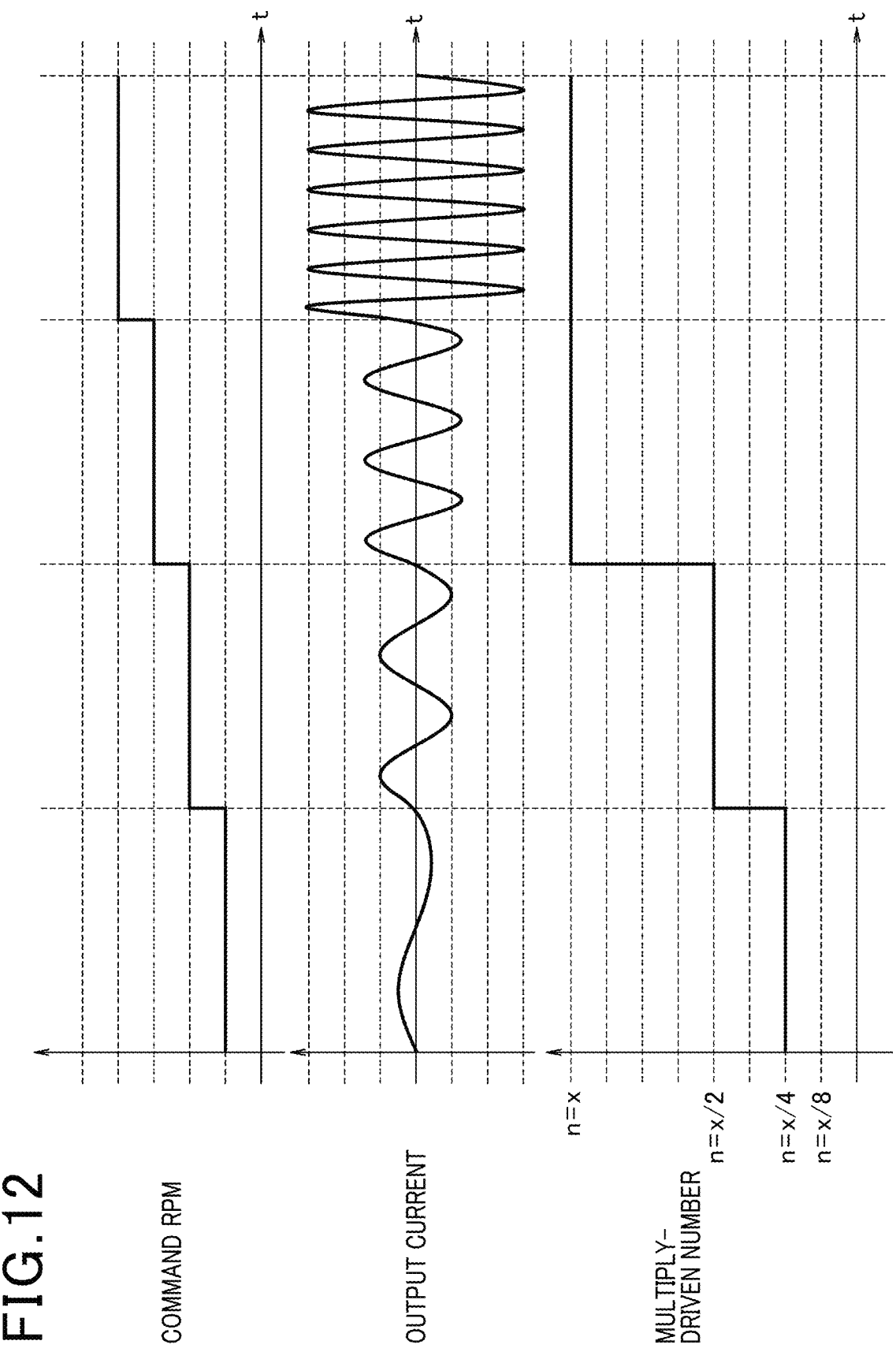
FIG. 12 is a graph schematically illustrating an example of how a command RPM, the output current, and the multiply-driven number are each changed over time while being related to each other.

As illustrated in FIG. 12, the variable determiner 25 can be configured to change a value of the multiply-driven number n to an updated value based on change of the command RPM for the motor 4. As described above, the controller 10 causes the multiphase converter 6u to output the output current (see reference character $I_{out}$ in FIG. 12) having a sinusoidal waveform based in the command current values $I_O$ for the U-phase being input thereto; the command current values $I_O$ for the U-phase have a desired pseudo sinusoidal waveform matching with the sinusoidal waveform of the output current $I_{out}$.

In this example illustrated in FIG. 12, the variable determiner 25 is preferably configured to increase the multiply-driven number n as the command RPM increases, and decrease the multiply-driven number n as the command RPM decreases. The variable determiner 25 can be configured to change a value of the multiply-driven number n to an updated value based on the maximum peak of the waveform of the command current values $I_O$; the maximum peak of the waveform of the command current values $I_O$ changes depending on the command RPM inputted to the controller 10.

As described above, the controller 10 of the drive system 1 according to the first embodiment is configured to variably determine the multiply-driven number n, for example, reduce the multiply-driven number n. This reduction in the multiply-driven number n enables a sufficient width of each drive pulse to be maintained even if the command current values $I_O$ are relatively low values, making it possible to drive each selected converter 5 accurately even if the command current values $I_O$ are relatively low values.

Second Embodiment

Figure 13:
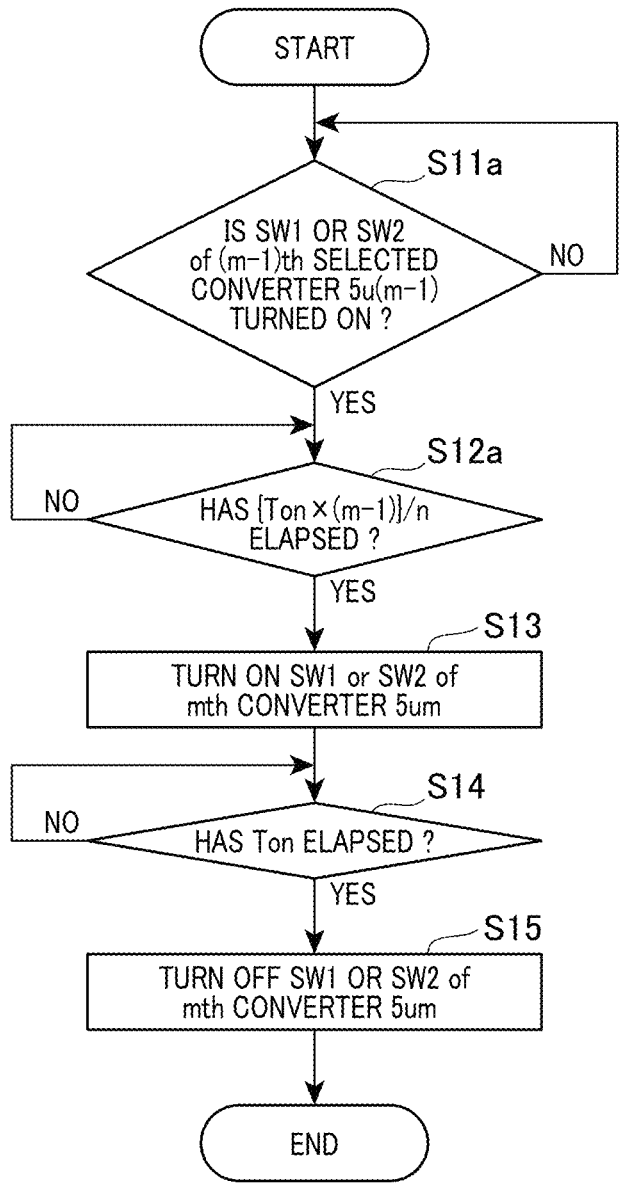
FIG. 13 is a flowchart schematically illustrating an example of a multiphase-drive subroutine for each of second to nth multiply-driven converters carried out by the controller according to the second embodiment of the present disclosure.

The following describes a drive system according to the second embodiment with reference to FIG. 13. The structure and/or functions of the drive system according to the second embodiment are mainly identical to those of the drive system 1 except for the following points. The following therefore describes mainly the different points.

FIG. 13 illustrates an example of a multiphase-drive subroutine for each of the second to nth multiply-driven converters 5u2 to 5un carried out by the controller 10 according to the second embodiment.

In response to the operation in step S4 or S5, the controller 10 serves as the pulse calculator 23 to determine whether the switch SW1 or SW2 of the first selected converter 5u1 is turned on in step S11a.

In response to the affirmative determination in step S11, the controller 10 serves as the pulse calculator 23 to determine whether a phase difference $T_{dm}$, which corresponds to, for example, $\{T_{on} \times (m-1)\}/n$, has elapsed since the turn-on of the switch SW1 or SW2 of the first selected converter 5u1 using, for example, the start phase counter 24b in step S12a.

If the phase difference $T_{dm}$ has not elapsed since the turn-on of the switch SW1 or SW2 of the first selected converter 5u1 (NO in step S12a), the determination in step S12a is repeated.

Otherwise, if the phase difference $T_{dm}$ has elapsed since the turn-on of the switch SW1 or SW2 of the first selected converter 5u1 (YES in step S12a), the multiphase-drive subroutine proceeds to step S13. The other operations in the multiphase-drive subroutine are substantially identical to those illustrated in FIG. 7.

The pulse calculator 23 can be configured to calculate the phase difference $T_{dm}$ of the phase of each drive pulse for the mth selected converter 5um at one period T with respect to the phase of the corresponding drive pulse for the first selected converter 5u1 at the same period T in accordance with the following relationship (4):

$$T_{dm} = T_d \times (m-1) = T_{on} \times \frac{m-1}{n} \qquad (4)$$

For example, the gate driver 21 of the controller 10 according to the second embodiment turns on the switch SW1 or SW2 of the first selected converter, i.e., primary converter, 5u1, and thereafter successively turn on the switch SW1 or SW2 of the selected converters 5u2 to 5un.

The second embodiment achieves advantageous benefits that are identical to the above advantageous benefits achieved by the first embodiment.

Third Embodiment

Figure 14:
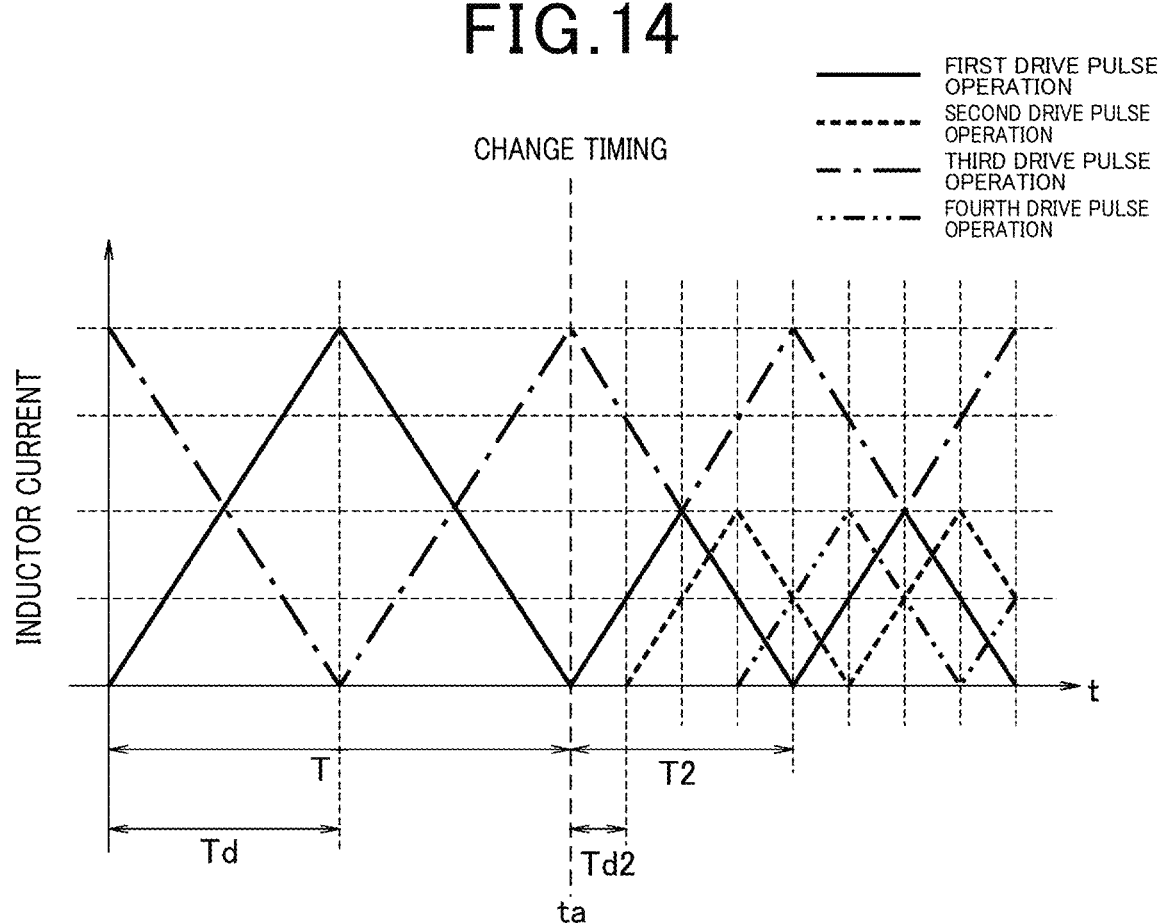
FIG. 14 is a graph schematically illustrating a program resulting from change of the multiply-driven number, which is focused by the third embodiment of the present disclosure.

The following describes a drive system according to the third embodiment with reference to FIGS. 14 and 15. The structure and/or functions of the drive system according to the third embodiment are mainly identical to those of the drive system according to the first or second embodiment except for the following points. The following therefore describes mainly the different points.

There is a case where it may be difficult for the controller 10 to continuously satisfy the necessary condition of the boundary current mode when the variable determiner 25 changes a value of the multiply-driven number n to an updated value.

Let us consider a typical case where the variable determiner 25 changes the value 2 of the multiply-driven number n to the updated value 4 of the multiply-driven number n at a predetermined time ta, and the controller 10 changes the phase T to T/2 as a changed period T2.

As illustrated in FIG. 14A, before the time ta, the controller 10 selects the converters 5u1 and 5u3 as first and second selected converters based on the value 2 of the multiply-driven number n, and drives each of the first and second selected converters 5u1 and 5u3 in the period T to thereby control the U-phase current Iu to have a desired waveform of the command current values $I_O$ while causing the U-phase multiphase converter 6u in the boundary current mode.

At the time ta, the controller 10 selects the converters 5u1 to 5u4 as first to fourth selected converters based on the changed value 4 of the multiply-driven number n. Then, the controller 10 sequentially drives, after the time ta, the first to fourth selected converters 5u1 to 5u4 with a phase difference $T_{d2}$ of T2/4 being maintained between each adjacent pair of the first to fourth selected converters 5u1 to 5u4. This sequential drive of the first to fourth selected converters 5u1 to 5u4 enables the inductor current $I_L$ flowing in the first selected converter, i.e., primary converter, 5u1 to become zero, but makes it difficult for the inductor current $I_L$ flowing in the third selected converter, i.e., secondary converter, 5u3 to become zero. This may cause the third converter 5u3 not to operate continuously in the boundary current mode.

From this viewpoint, the pulse generator 12 of the controller 10 according to the third embodiment is configured to, when changing the present value n of the multiply-driven number to a next value m of the multiply-driven number, generate interpolation multiple pulses Pu1 to Pum to thereby cause each of the selected converters to operate continuously in the boundary current mode.

Figure 15A:
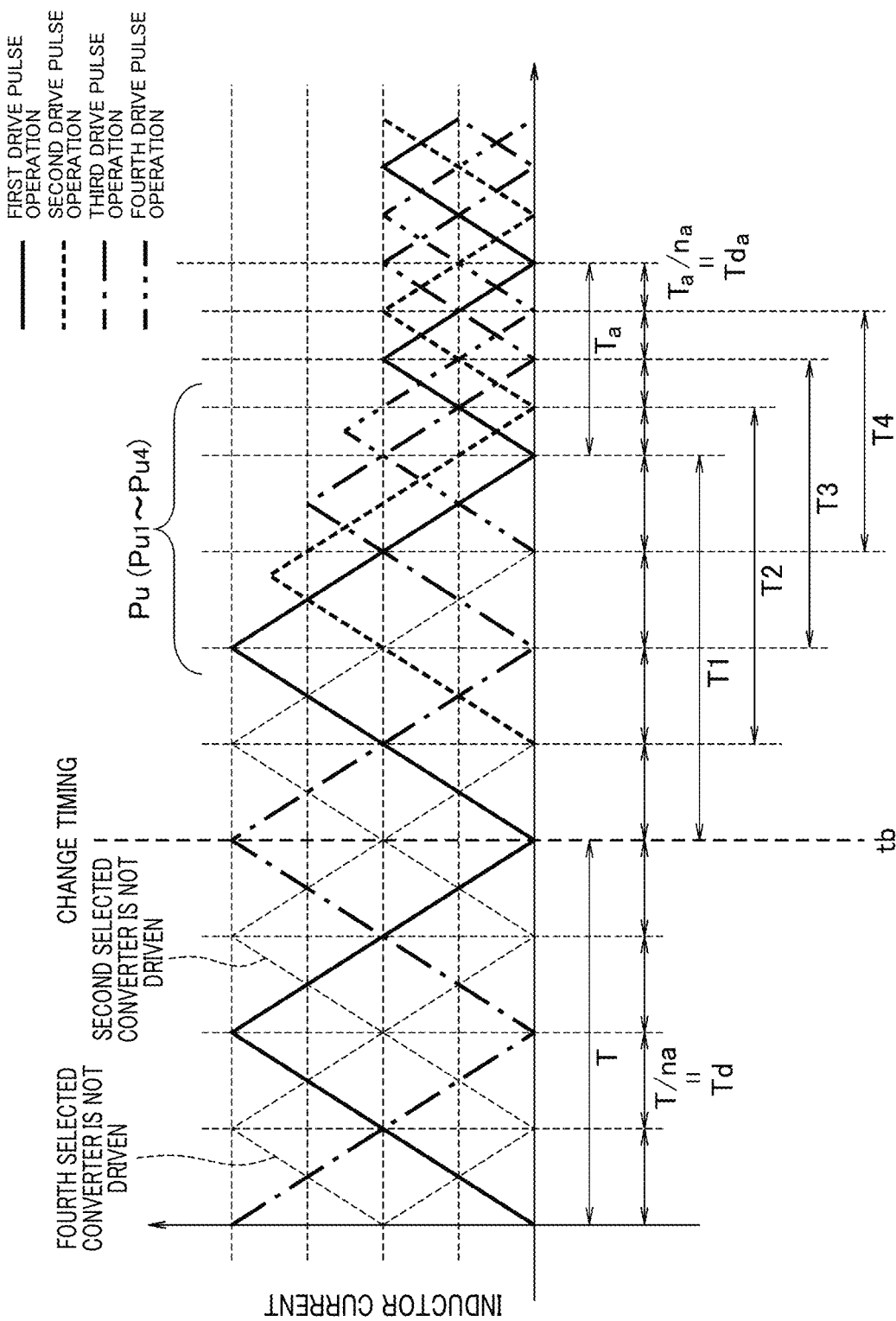
FIG. 15A is a timing chart schematically illustrating how a pulse generator of the controller according to the third embodiment generates interpolation multiple pulses.

Next, how the pulse generator 12 of the controller 10 according to the third embodiment generates the interpolation multiple pulses Pu1 to Pum with reference to FIG. 15A.

In FIG. 15A, the variable determiner 25 changes the value 2 of the multiply-driven number n to the updated value 4 of the multiply-driven number n at a predetermined time tb.

Let us assume that an original value of the period will be referred to as T, a changed value of the phase will be referred to as $T_a$, an original value of the multiply-driven number will be referred to as n, and a next value of the multiply-driven number will be referred to as $n_a$. Additionally, an original value of the phase difference will be referred to as $T_d$ equal to T/n, and a next value of the phase difference will be referred to as $T_{da}$ equal to $T_a/n_a$.

The original value $T_d$ of the phase difference can be expressed as a function of the original value n of the multiply-driven number, so that the U-phase current Iu is unchanged before and after the time tb.

Figure 15B:
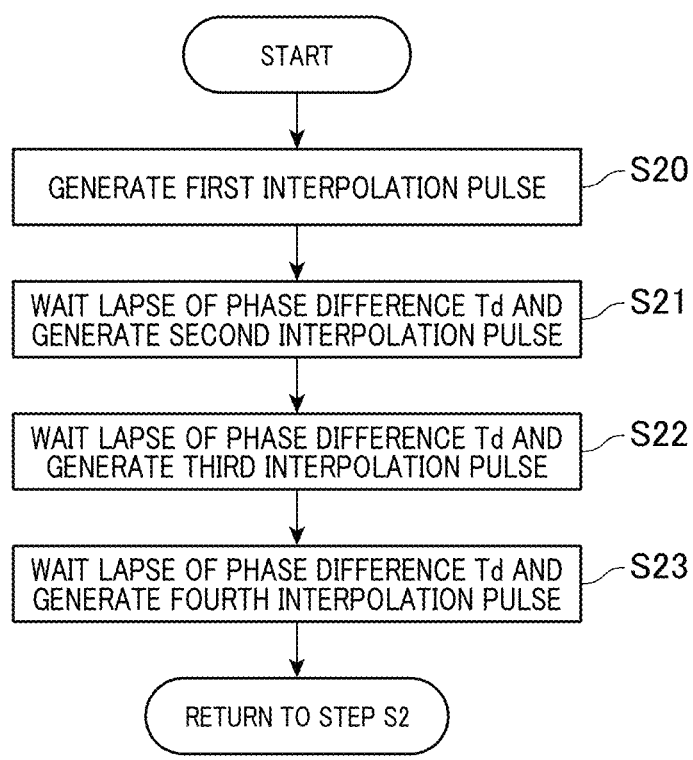
FIG. 15B is a flowchart schematically illustrating an example of the procedure of an interpolation pulse generation routine carried out by a controller according to the third embodiment.

Specifically, when the value 2 of the multiply-driven number n is changed to the updated value 4 of the multiply-driven number n at a predetermined time tb in the determination of step S9 in FIG. 5, the controller 10 serves as the pulse calculator 23 or the gate driver 21 to generate a first interpolation pulse Pu1 for the first selected converter 5u1 that has a total on-and-off duration T1 of the upper- and lower-arm switches SW1 and SW2 of the first selected converter 5u1 in step S20 of FIG. 15B.

Next, the controller 10 serves as the gate driver 21 to supply the first interpolation pulse Pu1 to the gate of the switch SW1 or SW2 of the first selected converter 5u1 in step S21.

Subsequently, the controller 10 serves as the pulse calculator 23 or the gate driver 21 to wait the lapse of the phase difference $T_d$ equal to T/n, and thereafter generate a second interpolation pulse Pu2 for the second selected converter 5u2 that has a total on-and-off duration $T_2$ of the upper- and lower-arm switches SW1 and SW2 of the second selected converter 5u2 in step S22.

Following the operation in step S22, the controller 10 serves as the pulse calculator 23 or the gate driver 21 to wait the lapse of the phase difference $T_d$ equal to T/n, and thereafter generate a third interpolation pulse Pu3 for the third selected converter 5u3 that has a total on-and-off duration $T_3$ of the upper- and lower-arm switches SW1 and SW2 of the third selected converter 5u3 in step S23.

Next, the controller 10 serves as the pulse calculator 23 or the gate driver 21 to wait the lapse of the phase difference $T_d$ equal to T/n, and thereafter generate a fourth interpolation pulse Pu4 for the fourth selected converter 5u4 that has a total on-and-off duration T4 of the upper- and lower-arm switches SW1 and SW2 of the fourth selected converter 5u4 in step S24.

Subsequently, the controller 10 serves as the pulse calculator 23 to wait the lapse of the phase difference $T_{da}$ equal to $T_d/n_a$, and thereafter returns to the operation in step S2.

That is, if the original value of the multiply-driven number n is changed to the updated value m of the multiply-driven number n, the first to mth interpolation pulses Pu1 to Pum whose respective total on-and-off durations T1 to Tm can be represented by the following expressions (5) (see FIG. 15A):

$$T_1 = T \quad (5)$$
$$T_2 = T_1 + \frac{T_a}{n_a} + \frac{T}{n}$$
$$T_3 = T_2 + \frac{T_a}{n_a} + \frac{T}{n} = T_1 + 2 \times \left(\frac{T_a}{n_a} + \frac{T}{n}\right)$$
$$\vdots$$
$$T_m = T_1 + (m-1) \times \left(\frac{T_a}{n_a} + \frac{T}{n}\right)$$

The first to mth interpolation pulses Pu1 to Pum generated for the respective selected converters 5u1 to 5um and supplied for the respective first to mth selected converters 5u1 to 5um enable the respective inductor currents $I_L$ to become zero.

This therefore makes it possible to change the original value of the multiply-driven number n to the updated value m of the multiply-driven number while causing each of the first to mth converters 5u1 to 5um to operate continuously in the boundary current mode.

The above method of generating the first to mth interpolation pulses Pu1 to Pum is merely an example of one of various method of generating the first to mth interpolation pulses Pu1 to Pum, and therefore the present disclosure is not limited to the example of generating the first to mth interpolation pulses Pu1 to Pum. For example, a value of the phase difference between each adjacent pair of the first to mth interpolation pulses Pu1 to Pum can be set to the changed value $T_a/n$ of the phase difference or the original value T/n of the phase difference.

As described above, the controller 10 of the third embodiment is configured to generate the first to mth interpolation pulses Pu1 to Pum and supply the first to mth interpolation pulses Pu1 to Pum to the respective first to mth selected converters 5u1 to 5um. This makes it possible to change the original value n of the multiply-driven number to the updated value m of the multiply-driven number while causing each of the first to mth converters 5u1 to 5um to operate continuously in the boundary current mode.

First Modification of First to Third Embodiments

The first embodiment describes the controller 10 serving as a feedback control system for feedback control of each of the U-, V-, and W-phase currents Iu, Iv, and Iw, but the feedback control system according to the present disclosure is not limited to the configuration of the controller 10 according to the first embodiment.

The following describes a first modification of the feedback control system according to each of the first to third embodiments with reference to FIGS. 16 to 20.

In this first modification and the first embodiment, descriptions of like parts between this first modification and the first embodiment, to which like reference characters are assigned, are omitted or simplified to avoid redundant descriptions.

Figure 16:
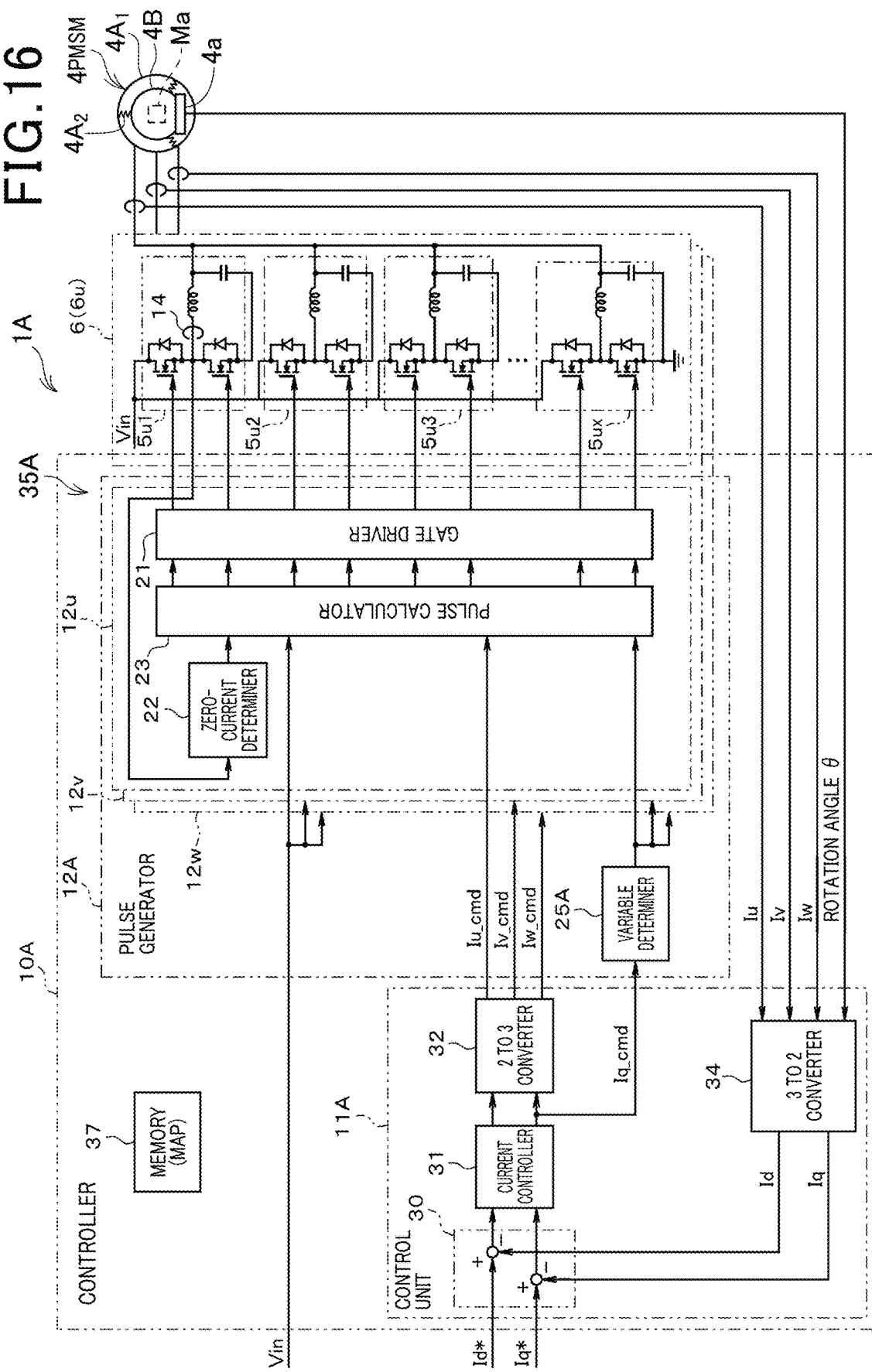
FIG. 16 is a circuit block diagram schematically illustrating an example of the overall configuration of a drive system according to the first modification of the feedback control system according to each of the first to third embodiments.

Referring to FIG. 16, a drive system 1A according to this first modification includes a controller 10A, which serves as a feedback control system of the drive system 1A according to this first modification.

The controller 10A is comprised of a control processor 35A and the memory device 37, and the control processor 35A functionally includes a control unit 11A and a pulse generator 12A.

The control unit 11A functionally includes, for example, a subtractor 30, a current controller 31, a two-phase to three-phase coordinate converter 32, and a three-phase to two-phase coordinate convertor 34. In FIG. 16, the two-phase to three-phase coordinate converter 32 will be illustrated as "2 TO 3 CONVERTER 32", and the three-phase to two-phase coordinate converter 34 will be illustrated as "3 TO 2 CONVERTER 34".

The ECU 500 is configured to calculate a d-axis command current value Id* and a q-axis command current value Iq* in a d-q coordinate system of the rotor 4B of the motor 4 in accordance with, for example, the request torque. Each of the command current value Id* and q-axis command current value Iq* serves as a corresponding one of the command current values $I_O$ according to the first modification.

Each of the d-axis command current value Id* and q-axis command current value Iq* is inputted to the control unit 11A from the ECU 500 every predetermined update cycle. The set of the d-axis command current values Id* and the set of the q-axis command current value Iq* respectively have a desired pseudo sinusoidal waveform with a predetermined AC period.

The three-phase to two-phase converter 34 is configured to calculate the angular velocity ω of the rotor 4B based on the rotation angle θ of the motor 4, i.e., the rotor 4B, and convert the U-, V-, and W-phase phase currents Iu, Iv, and Iw into a d-axis current, i.e., a magnetic flux current, Id and a q-axis current, i.e., a torque current, Iq in the d-q coordinate system as a function of the angular velocity ca.

The subtractor 30 is configured to subtract the d-axis current Id from the d-axis command current value Id* to thereby calculate a d-axis deviation ΔId, and subtract the q-axis current Iq from the q-axis command current value Iq* to thereby calculate a q-axis deviation ΔIq. The subtractor 30 is configured to output the d- and q-axis command current values Id* and Iq* to the current controller 31.

The current controller 31 is configured to perform, as a known feedback control task, a proportional-integral (PI) feedback control task using the d-axis current deviation ΔId as input data, and a proportional gain term and an integral gain term of a PI feedback control algorithm (PI algorithm). The PI feedback control task calculates a d-axis manipulated variable Id_cmd for causing the d-axis current deviation ΔId to converge to zero.

Similarly, the current controller 31 is configured to perform, as a known feedback control task, the PI feedback control task using the q-axis current deviation ΔIq as input data, and a proportional gain term and an integral gain term of the PI feedback control algorithm. The PI feedback control task calculates a q-axis manipulated variable Iq_cmd for causing the q-axis current deviation ΔIq to converge to zero.

Then, the current controller 31 is configured to output, to the two-phase to three-phase coordinate converter 32, the d-axis manipulated variable Id_cmd and q-axis manipulated variable to the two-phase to three-phase coordinate converter 32.

The two-phase to three-phase converter 32 is configured to convert, as a function of the angular velocity ω, the d-axis manipulated variable Id_cmd and q-axis manipulated variable Iq_cmd into three-phase (U-, V-, and W-phase) manipulated variables Iu_cmd, Iv_cmd, and Iw_cmd, and output, to the pulse generator 12A, the three-phase manipulated variables Iu_cmd, Iv_cmd, and Iw_cmd.

The pulse generator 12A functionally includes a U-phase pulse generation block 12u, a V-phase pulse generation block 12v, a W-phase pulse generation block 12w, and a variable determiner 25A.

Each of the U-, V-, and W-phase generation blocks 12u, 12v, and 12w functionally includes, for example, the gate driver 21, the zero-current determiner 22, and the pulse calculator 23. Each of the three-phase manipulated variables Iu_cmd, Iv_cmd, and Iw_cmd is inputted to the pulse calculator 23 of the corresponding one of the U-, V-, and W-phase generation blocks 12u, 12v, and 12w. The zero-current determiner 22 of each of the U-, V-, and W-phase generation blocks 12u, 12v, and 12w is configured to output, to the pulse calculator 23, zero-timing information each time of determining that the corresponding one of the three-phase manipulated variables Iu_cmd, Iv_cmd, and Iw_cmd becomes zero.

The pulse calculator 23 of each of the U-, V-, and W-phase generation blocks 12u, 12v, and 12w is configured to 1. Select, based on the driven-number selection information received from the variable determiner 25A, converters 5 to be driven in the parallelly-connected converters 5 of the corresponding one of the multiphase converters 6u, 6v, and 6w 2. Analyze, for example, the corresponding one of the three-phase command current values Iu_cmd, Iv_cmd, and Iw_cmd to thereby calculate, for each of the multiphase converters 6u, 6v, and 6w, values of the respective parameters, which include the period T, on-duration $T_{on}$, off-duration $T_{off}$, and phase difference $T_d$, for each multiphase (multiple) drive-pulse train that instructs the selected converters 5 in the parallelly-connected converters 5 of the corresponding one of the multiphase converters 6u, 6v, and 6w to operate in the boundary current mode The pulse calculator 23 or the gate driver 21 is configured to generate, based on the values of the parameters, i.e., the period T, on-duration $T_{on}$, off-duration $T_{off}$, and phase difference $T_d$, the multiphase drive-pulse train every predetermined period T.

The gate driver 21 is configured to perform on-and-off switching operations of the upper- and lower-arm switches SW1 and SW2 of the selected converters 5 in accordance with the multiphase drive-pulse train every predetermined period T.

The variable determiner 25A included in the pulse generator 12A is configured to variably determine, based on a present value of the q-axis command current values Iq_cmd, the multiply-driven number n of converters 5 to be multiply driven in each of the multiphase converters 6u, 6v, and 6w.

Figure 17:
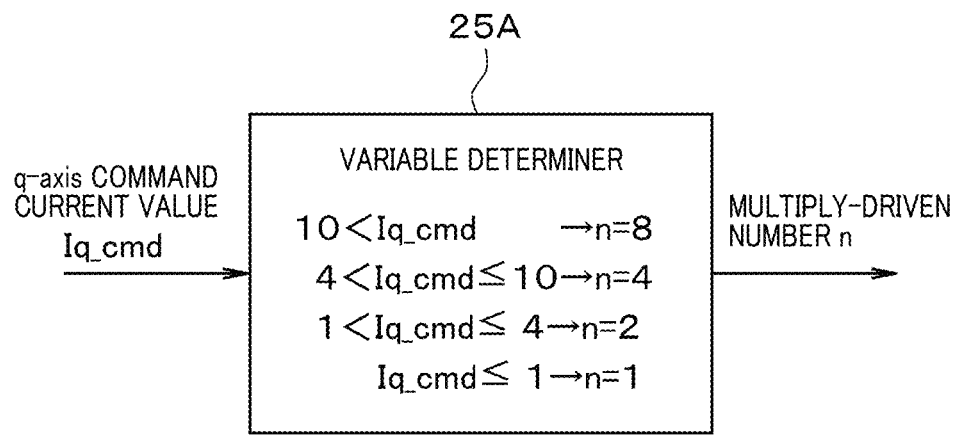
FIG. 17 is a block diagram schematically illustrating a variable determiner according to the first modification.

For example, as illustrated in FIG. 17, the variable determiner 25A variably determines the multiply-driven number n of converters 5 to be multiply driven in each of the multiphase converters 6u, 6v, and 6w to (i) 8 if the present value of the q-axis command current values Iq_cmd exceeds 10, (ii) 4 if the present value of the q-axis command current values Iq_cmd is lower than or equal to 10 and larger than 4, (iii) 2 if the present value of the q-axis command current values Iq_cmd is lower than or equal to 4 and larger than 1, and (iv) 1 if the present value of the q-axis command current values Iq_cmd is lower than 1.

That is, the variable determiner 25A is configured to change, based on change of the q-axis command current values Iq_cmd, the multiply-driven number n to an updated value $n \times 2^s$ or $n \times (1/2^s)$ where s is an integer more than or equal to 1.

For example, the variable determiner 25A is configured to reduce the multiply-driven number n of converters 5, which are to be multiply driven in each of the multiphase converters 6u, 6v, and 6w, to half each time the present value of the q-axis command current values Iq_cmd decreases. This configuration makes it possible to omit calculation of the phase difference $T_d$ carried out by the pulse calculator 23.

As another example, the variable determiner 25A can be configured to vary the multiply-driven number n of converters 5 to be multiply driven in each of the multiphase converters 6u, 6v, and 6w in the approach illustrated in FIG. 10 or FIG. 11.

Figure 18A:
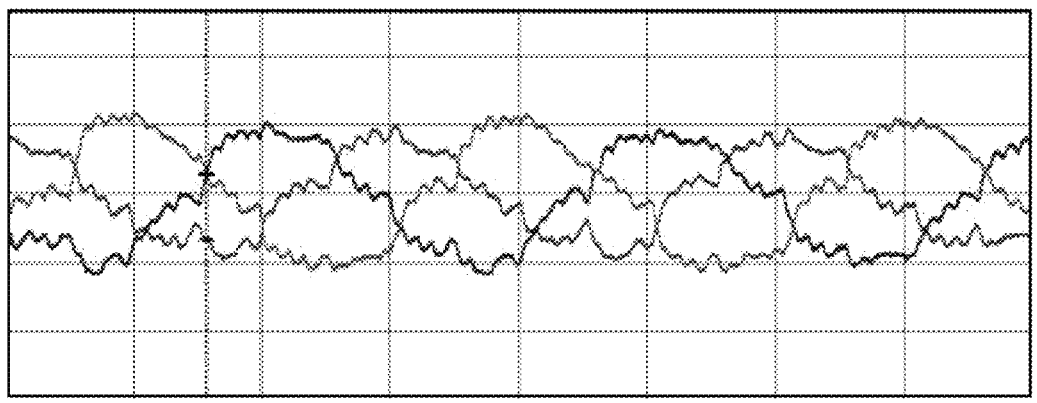
FIG. 18A is a graph schematically illustrating how three-phase currents to be supplied to a motor are changed over time if the multiply-driven number is set to a constant value.

FIG. 18A illustrates three-phase currents Iua, Iva, and Iwa to be supplied to the motor 4 if the multiply-driven number n of converters 5 to be multiply driven in each of the multiphase converters 6u, 6v, and 6w is set to a constant value.

Figure 18B:
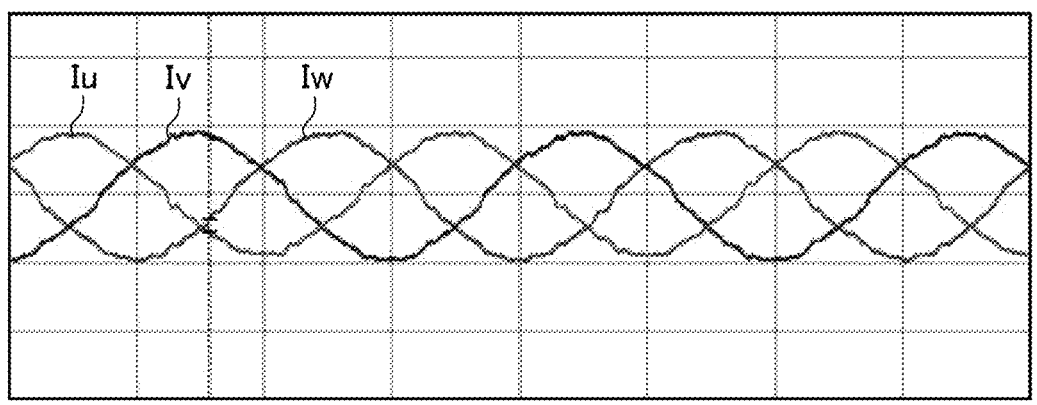
FIG. 18B is a graph schematically illustrating how three-phase currents to be supplied to the motor are changed over time if the multiply-driven number is variably determined by the variable determiner.

In contrast, FIG. 18B illustrates three-phase currents Iu, Iv, and Iw to be supplied to the motor 4 if the multiply-driven number n of converters 5 to be multiply driven in each of the multiphase converters 6u, 6v, and 6w is variably determined by the variable determiner 25A.

As clearly seen by comparison between the waveforms of the respective three-phase currents Iu, Iv, and Iw and those of the respective three-phase currents Iua, Iva, and Iwa, the drive system 1A illustrated in FIG. 16 reduces a degree of distortion on each of the three-phase currents Iu, Iv, and Iw.

Figure 19A:
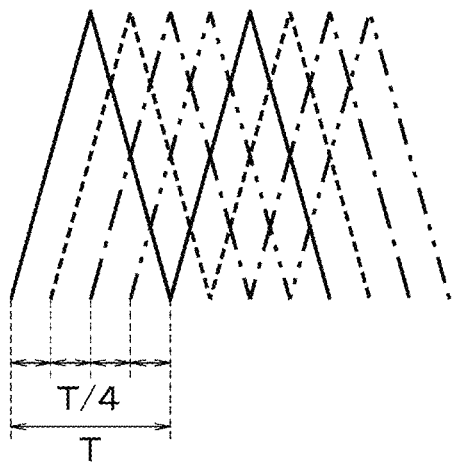
FIGS. 19A and 19B are diagrams that schematically illustrate an issue caused by a comparative example related to the first to third embodiments.
Figure 19B:
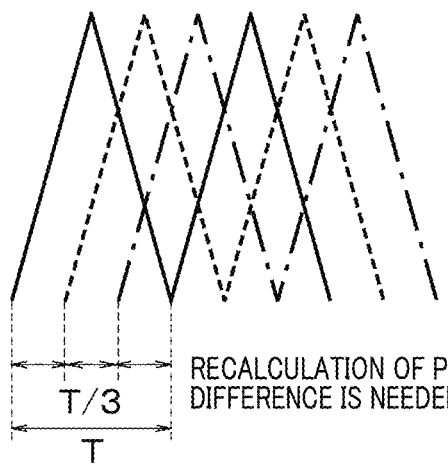

As illustrated in FIGS. 19A and 19B, if the multiply-driven number n equal 4 is switched to 3, it is necessary to recalculate the phase difference $T_d$, which is T/3, between each adjacent pair of selected converters to be multiply driven.

Figure 20A:
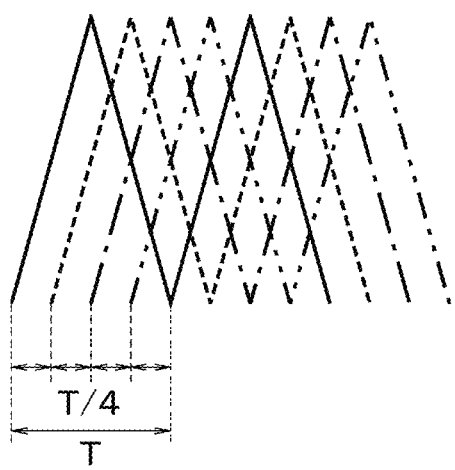
FIGS. 20A and 20B are diagrams that schematically illustrate an advantageous effect achieved by a modification related to the first to third embodiments.
Figure 20B:
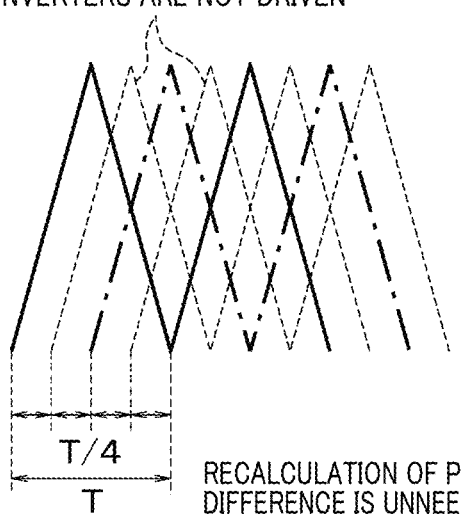

In contrast, as illustrated in FIG. 20A, the multiply-driven number n equal 4 is set so that four selected converters, such as the first to fourth selected converters 5u1 to 5u4, are multiply driven. At that time, if the multiply-driven number n equal 4 is switched to half, i.e., 2, deactivating the second and fourth selected converters 5u2 and 5u4 enables two selected converters, such as the first and third selected converters 5u1 and 5u3, to be multiply driven without recalculation of the phase difference $T_d$. This results in a reduction in the processing load of the controller 10.

Fourth Embodiment

The following describes a drive system 101 according to the fourth embodiment with reference to FIGS. 21 to 24. At least part of the structure and/or at least some functions of the drive system 101 is identical to that of the drive system 10 according to the first embodiment except for the following points. So, the following describes mainly the different points.

The drive system 101 according to the fourth embodiment is configured to smoothly change each of three-phase currents Iu, Iv, and Iw based on multiple drive pulses in accordance with change of the command current values $I_O$ while the multiply-driven number n is set to a constant value.

The three-phase inverter 3 of the drive system 101 includes a controller 10 for controlling each of the multiphase converters 6u, 6v, and 6w.

The controller 10 includes a control processor 35 serving as the control unit 11 and a pulse generator 112.

Figure 21:
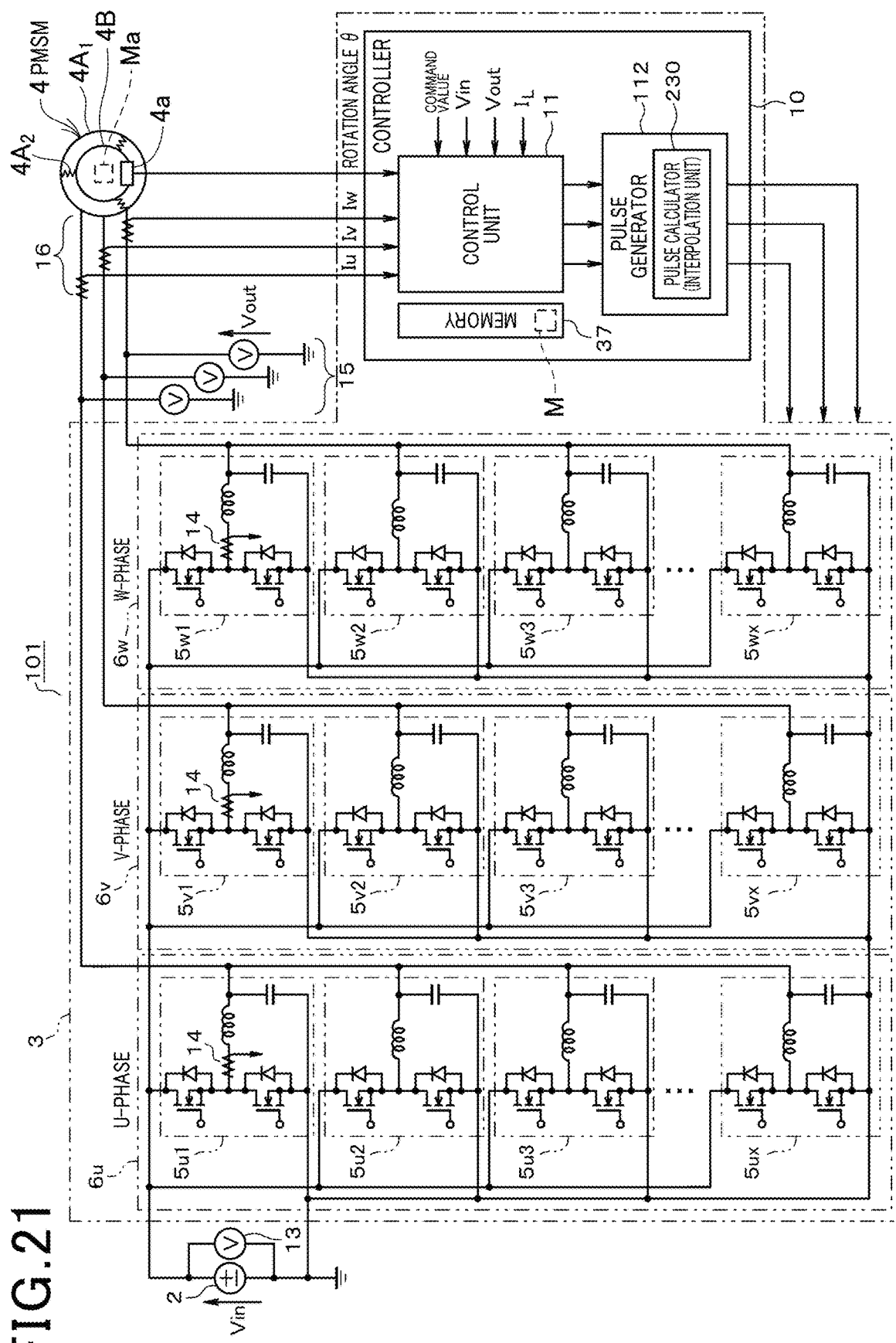
FIG. 21 is a circuit block diagram schematically illustrating an example of the overall configuration of a drive system according to the fourth embodiment of the present disclosure.

Referring to FIG. 21, the pulse generator 112 of the controller 10 includes a pulse calculator 230 serving as an interpolating unit configured to, when a value of the width of each drive pulse of a multiple drive-pulse train to be applied for a corresponding one of the selected converters 5 is changed to another value, generate an interpolation multiple-pulse train Pu to thereby cause each of the selected converters 5 to operate continuously in the boundary current mode.

For example, let us assume that the pulse calculator 230 of the pulse generator 112 changes a value of the width of each drive pulse of a previous kth multiple drive-pulse train to another value of the width of each drive pulse of a present (k+1)th multiple drive-pulse train; k is an integer more than or equal to 2. The phase difference between the turn-off times of each adjacent pair of drive pulses of the kth multiple drive-pulse train will be referred to as a kth phase difference $P_k$, and the phase difference between the turn-off times of each adjacent pair of drive pules of the (k+1)th multiple drive-pulse train will be referred to as a (k+1)th phase difference $P_{k+1}$.

In this assumption, the pulse calculator 230 is configured to generate the interpolation multiple-pulse train Pu between the kth multiple drive-pulse train and the (k+1)th multiple drive-pulse train such that the phase difference between the turn-off times of each adjacent pair of interpolation pulses of the interpolation multiple-pulse train Pu is preferably set to be within the range between the kth phase difference $P_k$ and the (k+1)th phase difference $P_{k+1}$ inclusive.

Specifically, it is preferable that the pulse calculator 230 generates the interpolation multiple pulses Pu as follows.

Figure 22:
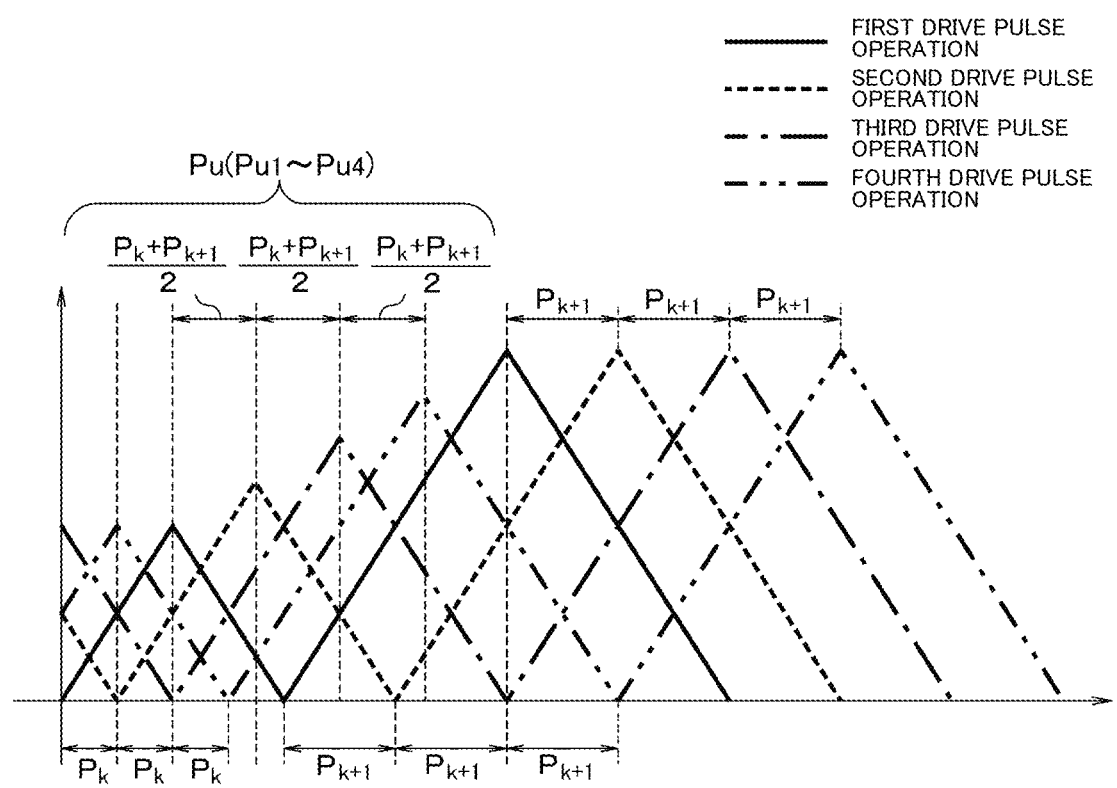
FIG. 22 is a graph schematically illustrating an example of an interpolation multiple-pulse train according to the fourth embodiment.

Referring to FIG. 22, the pulse calculator 230 is configured to generate the interpolation multiple-pulse train Pu between the previous kth multiple drive-pulse train and the present (k+1)th multiple drive-pulse train such that the phase difference, which will be referred to as $P_{ka}$, between the turn-off times of each adjacent pair of interpolation pulses of the interpolation multiple-pulse train Pu satisfies a linear interpolation algorithm based on the following expression (6):

$$P_{ka} = \frac{P_k + P_{k+1}}{2} \tag{6}$$

The pulse calculator 230 calculates the phase difference $P_{ka}$ between the turn-off times of each adjacent pair of interpolation pulses of the interpolation multiple-pulse train Pu in the above linear interpolation algorithm based on the above expression (6), but the present disclosure is not limited thereto.

Specifically, the pulse calculator 230 can be configured to generate the interpolation multiple-pulse train Pu between the kth multiple drive-pulse train and the (k+1)th multiple drive-pulse train such that the phase difference $P_{ka}$ between the turn-off times of each adjacent pair of interpolation pulses of the interpolation multiple-pulse train Pu lies within the range between the kth phase difference $P_k$ and the (k+1)th phase difference $P_{k+1}$ inclusive. This configuration enables a kth output current from the selected converters 5 based on the kth multiple drive-pulse train and a (k+1)th output current from the selected converters 5 based on the (k+1)th multiple drive-pulse train to be smoothly interpolated by an interpolation current from the selected converters 5 based on the interpolation multiple-pulse train Pu. This smooths an output current from each of the multiple converters 6u, 6v, and 6w.

Like the first embodiment, the pulse calculator 230 of the pulse generator 112 includes the pulse controller 23a and the counter module 24 that includes, for example, the pulse width counter 24a, the start phase counter 24b, and the end phase counter 24c.

Figure 23:
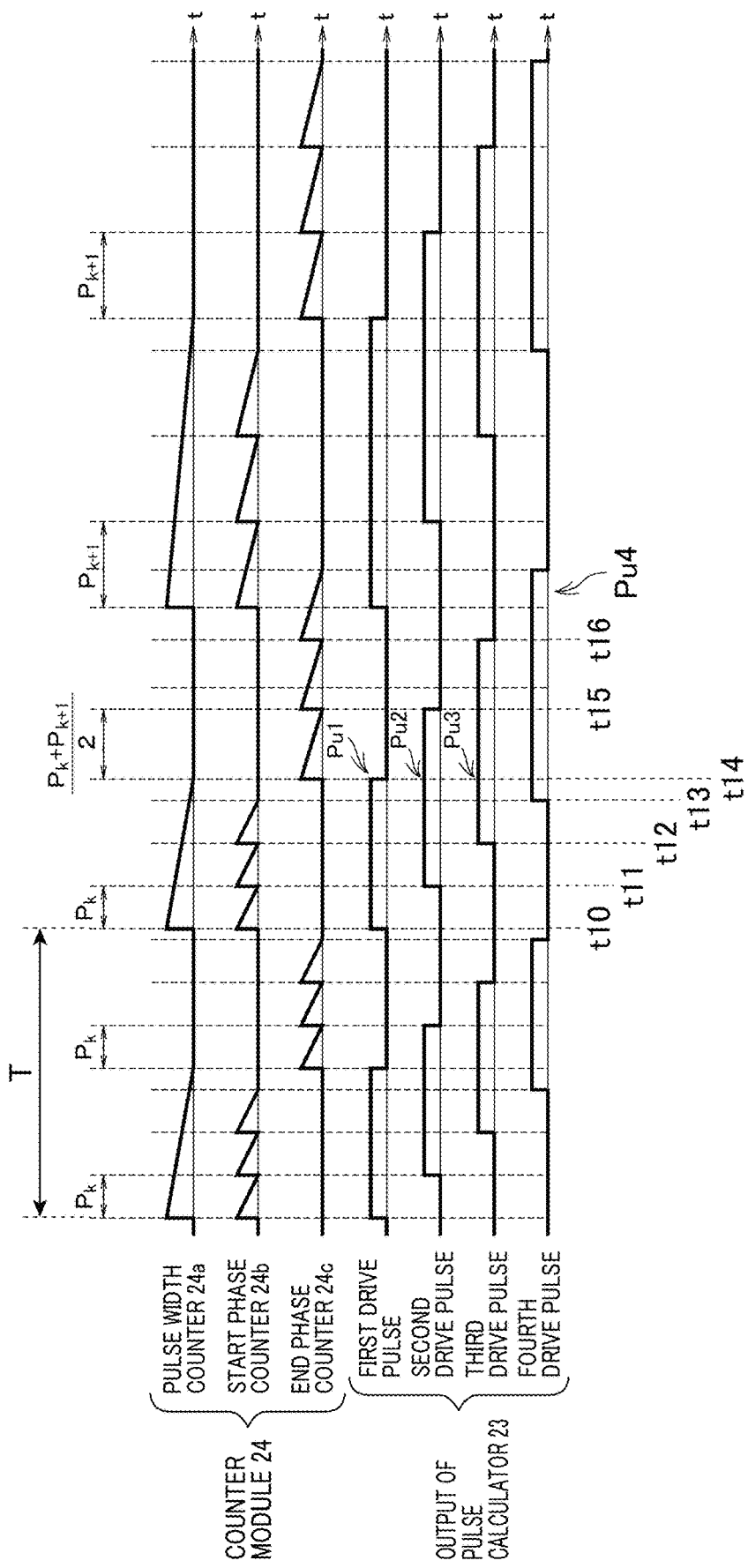
FIG. 23 is a timing chart schematically illustrating how first to fourth interpolation pulses included in an interpolation multiple-pulse train are generated according to the fourth embodiment.
Figure 24:
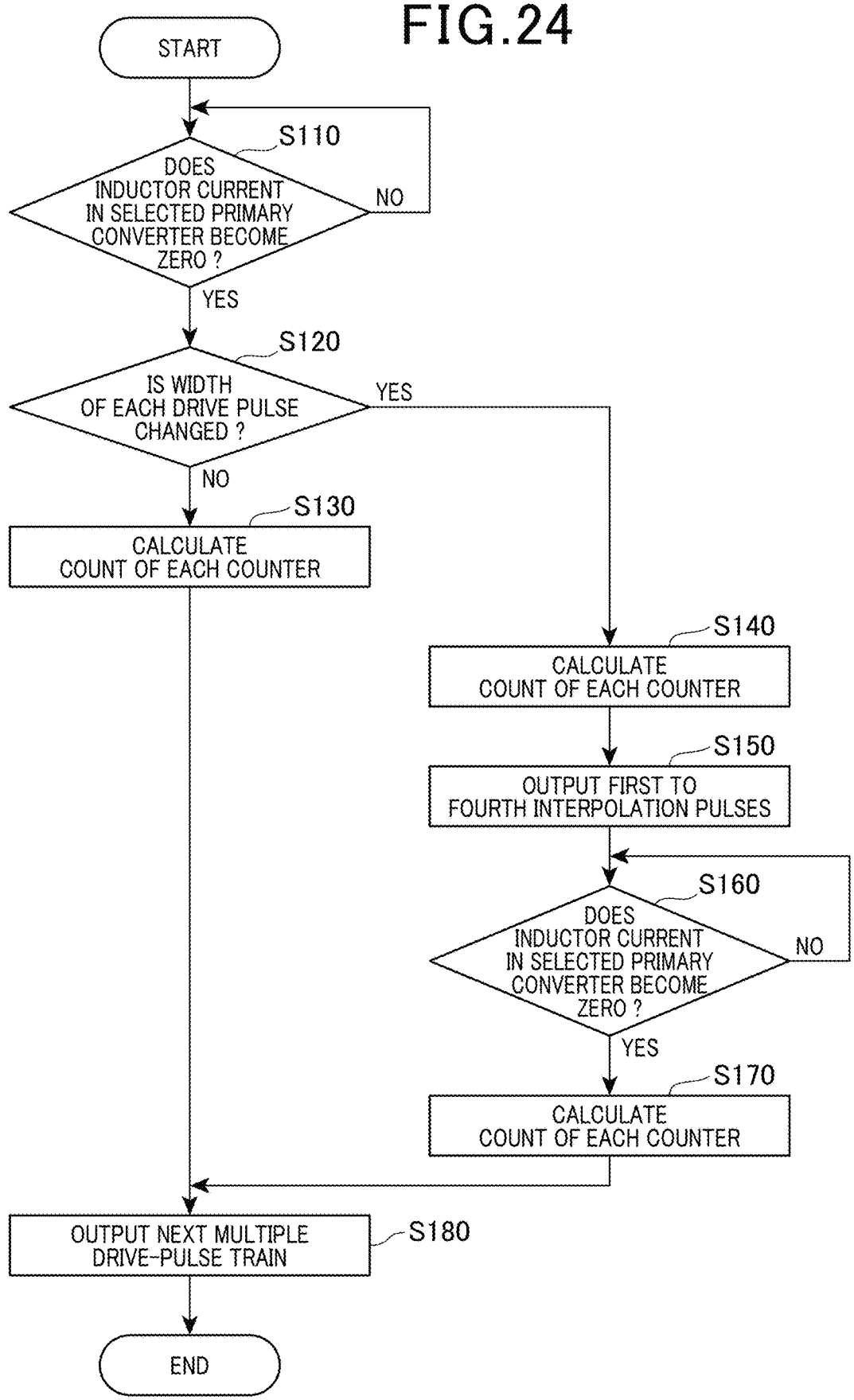
FIG. 24 is a flowchart schematically illustrating an example of the procedure of an interpolation pulse generation routine carried out by a controller according to the fourth embodiment.

The following describes how the pulse calculator 230 calculates the interpolation multiple-pulse train Pu for the U-phase multiphase converter 6u using the counters 24a to 24c with reference to FIGS. 23 and 24. How the pulse calculator 230 calculates the interpolation multiple-pulse train Pv for the V-phase multiphase converter 6v and how the pulse calculator 230 calculates the interpolation multiple-pulse train Pw for the W-phase multiphase converter 6w are substantially identical to how the pulse calculator 230 calculates the interpolation multiple-pulse train Pu for the U-phase multiphase converter 6u.

Note that the pulse calculator 230 performs an interpolation pulse generation routine illustrated in FIG. 24 when it is assumed that the first to fourth converters 5u1 to 5u4 are selected to be multiply driven. In addition, the pulse calculator 230 performs the interpolation pulse generation routine in response to the turn-off of the fourth drive pulse for driving the selected converter 5u4 in the previous kth multiple drive-pulse train with the phase difference $T_d$ equal to $P_k$.

When starting the interpolation pulse generation routine, the control processor 35 serves as the pulse controller 23a of the pulse calculator 230 to determine whether the inductor current $I_L$ from the first selected converter 5u1, i.e., selected primary converter 5u1, becomes zero in step S110.

In response to determination that the inductor current $I_L$ from the first selected converter 5u1 does not become zero (NO in step S110), the pulse controller 23a of the pulse calculator 230 repeats the determination in step S110.

Otherwise, in response to determination that the inductor current $I_L$ from the first selected converter 5u1 becomes zero (YES in step S110), the interpolation pulse generation routine proceeds to step S120.

In step S120, the control processor 35 serves as the pulse controller 23a of the pulse calculator 230 to calculate, based on the feedback information about the input voltage $V_{in}$, the output voltage $V_{out}$ for each phase, each of the phase currents Iu, Iv, and Iw, and the angular velocity ω, values of the respective parameters, i.e., the period T, on-duration $T_{on}$, off-duration $T_{off}$, and phase difference $T_d$, for a present (k+1)th multiple drive-pulse train for the selected converters 5u1 to 5u4.

In step S120, the control processor 35 serves as the pulse controller 23a of the pulse calculator 230 to determine whether the width, i.e., the on-duration $T_{on}$, of each drive pulse of the present (k+1)th multiple drive-pulse train is changed from the width, i.e., the on-duration $T_{on}$, of each drive pulse of the previous kth multiple drive-pulse train.

In response to determination that the width of each drive pulse of the present (k+1)th multiple drive-pulse train is unchanged from the width of each drive pulse of the kth multiple drive-pulse train (NO in step S120), the interpolation pulse generation routine proceeds to step S130.

In step S130, the control processor 35 serves as the pulse controller 23a of the pulse calculator 230 to set (i) the count of the pulse width counter 24a to the predetermined value corresponding to the on-duration Ton for the (k+1)th multiple drive-pulse train (ii) the count of the start phase counter 24b to the predetermined value corresponding to the phase difference $T_d$ equal to $P_{k+1}$ for the (k+1)th multiple drive-pulse train, and (iii) the count of the end phase counter 24c to the predetermined value corresponding to the phase difference $T_d$ equal to $P_{k+1}$ for the (k+1)th multiple drive-pulse train. Thereafter, the interpolation pulse generation routine proceeds to step S180.

Otherwise, in response to determination that the width of each drive pulse of the next (k+1)th multiple drive-pulse train is changed from the width of each drive pulse of the kth multiple drive-pulse train (YES in step S120), the interpolation pulse generation routine proceeds to step S140.

In step S140, the control processor 35 serves as the pulse controller 23a of the pulse calculator 230 to calculate, based on the feedback information, values of the respective parameters, i.e., the period T, on-duration $T_{on}$, off-duration $T_{off}$, and phase difference $T_d$ equal to, for example, $(P_k+P_{k+1})/2$, for each of first to fourth interpolation pulses Pu1 to Pu4 of an interpolation multiple-pulse train Pu for the selected converters 5u1 to 5u4.

Then, the control processor 35 serves as the pulse controller 23a of the pulse calculator 230 to set (i) the count of the pulse width counter 24a to the predetermined value corresponding to the on-duration Ton for the first interpolation pulse 5u1, (ii) the count of the start phase counter 24b to the predetermined value corresponding to the previous phase difference $T_d$ equal to $P_k$ for the first interpolation pulse 5u1, and (iii) the count of the end phase counter 24c to the predetermined value corresponding to the phase difference $T_d$ equal to $(P_k+P_{k+1})/2$ for the first interpolation pulse 5u1 in step S140.

Figure 7:
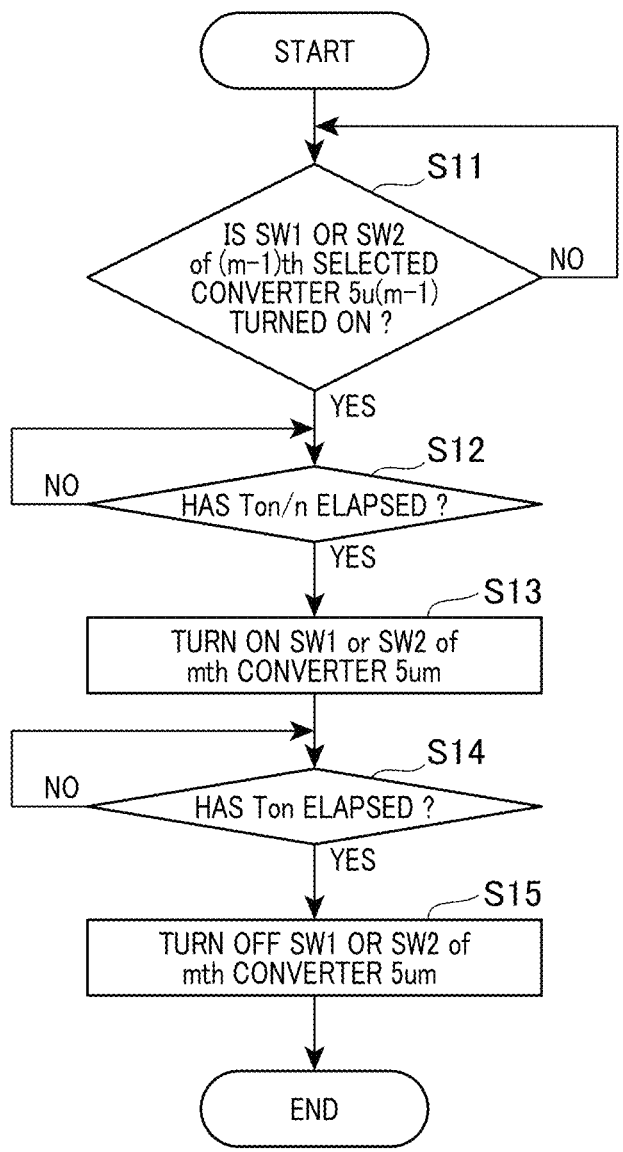
FIG. 7 is a flowchart schematically illustrating an example of a multiphase-drive subroutine included in FIG. 5.

Then, in step S150, the control processor 35 serves as the gate driver 21 to sequentially output the first interpolation pulse Pu1, the second interpolation pulse Pu2, the third interpolation pulse Pu3, and the fourth interpolation pulse Pu4 in the same manner as sequential output of the drive pulses of the multiple drive-pulse train using the counters 24a to 24c described in the first embodiment with reference to with reference to FIGS. 5 to 7.

That is, as illustrated in FIG. 23, the first interpolation pulse Pu1 is outputted to the first selected converter 5u1 at time t10, and the output of the first interpolation pulse Pu1 is stopped at t14 when the count set to the pulse width counter 24a becomes zero.

The second interpolation pulse Pu2 is outputted to the second selected converter 5u2 at time t11 when the count set to the start phase counter 24b becomes zero, and the output of the second interpolation pulse Pu2 is stopped at time t15 when the count set to the end phase counter 24c becomes zero.

The third interpolation pulse Pu3 is outputted to the third selected converter 5u3 at time t13 when the count newly set to the start phase counter 24b becomes zero, and the output of the third interpolation pulse Pu3 is stopped at time t16 when the count newly set to the end phase counter 24c becomes zero.

The fourth interpolation pulse Pu4 is outputted to the fourth selected converter 5u4 at time t14 when the count newly set to the start phase counter 24b becomes zero, and the output of the fourth interpolation pulse Pu4 is stopped at time t17 when the count newly set to the end phase counter 24c becomes zero.

Following the operation in step S150, the control processor 35 serves as the controller 23a of the pulse calculator 230 to determine whether the inductor current $I_L$ from the first selected converter 5u1, i.e., selected primary converter 5u1, becomes zero in step S160.

In response to determination that the inductor current $I_L$ from the first selected converter 5u1 does not become zero (NO in step S160), the pulse controller 23a of the pulse calculator 230 repeats the determination in step S160.

Otherwise, in response to determination that the inductor current $I_L$ from the first selected converter 5u1 becomes zero (YES in step S160), the interpolation pulse generation routine proceeds to step S170.

In step S170, the control processor 35 serves as the pulse controller 23a of the pulse calculator 230 to calculate, based on the feedback information, values of the respective parameters, i.e., the period T, on-duration $T_{on}$, off-duration $T_{off}$, and phase difference $T_d$, for the present (k+1)th multiple drive-pulse train for the selected converters 5u1 to 5u4. Then, the interpolation pulse generation routine proceeds to step S180.

In step S180, the control processor 35 serves as the gate driver 21 to sequentially output the first drive pulse, the second drive pulse, the third drive pulse, and the fourth drive pulse to the respective first to fourth selected converters 5u1 to 5u4 in the same manner as the sequential output of the drive pulses of the multiple drive-pulse train using the counters 24a to 24c described in the first embodiment with reference to FIGS. 5 to 7. Thereafter, the interpolation pulse generation routine is terminated.

The above interpolation pulse generation routine illustrated in the flowchart of FIG. 24 is designed simply as sequential processing of the operations in steps S110 to S180, but can be configured such that at least some of the operations in steps S110 to S180 are designed as parallel processing.

A comparative example calculates the width of a pulse to be inputted to a selected primary converter as an interpolation between multiphase drive-pulse trains, and calculates the width of a pulse to be inputted to each selected secondary converter as an interpolation between the multiphase drive-pulse trains. The comparative example results in a risk of an increase in an output current from the whole of the selected primary and secondary converters.

In contrast, the drive system 101 according to the fourth embodiment is configured to generate an interpolation multiple-pulse train Pu between a kth multiple drive-pulse train, which is a pre-interpolation drive-pulse train, and a (k+1)th multiple drive-pulse train, which is a post-interpolation drive-pulse train, in accordance with the phase difference between the kth multiple drive-pulse train and (k+1)th multiple drive-pulse train to thereby enable the phase difference between the kth multiple drive-pulse train and (k+1)th to be linearly interpolated.

As a typical example, the drive system 101 is configured to generate the interpolation multiple-pulse train Pu such that the phase difference between each adjacent pair of interpolation pulses of the interpolation multiple-pulse train Pu lies within the range between (i) the phase difference $P_k$ between each adjacent pair of drive pulses of the kth multiple drive-pulse train, i.e., the pre-interpolation drive-pulse train, and (ii) the phase difference $P_{k+1}$ between each adjacent pair of drive pulses of the (k+1)th multiple drive-pulse train, i.e., the post-interpolation drive-pulse train. This enables a kth output current from the selected converters 5 based on the kth multiple drive-pulse train and a (k+1)th output current from the selected converters 5 based on the (k+1)th multiple drive-pulse train to be smoothly interpolated by an interpolation current from the selected converters 5 based on the interpolation multiple-pulse train Pu. This smooths the output current from each of the multiple converters 6u, 6v, and 6w.

The drive system 101 according to the fourth embodiment is additionally configured to set the phase difference between each adjacent pair of interpolation pulses of the interpolation multiple-pulse train Pu to the same constant value. This configuration therefore makes it possible to determine the phase difference between each adjacent pair of interpolation pulses of the interpolation multiple-pulse train Pu using only a single calculation operation.

As a typical example, the controller 10 of the drive system 101 according to the fourth embodiment is additionally configured to calculate, as the phase difference between each adjacent pair of interpolation pulses of the interpolation multiple-pulse train Pu, an average between (i) the phase difference $P_k$ between each adjacent pair of drive pulses of the kth multiple drive-pulse train and (ii) the phase difference $P_{k+1}$ between each adjacent pair of drive pulses of the (k+1)th multiple drive-pulse train. This therefore results in a reduction in the processing load of the controller 10 as compared with that of a controller of the above comparative example.

For example, the memory 37 can store map information M in data-table format, in mathematical expression format, and/or program format (see FIG. 21). The map information M includes a relationship between
  (1) Values of the multiply-driven number n of converters 5 to be multiply driven
  (2) Values of the width of each interpolation pulse in the interpolation multiple-pulse train Pu
  (3) Values of the phase difference between each adjacent pair of interpolation pulses of the interpolation multiple-pulse train Pu That is, the controller 23a of the pulse calculator 230 can be configured to
  1. Refer to the map information M
  2. Extract, from the map information M, a value of the width of each interpolation pulse in the interpolation multiple-pulse train Pu and a value of the phase difference between each adjacent pair of interpolation pulses of the interpolation multiple-pulse train Pu such that the extracted value of the width of each interpolation pulse in the interpolation multiple-pulse train Pu and the extracted value of the phase difference between each adjacent pair of interpolation pulses of the interpolation multiple-pulse train Pu correlate with a present value of the multiply-driven number n of converters 5 to be multiply driven in the map information M

Fifth Embodiment

Figure 25:
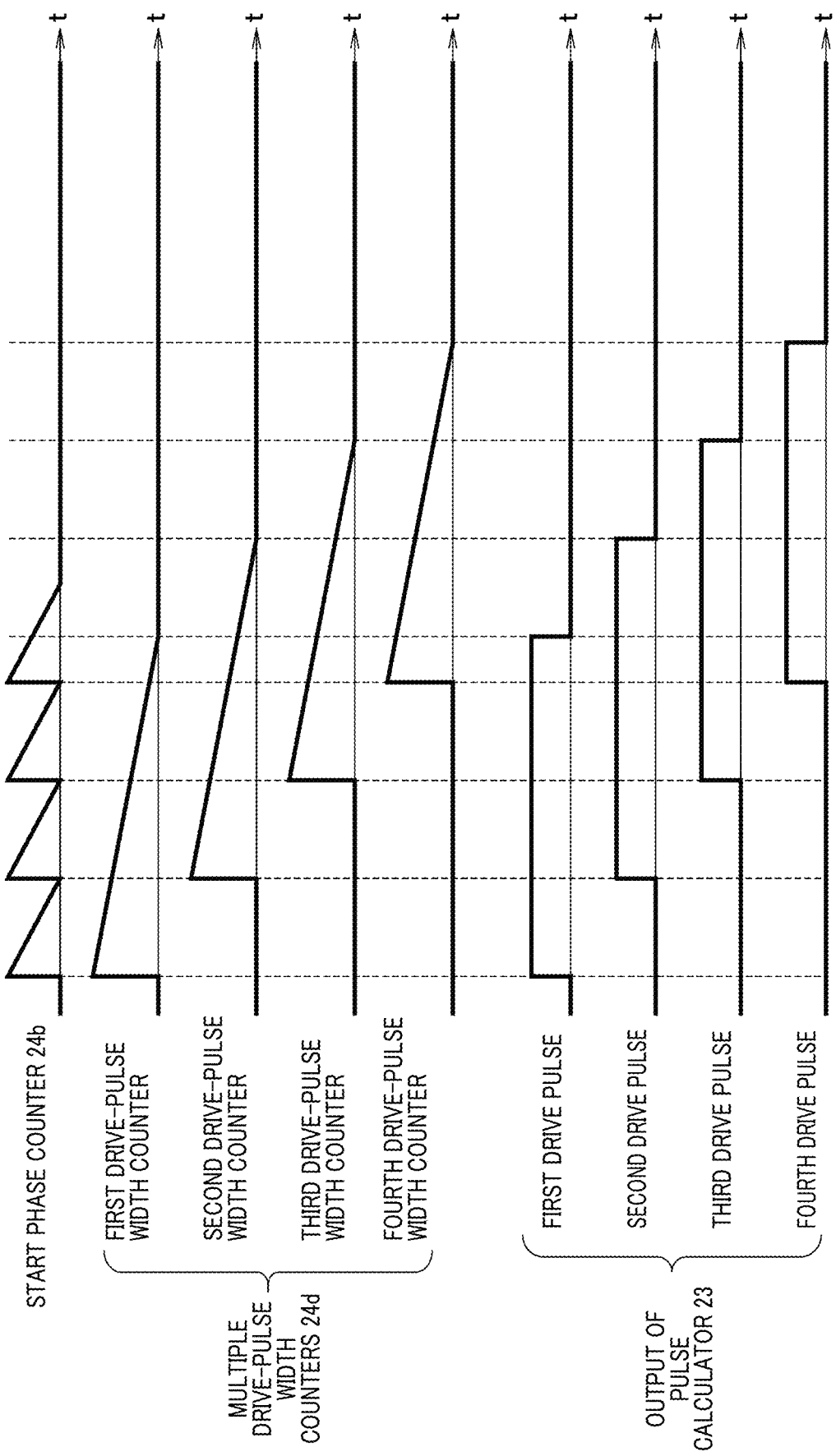
FIG. 25 is a timing chart schematically illustrating how a pulse calculator generates an interpolation multiple-pulse train according to the fifth embodiment of the present disclosure.
Figure 26:
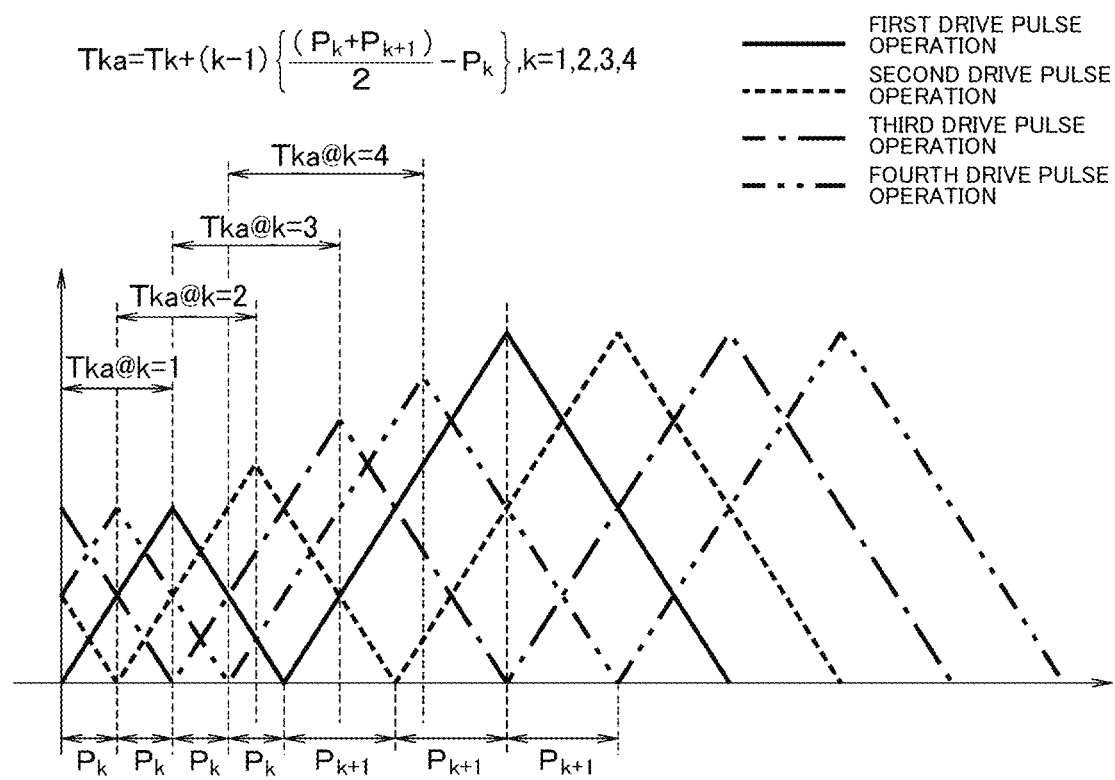
FIG. 26 is a graph schematically illustrating an example of an interpolation multiple-pulse train generated in the fifth embodiment.

The following describes a drive system according to the fifth embodiment with reference to FIGS. 25 and 26. The structure and/or functions of the drive system according to the fifth embodiment are mainly identical to those of the drive system according to the fourth embodiment except for the following points. The following therefore describes mainly the different points.

As illustrated in FIG. 25, the pulse calculator 230 is comprised of the pulse controller 23a, the start phase counter 24b, and a plurality of multiple drive-pulse width counters 24d.

The start phase counter 24b is configured to determine the start timing of each of a second drive pulse to an nth drive pulse included in a kth multiphase drive-pulse train to the corresponding one of the second to nth selected converters 5u2 to 5un. In the fifth embodiment, for the sake of simplification, the multiply-driven number n of converters 5 to be multiply driven is set to 4.

Each of first to nth drive-pulse width counters 24d is configured to measure the width of the corresponding one of the first to fourth drive pulses.

The pulse controller 23a of the pulse calculator 230 resets the count of the start phase counter 24b to the predetermined value corresponding to the phase difference $P_k$ of the kth multiphase drive-pulse train in response to determination that the inductor current $I_L$ becomes zero by the zero-current determiner 22. Then, the pulse controller 23a of the pulse calculator 230 decrements the count, and reset the count to the predetermined value when the count becomes zero.

This enables (i) the start phase, i.e., the start timing, of each of the first to fourth drive pulses of the kth multiphase drive-pulse train to be determined based on the corresponding one of the reset times of the start phase counter 24b, and (ii) the phase difference $P_k$ of the kth multiphase drive-pulse train to be calculated.

The pulse controller 23a of the pulse calculator 230 sets the count of each of the first to fourth drive-pulse width counter 24d to a predetermined value corresponding to the on-duration $T_{on}$ of the corresponding one of the first to fourth drive pulses in the kth multiphase drive-pulse train.

Then, the pulse controller 23a starts to decrement the count of each of the first to fourth drive-pulse width counters 24d in response to the corresponding one of the rest times of the start phase counter 24b, thus measuring, by the count of each of the first to fourth drive-pulse width counters 24d, an actual width of the corresponding one of the first to fourth drive pulses in the kth multiphase drive-pulse train.

Like the fourth embodiment, let us consider a case where a previous kth multiple drive-pulse train and a present (k+1)th multiple drive-pulse train are applied to the first to fourth selected converters 5 while a value of the width of each drive pulse of the kth multiple drive-pulse train is changed to another value of the width of each drive pulse of the present (k+1)th multiple drive-pulse train.

The phase difference between each adjacent pair of drive pulses of the kth multiple drive-pulse train will be referred to as a kth phase difference $P_k$, and the phase difference between each adjacent pair of drive pules of the (k+1)th multiple drive-pulse train will be referred to as a (k+1)th phase difference $P_{k+1}$.

The width of each drive pulse of the kth multiple drive-pulse train will be referred to as a kth pulse width $T_k$, and the width of each drive pulse of the (k+1)th multiple drive-pulse train will be referred to as a (k+1)th phase difference $P_{k+1}$.

In the above case, the pulse calculator 230 is configured to generate the interpolation multiple-pulse train Pu between the kth multiple drive-pulse train and the (k+1)th multiple drive-pulse train such that the pulse width $T_{ka}$ of each interpolation pulse of the interpolation multiple-pulse train Pu satisfies the following expression (7):

$$T_{ka} = T_k + (k-1) \cdot \left( \frac{P_k + P_{k+1}}{2} - P_k \right) \tag{7}$$

That is, as illustrated in FIG. 26, the pulse width $T_{1a}$ of the first interpolation pulse of the interpolation multiple-pulse train Pu upon k equal to 1, the pulse width $T_{2a}$ of the second interpolation pulse of the interpolation multiple-pulse train Pu upon k equal to 2, the pulse width $T_{1a}$ of the third interpolation pulse of the interpolation multiple-pulse train Pu upon k equal to 3, and the pulse width $T_{4a}$ of the fourth interpolation pulse of the interpolation multiple-pulse train Pu upon k equal to 4 are each calculated in accordance with the above expression (7).

As described above, the pulse controller 23a of the pulse calculator 230 is configured to calculate, using the start phase counter 24b, the phase difference $P_k$ of the kth multiphase drive-pulse train and the phase difference $P_{k+1}$ of the (k+1)th multiphase drive-pulse train.

Additionally, the pulse controller 23a of the pulse calculator 230 is configured to calculate, using the first to fourth pulse width counters 24d, (I) The width $T_k$ of each drive pulse of the kth multiphase drive-pulse train
(II) The width $T_{k+1}$ of each drive pulse of the (k+1)th multiphase drive-pulse train
(III) The width $T_{ka}$ of each interpolation pulse of the interpolation multiple-pulse train Pu between the kth multiphase drive-pulse train and the (k+1)th multiphase drive-pulse train This enables the kth multiphase drive-pulse train, the (k+1)th multiphase drive-pulse train, and the interpolation multiple-pulse train Pu between the kth multiphase drive-pulse train and the (k+1)th multiphase drive-pulse train to be calculated.

The drive system according to the fifth embodiment therefore achieves the same advantageous benefits as those achieved by the drive system 101 according to the fourth embodiment.

Second Modification of Fourth and Fifth Embodiments

The following describes a second modification of the feedback control system according to each of the fourth and fifth embodiments with reference to FIGS. 27 to 31.

In this second modification and the fourth embodiment, descriptions of like parts between this second modification and the fourth embodiment, to which like reference characters are assigned, are omitted or simplified to avoid redundant descriptions.

Figure 27:
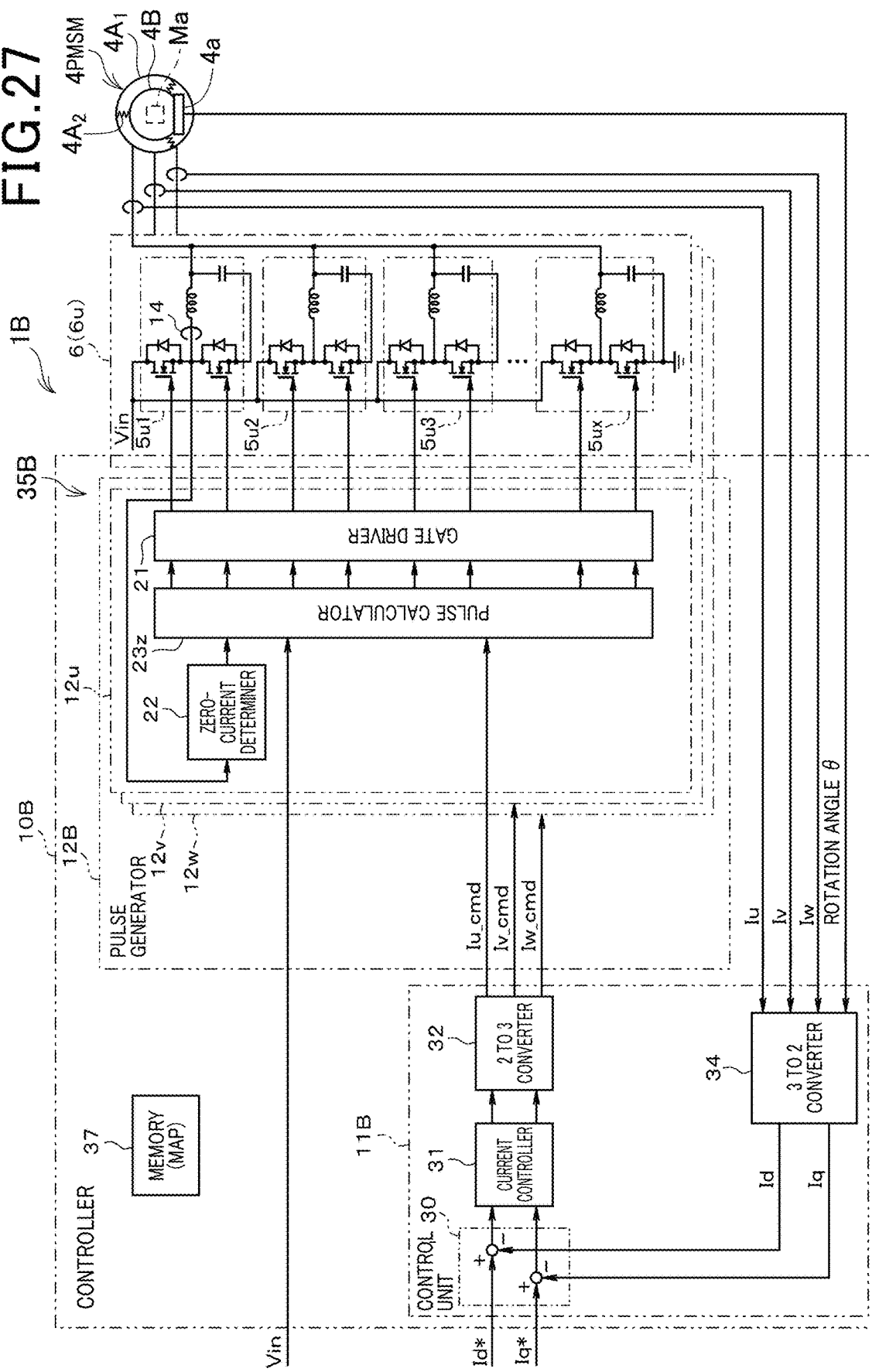
FIG. 27 is a circuit block diagram schematically illustrating an example of the overall configuration of a drive system according to the second modification of the feedback control system according to each of the fourth and fifth embodiments.

Referring to FIG. 27, a drive system 1B according to this second modification includes a controller 10B, which serves as a feedback control system of the drive system 1B according to this second modification.

The controller 10B, which includes the functions of the controller 101 of the fourth embodiment, is comprised of a control processor 35B and the memory device 37, and the control processor 35B functionally includes a control unit 11B and a pulse generator 12B.

Like the control unit 11A, the control unit 11B functionally includes, for example, the subtractor 30, the current controller 31, the two-phase to three-phase coordinate converter 32, and the three-phase to two-phase coordinate convertor 34. In FIG. 27, the two-phase to three-phase coordinate converter 32 will be illustrated as "2 TO 3 CONVERTER 32", and the three-phase to two-phase coordinate converter 34 will be illustrated as "3 TO 2 CONVERTER 34".

The ECU 500 is configured to calculate a d-axis command current value Id* and a q-axis command current value Iq* in a d-q coordinate system of the rotor 4B of the motor 4 in accordance with, for example, the request torque. Each of the command current value Id* and q-axis command current value Iq* serves as a corresponding one of the command current values $I_O$ according to the second modification.

Each of the d-axis command current value Id* and q-axis command current value Iq* is inputted to the control unit 11B from the ECU 500 every predetermined update cycle. The set of the d-axis command current values Id* and the set of the q-axis command current value Iq* respectively have a desired pseudo sinusoidal waveform with a predetermined AC period.

The three-phase to two-phase converter 34 is configured to calculate the angular velocity ω of the rotor 4B based on the rotation angle θ of the motor 4, i.e., the rotor 4B, and convert the U-, V-, and W-phase phase currents Iu, Iv, and Iw into a d-axis current Id and a q-axis current Iq in the d-q coordinate system as a function of the angular velocity ca.

The subtractor 30 is configured to subtract the d-axis current Id from the d-axis command current value Id* to thereby calculate a d-axis deviation ΔId, and subtract the q-axis current Iq from the q-axis command current value Iq* to thereby calculate a q-axis deviation ΔIq. The subtractor 30 is configured to output the d- and q-axis command current values Id* and Iq* to the current controller 31.

The current controller 31 is configured to perform, as a known feedback control task, the PI feedback control task using the d-axis current deviation ΔId as input data, and a proportional gain term and an integral gain term of the PI feedback control algorithm. The PI feedback control task calculates a d-axis manipulated variable Id_cmd for causing the d-axis current deviation ΔId to converge to zero.

Similarly, the current controller 31 is configured to perform, as a known feedback control task, the PI feedback control task using the q-axis current deviation ΔIq as input data, and a proportional gain term and an integral gain term of the PI feedback control algorithm. The PI feedback control task calculates a q-axis manipulated variable Iq_cmd for causing the q-axis current deviation ΔIq to converge to zero.

Then, the current controller 31 is configured to output, to the two-phase to three-phase coordinate converter 32, the d-axis manipulated variable Id_cmd and q-axis manipulated variable Iq_cmd to the two-phase to three-phase coordinate converter 32.

The two-phase to three-phase converter 32 is configured to convert, as a function of the angular velocity ω, the d-axis manipulated variable Id_cmd and q-axis manipulated variable Iq_cmd into three-phase (U-, V-, and W-phase) manipulated variables Iu_cmd, Iv_cmd, and Iw_cmd, and output, to the pulse generator 12B, the three-phase manipulated variables Iu_cmd, Iv_cmd, and Iw_cmd.

The pulse generator 12B functionally includes the U-phase pulse generation block 12u, the V-phase pulse generation block 12v, and the W-phase pulse generation block 12w.

Each of the U-, V-, and W-phase generation blocks 12u, 12v, and 12w functionally includes, for example, the gate driver 21, the zero-current determiner 22, and a pulse calculator 23Z. Each of the three-phase manipulated variables Iu_cmd, Iv_cmd, and Iw_cmd is inputted to the pulse calculator 23Z of the corresponding one of the U-, V-, and W-phase generation blocks 12u, 12v, and 12w. The zero-current determiner 22 of each of the U-, V-, and W-phase generation blocks 12u, 12v, and 12w is configured to output, to the pulse calculator 23Z, zero-timing information each time of determining that the corresponding one of the three-phase manipulated variables Iu_cmd, Iv_cmd, and Iw_cmd becomes zero.

The pulse calculator 23Z of each of the U-, V-, and W-phase generation blocks 12u, 12v, and 12w is configured to 1. Select a predetermined number n of converters 5 to be driven in the parallelly-connected converters 5 of the corresponding one of the multiphase converters 6u, 6v, and 6w
2. Analyze, for example, the corresponding one of the three-phase command current values Iu_cmd, Iv_cmd, and Iw_cmd to thereby calculate, for each of the multiphase converters 6u, 6v, and 6w, values of the respective parameters, which include the period T, on-duration $T_{on}$, off-duration $T_{off}$, and phase difference $T_d$, for each multiphase (multiple) drive-pulse train that instructs the upper-arm switch SW1 of the selected converters 5 in the parallelly-connected converters 5 of the corresponding one of the multiphase converters 6u, 6v, and 6w to operate in the boundary current mode.

For example, if the command current value Iu_cmd inputted thereto every update cycle is more than or equal to zero, the pulse calculator 23Z of the U-phase generation block 12u calculates, based on the feedback information, values of the respective parameters, i.e., the period T, on-duration $T_{on}$, off-duration $T_{off}$, and phase difference $T_d$, for a multiphase drive-pulse train for the upper-arm switch SW1 of each of the selected converters 5u1 to 5un in accordance with, for example, the above expressions (1-1) to (1-4).

Similarly, if the command current value Iv_cmd inputted thereto every update cycle is more than or equal to zero, the pulse calculator 23Z of the V-phase generation block 12v calculates, based on the feedback information, values of the respective parameters, i.e., the period T, on-duration $T_{on}$, off-duration $T_{off}$, and phase difference $T_d$, for a multiphase drive-pulse train for the upper-arm switch SW1 of each of the selected converters 5v1 to 5vn in accordance with, for example, the above expressions (1-1) to (1-4).

Additionally, if the command current value Iw_cmd inputted thereto every update cycle is more than or equal to zero, the pulse calculator 23Z of the W-phase generation block 12w calculates, based on the feedback information, values of the respective parameters, i.e., the period T, on-duration $T_{on}$, off-duration $T_{off}$, and phase difference $T_d$, for a multiphase drive-pulse train for the upper-arm switch SW1 of each of the selected converters 5w1 to 5wn in accordance with, for example, the above expressions (1-1) to (1-4).

The pulse calculator 23Z of each of the U-, V-, and W-phase generation blocks 12u, 12v, and 12w is also configured to 1. Select the predetermined number n of converters 5 to be driven in the parallelly-connected converters 5 of the corresponding one of the multiphase converters 6u, 6v, and 6w
2. Analyze, for example, the corresponding one of the three-phase command current values Iu_cmd, Iv_cmd, and Iw_cmd to thereby calculate, for each of the multiphase converters 6u, 6v, and 6w, values of the respective parameters, which include the period T, on-duration $T_{on}$, off-duration $T_{off}$, and phase difference $T_d$, for each multiphase (multiple) drive-pulse train that instructs the lower-arm switch SW2 of the selected converters 5 in the parallelly-connected converters 5 of the corresponding one of the multiphase converters 6u, 6v, and 6w to operate in the boundary current mode
3. Generate, based on the values of the parameters, i.e., the period T, on-duration $T_{on}$, off-duration $T_{off}$, and phase difference $T_d$, the multiphase drive-pulse train every predetermined period T For example, if the command current value Iu_cmd inputted thereto every update cycle is less than zero, the pulse calculator 23Z of the U-phase generation block 12u calculates, based on the feedback information, values of the respective parameters, i.e., the period T, on-duration $T_{on}$, off-duration $T_{off}$, and phase difference $T_d$, for a multiphase drive-pulse train for the lower-arm switch SW2 of each of the selected converters 5u1 to 5un in accordance with, for example, the above expressions (2-1) to (2-4).

Similarly, if the command current value Iv_cmd inputted thereto every update cycle is less than zero, the pulse calculator 23Z of the V-phase generation block 12v calculates, based on the feedback information, values of the respective parameters, i.e., the period T, on-duration $T_{on}$, off-duration $T_{off}$, and phase difference $T_d$, for a multiphase drive-pulse train for the lower-arm switch SW2 of each of the selected converters 5v1 to 5vn in accordance with, for example, the above expressions (2-1) to (2-4).

Additionally, if the command current value Iw_cmd inputted thereto every update cycle is less than zero, the pulse calculator 23Z of the W-phase generation block 12w calculates, based on the feedback information, values of the respective parameters, i.e., the period T, on-duration $T_{on}$, off-duration $T_{off}$, and phase difference $T_d$, for a multiphase drive-pulse train for the lower-arm switch SW2 of each of the selected converters 5w1 to 5wn in accordance with, for example, the above expressions (2-1) to (2-4).

If the pulse calculator 23Z of each of the U-, V-, and W-phase generation blocks 12u, 12v, and 12w has the same configuration as that of the pulse calculator 230 of the fourth embodiment, the pulse calculator 230 calculates the first to fourth interpolation pulses Pu1 to Pu4 upon the multiply-driven number n being set to 4 in accordance with FIGS. 23 and 28A.

Specifically, the pulse controller 23a of the pulse calculator 230 calculates values of the respective parameters including the period T, on-duration $T_{on}$, off-duration $T_{off}$, and phase difference $P_{k+1}$ for a present (k+1)th multiphase drive-pulse train to thereby calculate the first interpolation pulse Pu1 using the pulse width counter 24a, and calculates each of the second to fourth interpolation pulses Pu2 to Pu4 using the start phase counter 24b (see a block B1 in FIG. 28A). Then, the pulse controller 23a of the pulse calculator 230 calculates the phase difference $T_d$ equal to the average value of the previous phase difference $P_k$ and the present phase difference $P_{k+1}$, which is expressed by $(P_k+P_{k+1})/2$ (see block B2 in FIG. 28B), and corrects the end phase of each of the second to fourth interpolation pulses Pu2 to Pu4 using the end phase counter 24c and the average value $(P_k+P_{k+1})/2$.

This enables the first to fourth interpolation pulses Pu1 to Pu4 to be generated as illustrated in FIG. 23.

The above method of generating the first to fourth interpolation pulses Pu1 to Pu4 enables each of the first to fourth converters 5u1 to 5u4 to operate continuously in the boundary current mode.

There is a case where it may be difficult for the pulse calculator 230 to continuously satisfy the necessary condition of the boundary current mode when each of U-, V-, and W-phase voltages Vu, Vv, and Vw across the corresponding one of the U-, V-, and W-phase coils 4A1 changes significantly.

Figure 29:
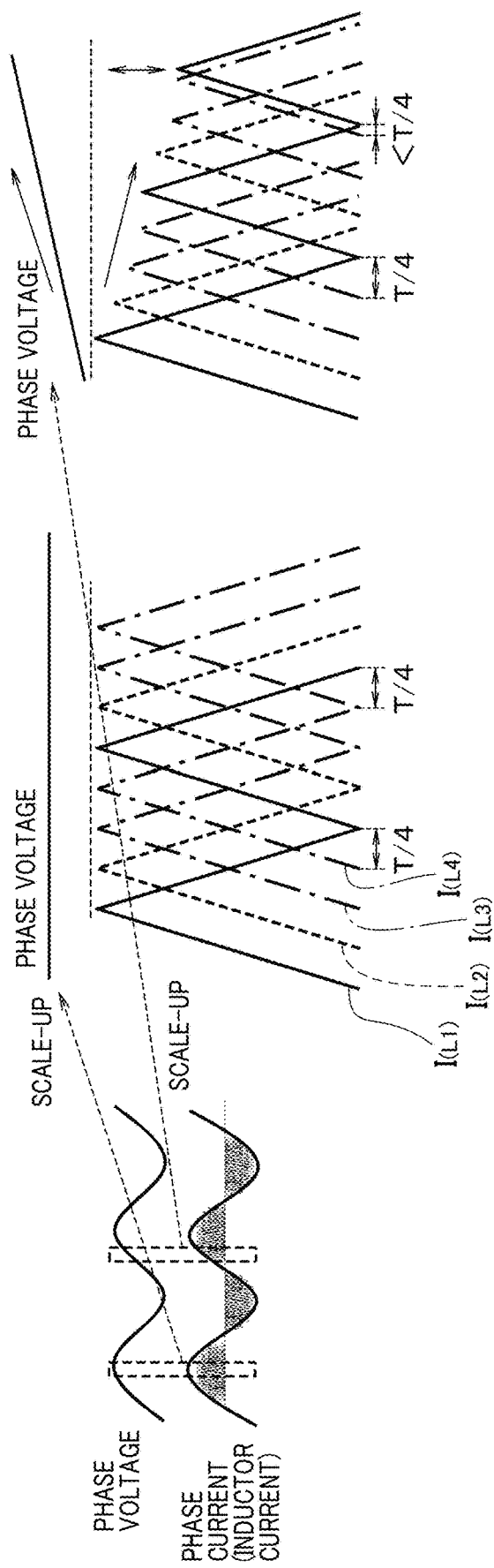
FIG. 29 is a graph schematically illustrating a comparison result between the comparative example and the second modification.

The following describes this case with reference to FIG. 29 for the U-phase as an example.

If the U-phase voltage Vu substantially has the positive peak or negative peak (see the center of FIG. 29), the first to fourth interpolation pulses Pu1 to Pu4 calculated by the pulse calculator 230 enable each of the first to fourth converters 5u1 to 5u4 to operate continuously in the boundary current mode.

In contrast, if it is a time for which the U-phase voltage Vu changes rapidly (see the right of FIG. 29), a value of the U-phase voltage Vu at a first point of time when the primary first interpolation pulse Pu1 is outputted is changed from another value of the U-phase voltage Vu at each second point of time when the corresponding one of the secondary second to fourth interpolation pulses Pu2 to Pu4 is outputted. This may result in the absolute positive or negative peak of each inductor current $I_{(L2)}$ to $I_{(L4)}$ for the corresponding one of the secondary second to fourth interpolation pulses Pu2 to Pu4 increasing or decreasing as compared with the corresponding absolute positive or negative peak of the inductor current $I_{(L1)}$ for the primary first interpolation pulse Pu1. This may cause the phase difference between, for example, the fourth interpolation pulse Pu4 and the first interpolation pulse Pu1 (see the right side of FIG. 29 and FIG. 30A) to become longer or shorter.

The sixth embodiment described later discloses a method of correcting the width of each of drive pulses, which include the interpolation pulses, in accordance with a back electromotive force generated by the motor 4. The method disclosed in the sixth method may however result in a case where it is difficult to continuously satisfy the necessary condition of the boundary current mode.

Figure 31A:
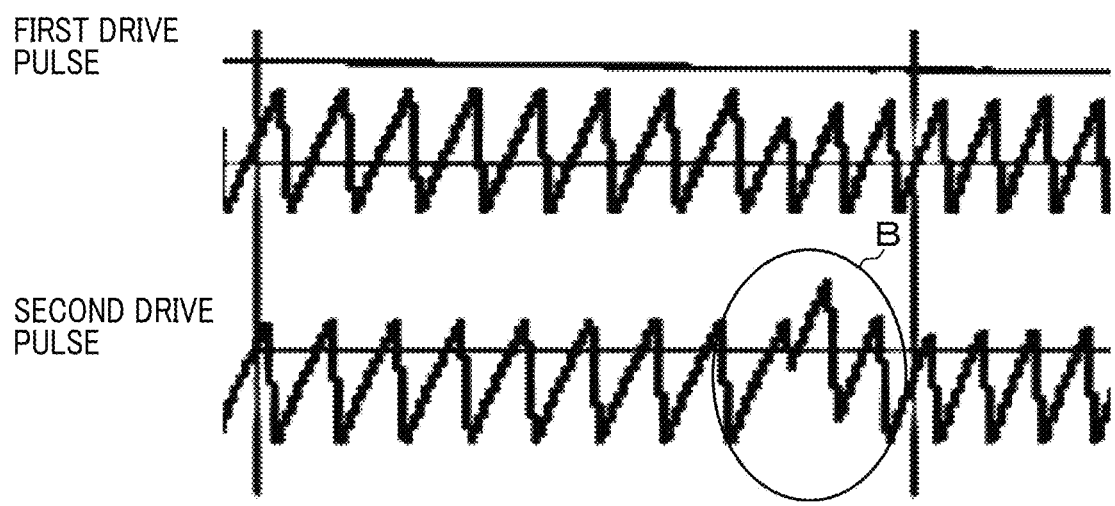
FIGS. 31A and 31B are graphs schematically illustrating an advantageous benefit achieved by the second modification.
Figure 31B:
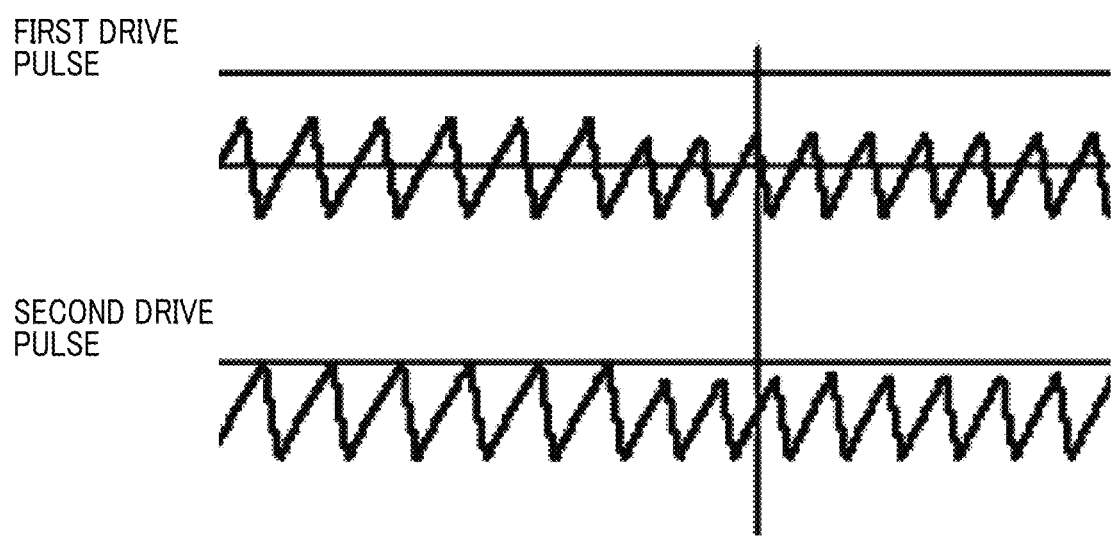

For example, FIG. 31A schematically illustrates how the first drive pulses in the multiphase drive-pulse trains are changed over time, and how the second drive pulses in the respective multiphase drive-pulse trains are changed over time if the pulse calculator 230 uses the configuration illustrated in FIG. 28A. As illustrated in FIG. 31A, a region B in the second drive pulses in the respective multiphase drive-pulse trains may make it difficult to satisfy the necessary condition of the boundary current mode.

From this viewpoint, the pulse controller 23a of the pulse calculator 23Z according to the fifth embodiment is configured to 1. Determine whether the absolute positive or negative peak of the inductor current $I_{(L2)}$ based on the second interpolation pulse Pu2 is higher or lower than the absolute positive or negative peak of the inductor current $I_{(L1)}$ based on the first interpolation pulse Pu1 (see a block B10 in FIG. 28B)
2. Perform a correction task of the end phase counter 24c in response to determination of whether the absolute positive or negative peak of the inductor current $I_{(L2)}$ based on the second interpolation pulse Pu2 is higher or lower than the absolute positive or negative peak of the inductor current $I_{(L1)}$ As described above, the pulse controller 23a of the pulse calculator 23Z sets the count of the pulse width counter 24a to the predetermined value corresponding to the on-duration $T_{on}$ calculated in the block B1, and decrements the count of the pulse width counter 24a in response to determination that the inductor current $I_L$ becomes zero by the zero-current determiner 22. This enables the first interpolation pulse Pu1 having the on-duration $T_{on}$ to be calculated.

In addition, the pulse controller 23a of the pulse calculator 23 is configured to 1. Perform the start phase measuring task of setting the count of the start phase counter 24b to the predetermined value corresponding to the phase difference $T_d$, which is equal to the present phase difference $P_{k+1}$, calculated in the block B1, decrementing the count, and resetting the count of the start phase counter 24b when the count becomes zero
2. Repeat the start phase measuring task until the number of repetitions of the start phase measuring task becomes the multiply-driven number n of 4, so that the count of the start phase counter 24b is reset four times, i.e., the first to fourth reset times This enables the start phase of each of the second to fourth interpolation pulses Pu2 to Pu4 to be calculated in response to the corresponding one of the first to third reset times.

Specifically, the pulse controller 23a is configured to

1. Determine whether the absolute positive or negative peak of the inductor current $I_{(L2)}$ based on the second interpolation pulse Pu2 is higher or lower than the absolute positive or negative peak of the inductor current $I_{(L1)}$ based on the first interpolation pulse Pu1 (see a block B10 in FIG. 28B)
2. Perform the end phase measuring task of setting the count of the end phase counter 24c to the predetermined value corresponding to the phase difference $T_d$, which is equal to the average value $(P_k+P_{k+1})/2$ calculated in the block B2, decrementing the count, and resetting the count of the end phase counter 24c when the count becomes zero if the absolute positive or negative peak of the inductor current $I_{(L2)}$ based on the second interpolation pulse Pu2 is substantially maintained at the absolute positive or negative peak of the inductor current $I_{(L1)}$ In contrast, upon determination that the absolute positive or negative peak of the inductor current $I_{(L2)}$ based on the second interpolation pulse Pu2 is higher than the absolute positive or negative peak of the inductor current $I_{(L1)}$, the pulse controller 23a is configured to correct, for each of the second to fourth interpolation pulses Pu2 to Pu4, the count of the end phase counter 24c, which has been set for the immediately previous interpolation pulse, to a lower value by a variable correction A each time the count of the end phase counter 24c is reset (see a block B11 in FIG. 28B).

Similarly, upon determination that the absolute positive or negative peak of the inductor current $I_{(L2)}$ based on the second interpolation pulse Pu2 is lower than the absolute positive or negative peak of the inductor current $I_{(L1)}$, the pulse controller 23a is configured to correct, for each of the second to fourth interpolation pulses Pu2 to Pu4, the count of the end phase counter 24c, which has been set for the immediately previous interpolation pulse, to a higher value by the variable correction A each time the count of the end phase counter 24c is reset (see the block B11 in FIG. 28B).

Figures 30A, 30B:
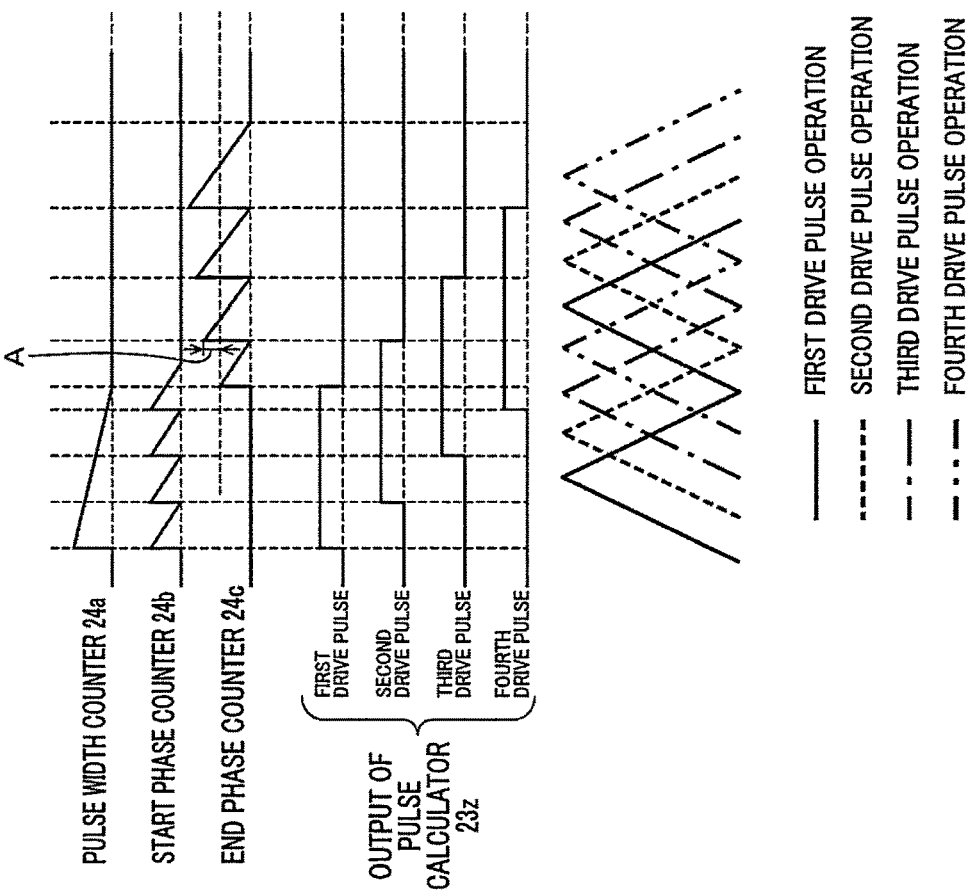
FIG. 30A is a timing chart schematically illustrating an issue caused by the comparative example.
FIG. 30B is a timing chart schematically illustrating that the issue can be solved by the second modification.

For example, the pulse controller 23a gradually increases the variable correction A from the calculation of the second interpolation pulse Pu2 to the calculation of the fourth interpolation pulse Pu4 upon determination that the absolute positive or negative peak of the inductor current $I_{(L2)}$ based on the second interpolation pulse Pu2 is lower than the absolute positive or negative peak of the inductor current $I_{(L1)}$ (see FIG. 30B). This enables the first and second drive pulses in the multiphase drive-pulse trains to satisfy the necessary condition of the boundary current mode (see FIG. 31B). This therefore enables each of the U-, V-, and W-phase phase currents Iu, Iv, and Iw to be maintained at an intended amplitude therefor, resulting in the multiphase converters 6u, 6v, and 6w continuously operating in the boundary current mode.

Sixth Embodiment

The following describes a drive system 201 according to the sixth embodiment with reference to FIGS. 32 to 35. At least part of the structure and/or at least some functions of the drive system 201 is identical to that of the drive system 10 according to the first embodiment except for the following points. So, the following describes mainly the different points.

A back electromotive force, i.e., a back-electromotive-force (BMF) voltage, is generated, in the motor 4, due to changes in flux linkage depending on the RPM of the motor 4, resulting in variations in the output voltage $V_{out}$, i.e., each of the U-, V-, and W-phase voltages Vu, Vv, Vw across the corresponding one of the U-, V-, and W-phase coils 4A1.

Figure 32:
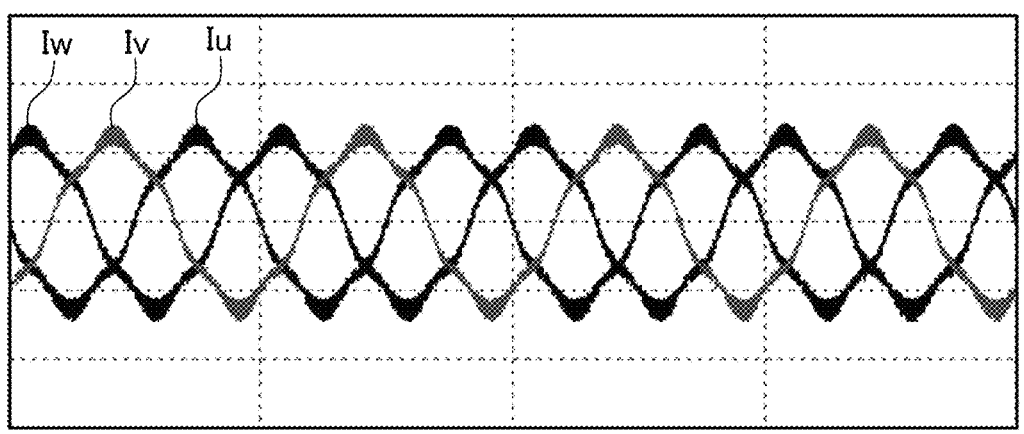
FIG. 32 is a graph schematically illustrating an example of the conventional waveform of each phase current due to harmonic current distortion.

An insufficient level of the responsivity of the feedback control system might be sensitive to the BMF voltage might result in harmonic current distortion in each of the phase currents Iu, Iv, and Iw (see FIG. 32). The harmonic-current components in each of the phase currents Iu, Iv, and Iw might cause the motor 4 to generate noise. Unless the feedback system has a higher level of the responsivity, it might be difficult to reduce the adverse effect due to the harmonic current distortion, resulting in the controller 10, which has limited physical resources, having difficulty in reducing the adverse effect due to the harmonic current distortion.

In particular, a higher value of the RPM of the motor 4 over a predetermined speed might be significantly sensitive to the BMF voltage, resulting in an increased level of the harmonic current distortion.

From this viewpoint, the sixth embodiment provides a specific configuration and a specific method of correcting the width of each drive pulse of each multiple drive-pulse train to be applied for a corresponding one of the selected converters 5 in accordance with the BMF voltage generated in the motor 4.

The three-phase inverter 3 of the drive system 201 includes a controller 10 for controlling each of the multiphase converters 6u, 6v, and 6w.

The controller 10 includes a control processor 35 serving as a control unit 211 and a pulse generator 212. The pulse generator 212 additionally includes a BMF corrector 213. That is, the control processor 35 serves as the BMF corrector 213.

Let us assume that the amplitude, i.e., the largest magnitude, of the BMF voltage for each phase will be referred to as Vm, and the phase, i.e., phase information, about the BMF voltage for each phase will be referred to as $(\omega_e t+\phi)$ $=(2\pi f_e t+\phi)$ where t represents time, $\omega_e$ represents the angular velocity $\omega$ of the rotor 4B of the motor 4, $\phi$ represents the phase difference of the BMF voltage for each phase relative to the corresponding phase current, and $f_e$ represents the electrical frequency of the rotor 4B of the motor 4.

It is preferable that the output voltage $V_{out}$, i.e., each of the U-, V-, and W-phase voltages Vu, Vv, Vw, periodically moves about a center line that has a potential of one-half of the input voltage $V_{in}$, which is expressed by $V_{in}/2$. The output voltage $V_{out}$ is therefore preferably controlled as a corrected output voltage $VC_{out}$ to satisfy the following relational expression (8):

$$VC_{out} = \frac{V_{in}}{2} + V_m \cdot \sin(\omega_e t + \phi) = \frac{V_{in}}{2} + V_m \cdot \sin(2\pi f_e t + \phi) \quad (8)$$

The pulse generator 212 is preferably configured to calculate the amplitude Vm of the BMF voltage in accordance with the RPM of the motor 4. Additionally, the pulse generator 212 is preferably configured to calculate the corrected output voltage $VC_{out}$ for each phase in accordance with (i) the rotational position θ of the rotor 4B, i.e., the motor 4, (ii) the amplitude Vm of the BMF voltage, and (iii) the phase information about the BMF voltage. Then, the pulse generator 212 is preferably configured to correct, for each phase, the width of each drive pulse included in each multiple drive-pulse train to be applied for a corresponding one of the selected converters 5 in accordance with the corrected output voltage $VC_{out}$ for the corresponding phase.

For example, the pulse generator 212 calculates the values of the respective parameters T, $T_{on}$, $T_{off}$, and $T_d$ for each multiphase drive-pulse train for selected converters 5u1 to 5un in accordance with, for example, the above expressions (1-1) to (1-4), (2-1) to (2-4), or (3-1) to (3-4) on condition that the output voltage $V_{out}$ in some expressions in the expressions (1-1) to (1-4), (2-1) to (2-4), or (3-1) to (3-4) is calculated as the corrected output voltage $VC_{out}$ based on the expression (8).

Each instance value of the BMF voltage generated in the motor 4 is predictable because the instance value of the BMF can be expressed as a function of one or more intrinsic and/or operating parameters of the motor 4. For example, multiplying a BMF voltage constant, which is intrinsically determined for the motor 4, by a present value of the RPM of the motor 4 enables the instance value of the BMF voltage to be calculated, i.e., predicted.

Higher accuracy correction of the width of each drive pulse of each multiple drive-pulse train for the U-phase preferably needs, for example, the resistance of the U-phase coil 4A1 of the motor 4 and a voltage across the inductance of the U-phase coil 4A1 thereof.

The controller 10 is configured to calculate a present value of the RPM of the motor 4 based on the rotational position θ of the rotor 4B measured by the rotational position sensor 4a. Then, the controller 10 is configured to
1. Transform the U-, V-, and W-phase phase currents Iu, Iv, and Iw measured by the respective current sensors 16 into a d-axis current, i.e., a magnetic flux current, Id and a q-axis current, i.e., a torque current, Iq in the d-q coordinate system as a function of the angular velocity ω
2. Perform vector control of the motor 4 in accordance with the d-axis current Id and q-axis current Iq like the first or second modification described above The following describes an exemplary functional configuration of the controller 10 according to the sixth embodiment with reference to FIG. 34.

Figure 34:
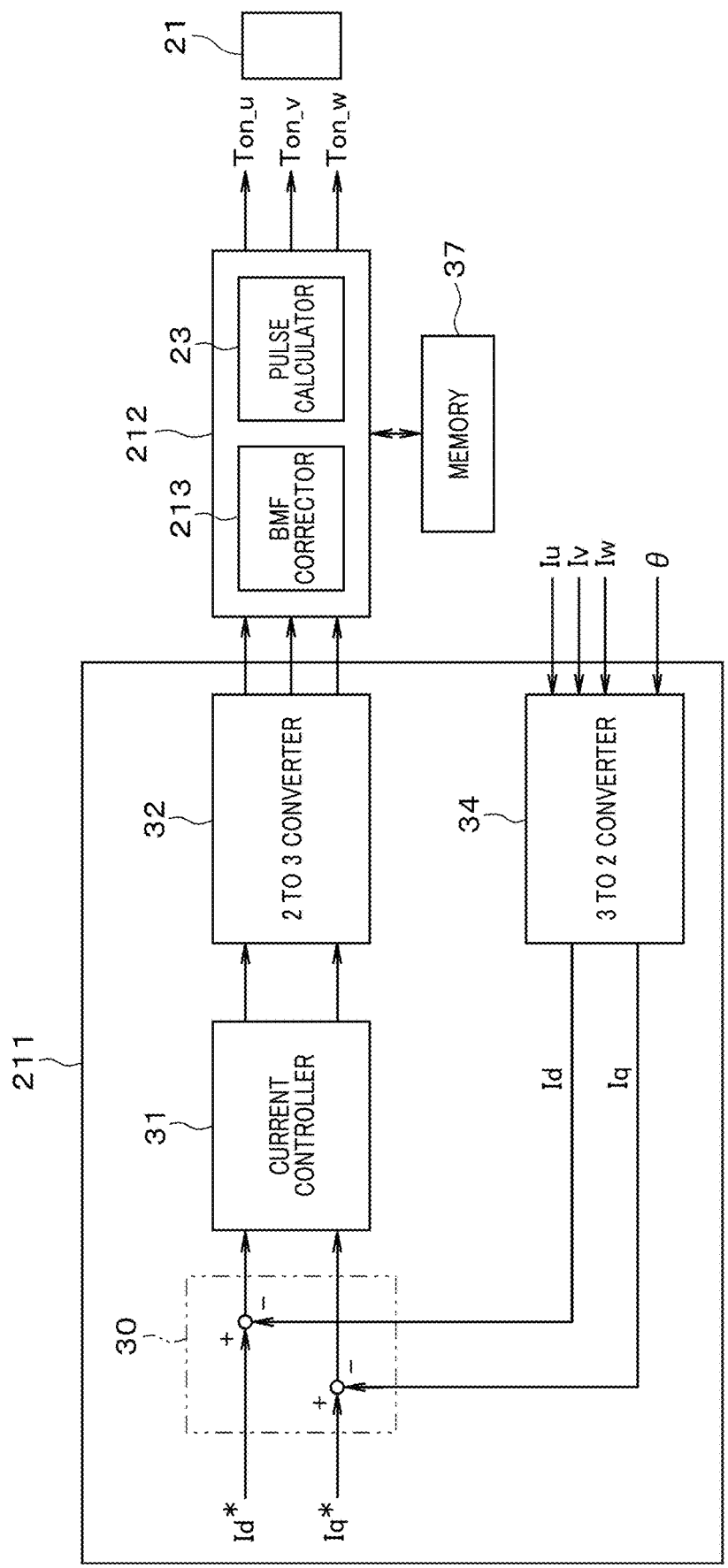
FIG. 34 is a first exemplary functional configuration of a controller according to the sixth embodiment.

Referring to FIG. 34, the controller 10 of the drive system 201 serves as a current feedback control system of the drive system 201 according to the sixth embodiment. Specifically, the controller 10 is comprised of a control processor 35 and the memory device 37, and the control processor 35 functionally includes the control unit 211 and the pulse generator 212.

The control unit 211 functionally includes, for example, the subtractor 30, the current controller 31, the two-phase to three-phase coordinate converter 32, and the three-phase to two-phase coordinate convertor 34. In FIG. 34, the two-phase to three-phase coordinate converter 32 will be illustrated as "2 TO 3 CONVERTER 32", and the three-phase to two-phase coordinate converter 34 will be illustrated as "3 TO 2 CONVERTER 34".

The ECU 500 is configured to calculate a d-axis command current value Id* and a q-axis command current value Iq* in a d-q coordinate system of the rotor 4B of the motor 4 in accordance with, for example, the request torque. Each of the command current value Id* and q-axis command current value Iq* serves as a corresponding one of the command current values $I_O$ according to the first embodiment.

Each of the d-axis command current value Id* and q-axis command current value Iq* is inputted to the control unit 211 from the ECU 500 every predetermined update cycle. The set of the d-axis command current values Id* and the set of the q-axis command current value Iq* respectively have a desired pseudo sinusoidal waveform with a predetermined AC period.

The three-phase to two-phase converter 34 is configured to calculate the angular velocity co of the rotor 4B based on the rotation angle θ of the motor 4, i.e., the rotor 4B, and convert the U-, V-, and W-phase phase currents Iu, Iv, and Iw into a d-axis current, i.e., a magnetic flux current, Id and a q-axis current, i.e., a torque current, Iq in the d-q coordinate system as a function of the angular velocity ca.

The subtractor 30 is configured to subtract the d-axis current Id from the d-axis command current value Id* to thereby calculate a d-axis deviation ΔId, and subtract the q-axis current Iq from the q-axis command current value Iq* to thereby calculate a q-axis deviation ΔIq. The subtractor 30 is configured to output the d- and q-axis command current values Id* and Iq* to the current controller 31.

The current controller 31 is configured to perform, as a known feedback control task, a proportional-integral (PI) feedback control task using the d-axis current deviation ΔId as input data, and a proportional gain term and an integral gain term of a PI feedback control algorithm (PI algorithm). The PI feedback control task calculates a d-axis manipulated variable Id_cmd for causing the d-axis current deviation ΔId to converge to zero.

Similarly, the current controller 31 is configured to perform, as a known feedback control task, the PI feedback control task using the q-axis current deviation ΔIq as input data, and a proportional gain term and an integral gain term of the PI feedback control algorithm. The PI feedback control task calculates a q-axis manipulated variable Iq_cmd for causing the q-axis current deviation ΔIq to converge to zero.

Then, the current controller 31 is configured to output, to the two-phase to three-phase coordinate converter 32, the d-axis manipulated variable Id_cmd and q-axis manipulated variable Iq_cmd to the two-phase to three-phase coordinate converter 32.

The two-phase to three-phase converter 32 is configured to convert, as a function of the angular velocity ω, the d-axis manipulated variable Id_cmd and q-axis manipulated variable Iq_cmd into three-phase (U-, V-, and W-phase) manipulated variables Iu_cmd, Iv_cmd, and Iw_cmd, and output, to the pulse generator 212, the three-phase manipulated variables Iu_cmd, Iv_cmd, and Iw_cmd.

The pulse generator 212 functionally includes, for example, the gate driver 21, the zero-current determiner 22, the pulse calculator 23, and the BMF corrector 213.

The BMF corrector 213 of the pulse generator 212 is configured to
1. Calculate the amplitude Vm of the BMF voltage in accordance with the RPM of the motor 4
2. Calculate a corrected output voltage $VC_{out}$ for each phase in accordance with (i) the rotational position θ of the rotor 4B, i.e., the motor 4, (ii) the amplitude Vm of the BMF voltage, (iii) the input voltage $V_{in}$, and (iv) the phase information about the BMF voltage Each of the three-phase manipulated variables Iu_cmd, Iv_cmd, and Iw_cmd is inputted to the pulse calculator 23. The zero-current determiner 22 is configured to output, to the pulse calculator 23, zero-timing information each time of determining that each of the three-phase manipulated variables Iu_cmd, Iv_cmd, and Iw_cmd becomes zero.

The pulse calculator 23 is configured to
1. Select converters 5 to be driven in the parallelly-connected converters 5 of each of the multiphase converters 6u, 6v, and 6w
2. Analyze, for example, each of the three-phase command current values Iu_cmd, Iv_cmd, and Iw_cmd and the feedback information to thereby calculate, for each of the multiphase converters 6u, 6v, and 6w, values of the respective parameters, which include the period T, on-duration $T_{on}$, off-duration $T_{off}$, and phase difference $T_d$, for each multiphase drive-pulse train that instructs the selected converters 5 in the parallelly-connected converters 5 of the corresponding one of the multiphase converters 6u, 6v, and 6w to operate in the boundary current mode Then, the pulse calculator 23 is configured to generate, based on the values of the parameters, i.e., the period T, on-duration $T_{on}$, off-duration $T_{off}$, and phase difference $T_d$, the multiphase drive-pulse train every predetermined period T.

The gate driver 21 is configured to perform, for each phase of the motor 4, on-and-off switching operations of the upper- and lower-arm switches SW1 and SW2 of the selected converters 5 in accordance with the multiphase drive-pulse train every predetermined period T.

In particular, if the command current value Iu_cmd inputted thereto every update cycle is more than or equal to zero, the pulse calculator 23 of the sixth embodiment calculates, based on the feedback information about the input voltage $V_{in}$, the corrected output voltage $V_{out}$ for each phase, each of the phase currents Iu, Iv, and Iw, and the angular velocity ω, values of the respective parameters, i.e., the period T, on-duration $T_{on}$, off-duration $T_{off}$, and phase difference $T_d$, for a multiphase drive-pulse train for the upper-arm switch SW1 of each of the selected converters 5u1 to 5un in accordance with, for example, the above expressions (1-1) to (1-4).

Otherwise, if the command current value Iu_cmd inputted thereto every update cycle is less than zero, the pulse calculator 23 calculates, based on the feedback information about the input voltage $V_{in}$, the corrected output voltage $V_{out}$ for each phase, each of the phase currents Iu, Iv, and Iw, and the angular velocity ω, values of the respective parameters, i.e., the period T, on-duration $T_{on}$, off-duration $T_{off}$, and phase difference $T_d$, for a multiphase drive-pulse train for the lower-arm switch SW2 of each of the selected converters 5u1 to 5un in accordance with, for example, the above expressions (2-1) to (2-4).

How the pulse calculator 23 calculates values of the respective parameters, i.e., the period T, on-duration $T_{on}$, off-duration $T_{off}$, and phase difference $T_d$, for the V-phase of the motor 4, and how the pulse calculator 23 calculates values of the respective parameters, i.e., the period T, on-duration $T_{on}$, off-duration $T_{off}$, and phase difference $T_d$, for the W-phase of the motor 4 are substantially identical to how the pulse calculator 23 calculates values of the respective parameters, i.e., the period T, on-duration $T_{on}$, off-duration $T_{off}$, and phase difference $T_d$, for the U-phase of the motor 4.

In particular, the pulse calculator 23 calculates, every predetermined period T, the multiphase drive-pulse train for each phase based on the corrected output voltage $VC_{out}$ for the corresponding phase, making it possible to correct the width of each drive pulse included in the multiphase drive-pulse train.

Because the amplitude Vm of the BMF voltage is proportional to the RPM of the motor 4, the BMF corrector 213 of the pulse generator 212 preferably calculates the amplitude Vm of the BMF voltage such that the amplitude Vm of the BMF changes in proportion to change of the RPM of the motor 4.

The controller 10 illustrated in FIG. 34 is configured as the current feedback control system, but the present disclosure is not limited to the above configuration of the controller 10.

Figure 35:
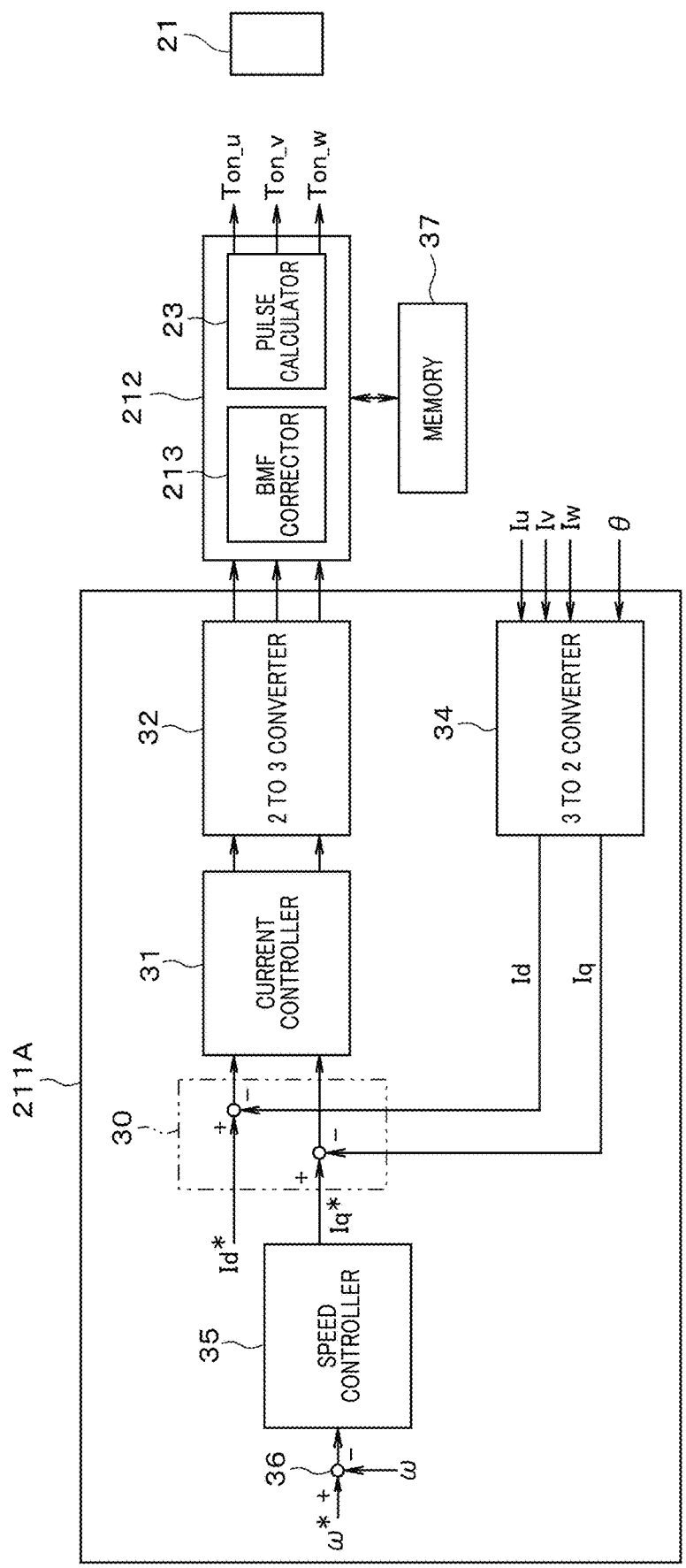
FIG. 35 is a second exemplary functional configuration of a controller according to the sixth embodiment.

Specifically, the three-phase inverter 3 of the drive system 201 includes a controller 10 for controlling each of the multiphase converters 6u, 6v, and 6w as illustrated in FIG. 35 in place of the controller 10.

Referring to FIG. 35, the controller 10 serves as an angular-velocity feedback control system of the drive system 201. The controller 10 includes a control processor 35 serving as a control unit 211A and a pulse generator 212A. The pulse generator 212A additionally includes a BMF corrector 213. That is, the control processor 35 serves as the BMF corrector 213.

Specifically, the control unit 211A functionally includes, in addition to the subtractor 30, current controller 31, two-phase to three-phase coordinate converter 32, and three-phase to two-phase coordinate convertor 34, a speed controller 350 and a subtractor 360. The functions of each of the components 30, 31, 32, and 34 illustrated in FIG. 35 are substantially identical to those of the corresponding one of the components 30, 31, 32, and 34 illustrated in FIG. 34.

The ECU 500 is configured not to calculate the q-axis command current value Iq*, and calculate, in addition to the d-axis command current value Id*, a command angular velocity ω* in accordance with, for example, the request torque. Each of the d-axis command current value Id* and command angular velocity ω* is inputted to the control unit 211 from the ECU 500 every update cycle.

The subtractor 36 is configured to subtract the angular velocity ω of the motor 4 from the command angular velocity ω* to thereby calculate an angular velocity deviation Δω. The subtractor 360 is configured to output the angular velocity deviation Δω to the speed controller 350.

The speed controller 350 is configured to perform, as a known feedback control task, a proportional-integral (PI) feedback control task using the angular velocity deviation Δω as input data, and a proportional gain term and an integral gain term of a PI feedback control algorithm (PI algorithm). The PI feedback control task calculates a q-axis command current value Iq* for causing the angular velocity deviation Δω to converge to zero. Then, the speed controller 350 is configured to output the q-axis command current value Iq* to the subtractor 30.

The operations of the respective components 30, 31, 32, 34, and 212A illustrated in FIG. 35 are substantially identical to those of the respective components 30, 31, 32, 34, and 212 illustrated in FIG. 34.

The above vector control of the controller 10 illustrated in FIG. 34 or FIG. 35 can include known decoupling control for decoupling between the d-axis current Id and the q-axis current Iq. This results in elimination of an unstable factor caused when the motor 4 is operating. The above vector control of the controller 10 illustrated in FIG. 34 or FIG. 35 can be preferably configured to perform known field weakening control.

Figure 33:
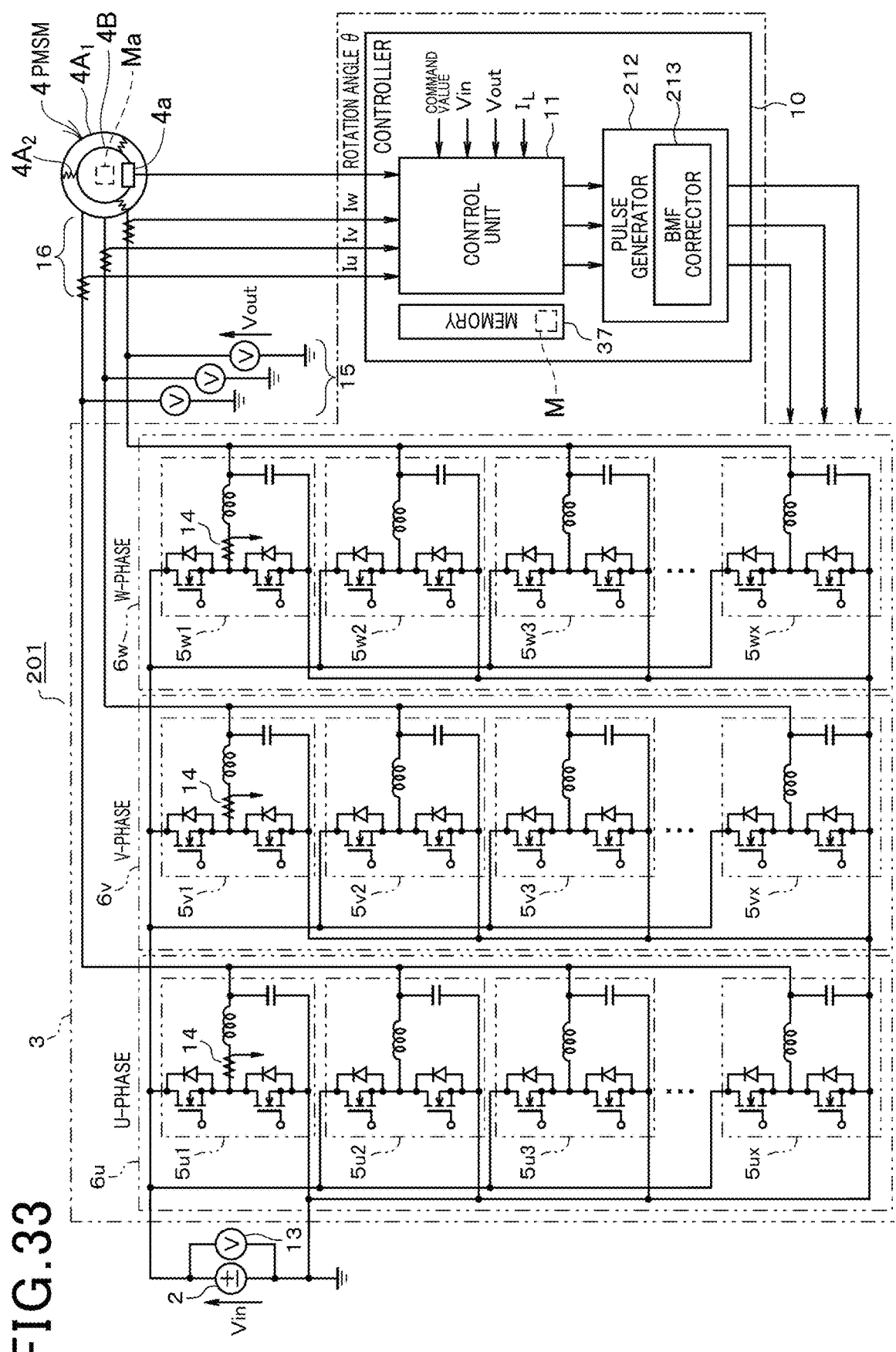
FIG. 33 is a circuit block diagram schematically illustrating an example of the overall configuration of a drive system according to the sixth embodiment of the present disclosure.

As illustrated in FIG. 33, each of the multiphase converters 6u, 6v, and 6w is comprised of multiple x converters 5 connected in parallel to one another. This configuration of each of the multiphase converters 6u, 6v, and 6w is suitable for a case where the absolute value of the output voltage $V_{out}$ for each phase of the motor 4 varies within the range of the input voltage $V_{in}$ outputted from the battery 2.

Each of the pulse generators 212 and 212A is configured to calculate the BMF voltage in accordance with the RPM of the motor 4, but the present disclosure is not limited to this configuration.

For example, the memory 37 can store map information M1 in data-table format, in mathematical expression format, and/or program format (see FIG. 21). The map information M1 includes a relationship between (1) Values of the RPM of the motor 4
(2) Values of the amplitude Vm of the BMF voltage
(3) Values of the phase of the BMF voltage That is, the pulse generator 212 or 212A can be configured to 1. Refer to the map information M1
2. Extract, from the map information M1, a value of the amplitude Vm of the BMF voltage and a value of the phase of the BMF voltage such that the extracted value of the amplitude Vm of the BMF voltage and the extracted value of the phase of the BMF voltage correlate with a present value of the RPM of the motor 4 in the map information M1 Then, the pulse generator 212 or 212A can be configured to calculate a corrected output voltage $VC_{out}$ for each phase in accordance with (i) the rotational position θ of the rotor 4B, i.e., the motor 4, (ii) the amplitude Vm of the BMF voltage, and (iii) the phase information about the BMF voltage to thereby correct the width of each drive pulse included in the multiphase drive-pulse train.

The pulse generator 212 or 212A can be configured to use the output voltage $V_{out}$ for each phase measured by the corresponding one of the voltage sensors 15 in order to calculate the corrected output voltage $VC_{out}$ for each phase with consideration of delay time of the measurement of the output voltage $V_{out}$ by the corresponding one of the voltage sensors 15.

The pulse generator 212 or 212A can be configured to
1. Output, to the selected converters 5, the multiphase drive-pulse train every update cycle of the command current values Io or command angular velocities ω*
2. Select, every predetermined correction period, one of the multiphase drive-pulse trains, the correction period being longer than the update cycle
3. Correct the width of each drive pulse included in each of the periodically selected multiphase drive-pulse trains in accordance with the corresponding value of the BMF voltage
4. Store the corrected width of each drive pulse included in each of the periodically selected multiphase drive-pulse trains in the memory 37 to correlate with a corresponding one of the command current values Io or command angular velocities ω*

This enables the width of each drive pulse included in at least one multiphase drive-pulse train, which lies within at least one of the correction periods, at one of the command current values Io to be corrected based on the corrected width of each drive pulse included in at least one multiphase drive-pulse train stored in the memory 37 to correlate with the one of the command current values Io.

As described above, the BMF corrector 213 of the controller 10 according to the sixth embodiment is configured to correct the output voltage $V_{out}$ for each phase based on the BMF voltage of the motor 4 to thereby correct, based on the corrected output voltage $VC_{out}$ for each phase, the width of each drive pulse included in at least one selected multiphase drive-pulse train.

Figure 36:
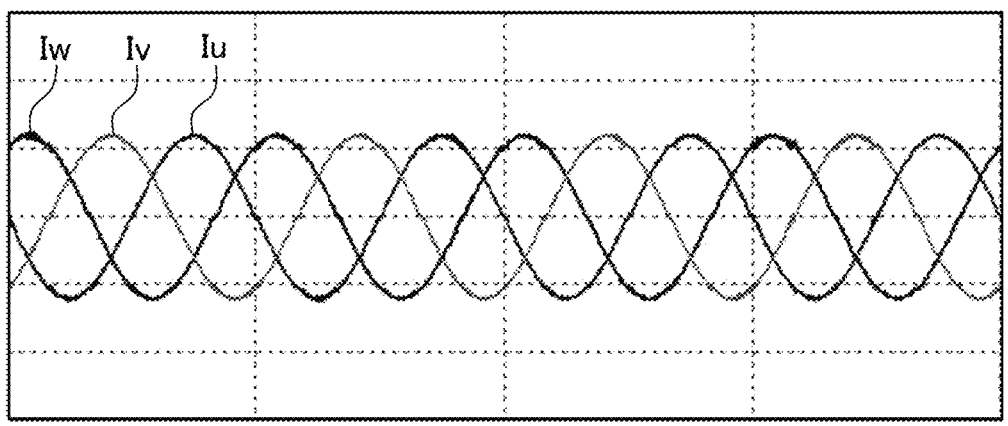
FIG. 36 is a graph schematically illustrating an example of the waveform of each phase current obtained by the sixth embodiment

This enables the BMF voltage of the motor 4 to be installed in the sequence of correcting the width of each drive pulse included in at least one selected multiphase drive-pulse train. This therefore reduces an adverse effect due to the BMF voltage from each phase current of the motor 4, enabling each phase current of the motor 4 to have an ideal sinusoidal waveform without harmonic current distortion (see FIG. 36). This makes it possible for the drive system 201 to provide the motor 4 with a higher degree of efficiency, a lower level of noise, and a higher level of electromagnetic compatibility (EMC). The controller 10 is additionally designed as a simply-configured current feedback control system illustrated in FIG. 34 or 35 without using a feedforward control system.

Seventh Embodiment

The following describes a drive system according to the seventh embodiment. The structure and/or functions of the drive system according to the seventh embodiment are mainly identical to those of the drive system 1 of the first embodiment or the drive system 201 of the sixth embodiment except for the following points. The following therefore describes mainly the different points.

As described above, the gate driver 21 of the pulse generator 12 or 212 according to the first or sixth embodiment turns on the upper-arm switch SW1 of each selected converter 5 as a first arm switch and thereafter turns off the upper-arm switch SW1 while holding the lower-arm switch SW2 of the corresponding selected converter 5 in the off state in the first switching mode. At that time, the flyback diode D2 of the lower-arm switch SW2 of each selected converter 5 enables the inductor current $I_L$ to continuously flow therethrough and through the inductor L.

In contrast, in response to turn-off the upper-arm switch SW1 of each selected converter 5, the pulse generator 12 or 212 according to the seventh embodiment is specially configured to turn on the lower-arm switch SW2 of the corresponding converter 5 as a second arm switch in the first switching mode to accordingly perform synchronous rectification in which the inductor current $I_L$ to continuously flow through the lower-arm switch SW2 and the inductor L.

Similarly, the gate driver 21 of the pulse generator 12 or 212 according to the first or sixth embodiment turns on the lower-arm switch SW2 of each selected converter 5 as the first arm switch and thereafter turns off the lower-arm switch SW2 while holding the upper-arm switch SW1 of the corresponding selected converter 5 in the off state in the second switching mode. At that time, the flyback diode D1 of the upper-arm switch SW1 of each selected converter 5 enables the inductor current $I_L$ to continuously flow therethrough and through the inductor L.

In contrast, in response to turn-off the lower-arm switch SW2 of each selected converter 5, the pulse generator 12 or 212 according to the seventh embodiment is specially configured to turn on the upper-arm switch SW1 of the corresponding converter 5 as the second arm switch in the second switching mode to accordingly perform the synchronous rectification in which the inductor current $I_L$ to continuously flow through the upper-arm switch SW1 and the inductor L.

The synchronous rectification reduces loss due to switching of the lower- or upper-arm switch SW2 or SW1 as compared with that due to current flow through the flyback diode D2 or D1. Each converter 5 according to the seventh embodiment eliminates the need of providing external flyback diodes therein, resulting in each converter 5 being smaller in size.

For example, in response to turn-off the upper-arm switch SW1 of each selected converter 5 in the first switching mode, the pulse generator 12 or 212 according to the seventh embodiment is configured to turn on the lower-arm switch SW2 of the corresponding converter 5 for only the duration matching with the off-duration $T_{off1}$ described in the expression (1-2) or (3-2). Similarly, in response to turn-off the lower-arm switch SW2 of each selected converter 5 in the second switching mode, the pulse generator 12 or 212 according to the seventh embodiment is configured to turn on the upper-arm switch SW1 of the corresponding converter 5 for only the duration matching with the off-duration $T_{off2}$ described in the expression (2-2). The pulse generator 12 or 212 according to the seventh embodiment is preferably configured to ensure a predetermined deadtime between each turn-on duration $T_{on}$ of the upper-arm switch SW1 and the corresponding temporally adjacent turn-on durations $T_{on}$ of the lower-arm switch SW2.

The synchronous rectification according to the seventh embodiment makes it possible to calculate the off-duration of the lower-arm switch SW2 as a synchronous rectification duration in the first switching mode, and calculate the off-duration of the upper-arm switch SW1 as the synchronous rectification duration in the second switching mode.

This eliminates the need of providing an additional external sensor for detecting when the lower-arm switch SW2 or upper-arm switch SW1 is turned on for starting the synchronous rectification, resulting the drive system of the seventh embodiment having a smaller size and a lower cost.

Third Modification of Sixth and Seventh Embodiments

The following describes a third modification of the feedback control system according to each of the sixth and seventh embodiments with reference to FIGS. 37 to 42.

In this third modification and the sixth embodiment, descriptions of like parts between this second modification and the sixth embodiment, to which like reference characters are assigned, are omitted or simplified to avoid redundant descriptions.

Figure 37:
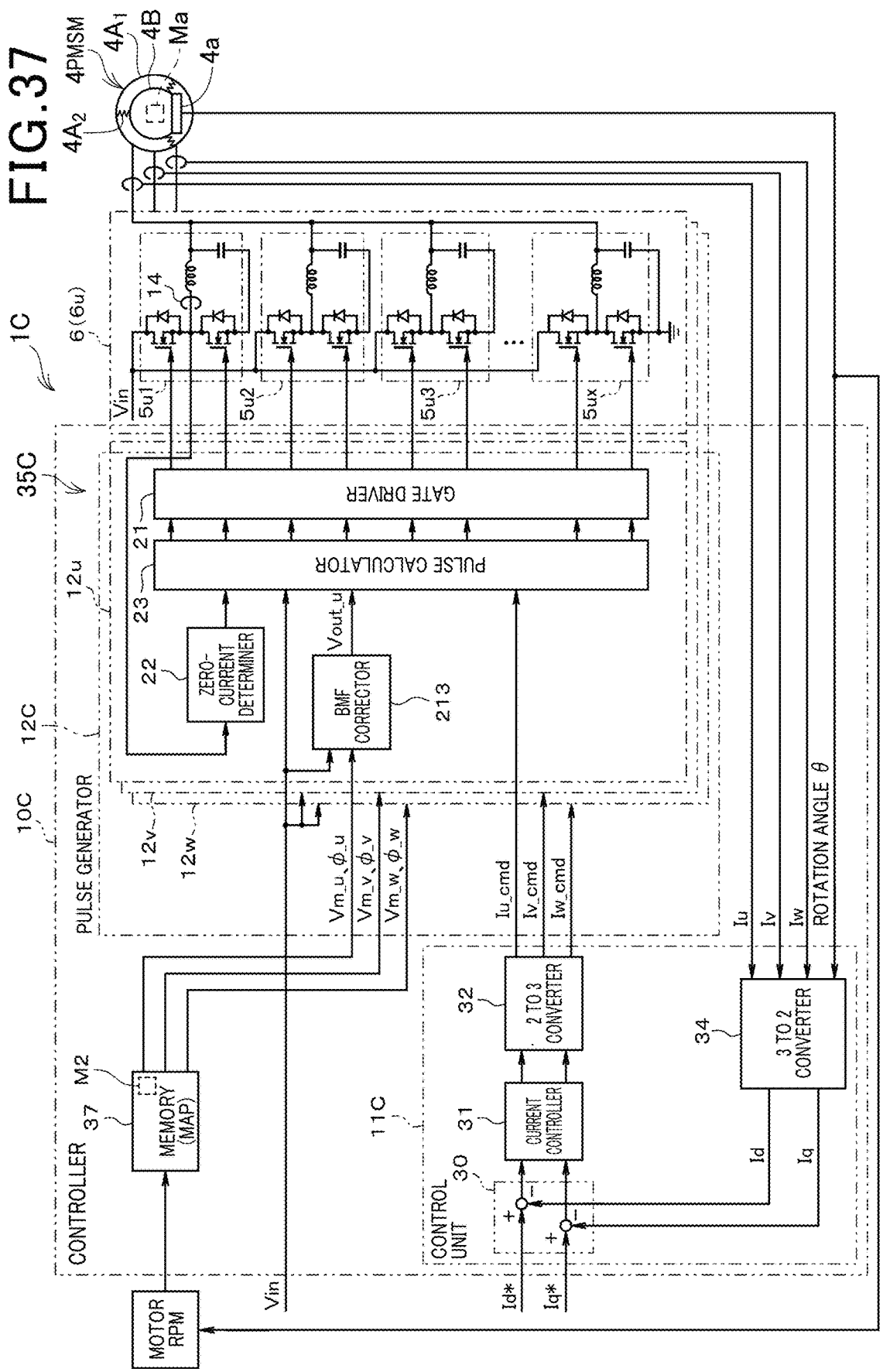
FIG. 37 is a circuit block diagram schematically illustrating an example of the overall configuration of a drive system according to the third modification of the feedback control system according to each of the sixth and seventh embodiments.

Referring to FIG. 37, a drive system 1C according to this third modification includes a controller 10C, which serves as a feedback control system of the drive system 1C according to this second modification.

The controller 10C is comprised of a control processor 35C and the memory device 37, and the control processor 35C functionally includes a control unit 11C and a pulse generator 12C.

Like the control unit 11A or 11B, the control unit 11C functionally includes, for example, the subtractor 30, the current controller 31, the two-phase to three-phase coordinate converter 32, and the three-phase to two-phase coordinate convertor 34. In FIG. 37, the two-phase to three-phase coordinate converter 32 will be illustrated as "2 TO 3 CONVERTER 32", and the three-phase to two-phase coordinate converter 34 will be illustrated as "3 TO 2 CONVERTER 34".

The ECU 500 is configured to calculate a d-axis command current value Id* and a q-axis command current value Iq* in a d-q coordinate system of the rotor 4B of the motor 4 in accordance with, for example, the request torque. Each of the command current value Id* and q-axis command current value Iq* serves as a corresponding one of the command current values $I_O$ according to the third modification.

Each of the d-axis command current value Id* and q-axis command current value Iq* is inputted to the control unit 11C from the ECU 500 every predetermined update cycle. The set of the d-axis command current values Id* and the set of the q-axis command current value Iq* respectively have a desired pseudo sinusoidal waveform with a predetermined AC period.

The three-phase to two-phase converter 34 is configured to calculate the angular velocity ω of the rotor 4B based on the rotation angle θ of the motor 4, i.e., the rotor 4B, and convert the U-, V-, and W-phase phase currents Iu, Iv, and Iw into a d-axis current Id and a q-axis current Iq in the d-q coordinate system as a function of the angular velocity ω.

The subtractor 30 is configured to subtract the d-axis current Id from the d-axis command current value Id* to thereby calculate a d-axis deviation ΔId, and subtract the q-axis current Iq from the q-axis command current value Iq* to thereby calculate a q-axis deviation ΔIq. The subtractor 30 is configured to output the d- and q-axis command current values Id* and Iq* to the current controller 31.

The current controller 31 is configured to perform, as a known feedback control task, the PI feedback control task using the d-axis current deviation ΔId as input data, and a proportional gain term and an integral gain term of the PI feedback control algorithm. The PI feedback control task calculates a d-axis command current value Id_cmd for causing the d-axis current deviation ΔId to converge to zero.

Similarly, the current controller 31 is configured to perform, as a known feedback control task, the PI feedback control task using the q-axis current deviation ΔIq as input data, and a proportional gain term and an integral gain term of the PI feedback control algorithm. The PI feedback control task calculates a q-axis command current value Iq_cmd for causing the q-axis current deviation ΔIq to converge to zero.

Then, the current controller 31 is configured to output, to the two-phase to three-phase coordinate converter 32, the d-axis command current value Id_cmd and q-axis command current value Iq_cmd to the two-phase to three-phase coordinate converter 32.

The two-phase to three-phase converter 32 is configured to convert, as a function of the angular velocity ω, the d-axis command current value Id_cmd and q-axis command current value Iq_cmd into three-phase (U-, V-, and W-phase) command current values Iu_cmd, Iv_cmd, and Iw_cmd, and output, to the pulse generator 12C, the three-phase command current values Iu_cmd, Iv_cmd, and Iw_cmd.

The pulse generator 12C functionally includes the U-phase pulse generation block 12u, the V-phase pulse generation block 12v, and the W-phase pulse generation block 12w.

Each of the U-, V-, and W-phase generation blocks 12u, 12v, and 12w functionally includes, for example, the gate driver 21, the zero-current determiner 22, the pulse calculator 23, and the BMF corrector 213. Each of the three-phase command current values Iu_cmd, Iv_cmd, and Iw_cmd is inputted to the pulse calculator 23 of the corresponding one of the U-, V-, and W-phase generation blocks 12u, 12v, and 12w. The zero-current determiner 22 of each of the U-, V-, and W-phase generation blocks 12u, 12v, and 12w is configured to output, to the pulse calculator 23, zero-timing information each time of determining that the corresponding one of the three-phase command current values Iu_cmd, Iv_cmd, and Iw_cmd becomes zero.

The pulse calculator 23 of each of the U-, V-, and W-phase generation blocks 12u, 12v, and 12w is configured to
1. Select a predetermined number n of converters 5 to be driven in the parallelly-connected converters 5 of the corresponding one of the multiphase converters 6u, 6v, and 6w
2. Analyze, in the first switching mode, the corresponding one of the three-phase command current values Iu_cmd, Iv_cmd, and Iw_cmd to thereby calculate, for each of the multiphase converters 6u, 6v, and 6w, values of the respective parameters, which include the period T, on-duration $T_{on}$, off-duration $T_{off}$, and phase difference $T_d$, for each multiphase (multiple) drive-pulse train that instructs the upper-arm switch SW1 of the selected converters 5 in the parallelly-connected converters 5 of the corresponding one of the multiphase converters 6u, 6v, and 6w to operate in the boundary current mode
3. Generate, based on the values of the parameters, i.e., the period T, on-duration $T_{on}$, off-duration $T_{off}$, and phase difference $T_d$, the multiphase drive-pulse train every predetermined period T For example, if the command current value Iu_cmd inputted thereto every update cycle is more than or equal to zero, the pulse calculator 23 of the U-phase generation block 12u calculates, based on the feedback information, values of the respective parameters, i.e., the period T, on-duration $T_{on}$, off-duration $T_{off}$, and phase difference $T_d$, for a multiphase drive-pulse train for the upper-arm switch SW1 of each of the selected converters 5u1 to 5un in accordance with, for example, the above expressions (1-1) to (1-4).

Similarly, if the command current value Iv_cmd inputted thereto every update cycle is more than or equal to zero, the pulse calculator 23 of the V-phase generation block 12v calculates, based on the feedback information, values of the respective parameters, i.e., the period T, on-duration $T_{on}$, off-duration $T_{off}$, and phase difference $T_d$, for a multiphase drive-pulse train for the upper-arm switch SW1 of each of the selected converters 5v1 to 5vn in accordance with, for example, the above expressions (1-1) to (1-4).

Additionally, if the command current value Iw_cmd inputted thereto every update cycle is more than or equal to zero, the pulse calculator 23 of the W-phase generation block 12w calculates, based on the feedback information, values of the respective parameters, i.e., the period T, on-duration $T_{on}$, off-duration $T_{off}$, and phase difference $T_d$, for a multiphase drive-pulse train for the upper-arm switch SW1 of each of the selected converters 5w1 to 5wn in accordance with, for example, the above expressions (1-1) to (1-4).

The pulse calculator 23 of each of the U-, V-, and W-phase generation blocks 12u, 12v, and 12w is also configured to
1. Select the predetermined number n of converters 5 to be driven in the parallelly-connected converters 5 of the corresponding one of the multiphase converters 6u, 6v, and 6w
2. Analyze, in the second switching mode, the corresponding one of the three-phase command current values Iu_cmd, Iv_cmd, and Iw_cmd to thereby calculate, for each of the multiphase converters 6u, 6v, and 6w, values of the respective parameters, which include the period T, on-duration $T_{on}$, off-duration $T_{off}$, and phase difference $T_d$, for each multiphase (multiple) drive-pulse train that instructs the lower-arm switch SW2 of the selected converters 5 in the parallelly-connected converters 5 of the corresponding one of the multiphase converters 6u, 6v, and 6w to operate in the boundary current mode
3. Generate, based on the values of the parameters, i.e., the period T, on-duration $T_{on}$, off-duration $T_{off}$, and phase difference $T_d$, the multiphase drive-pulse train every predetermined period T For example, if the command current value Iu_cmd inputted thereto every update cycle is less than zero, the pulse calculator 23 of the U-phase generation block 12u calculates, based on the feedback information, values of the respective parameters, i.e., the period T, on-duration $T_{on}$, off-duration $T_{off}$, and phase difference $T_d$, for a multiphase drive-pulse train for the lower-arm switch SW2 of each of the selected converters 5u1 to 5un in accordance with, for example, the above expressions (2-1) to (2-4).

Similarly, if the command current value Iv_cmd inputted thereto every update cycle is less than zero, the pulse calculator 23 of the V-phase generation block 12v calculates, based on the feedback information, values of the respective parameters, i.e., the period T, on-duration $T_{on}$, off-duration $T_{off}$, and phase difference $T_d$, for a multiphase drive-pulse train for the lower-arm switch SW2 of each of the selected converters 5v1 to 5vn in accordance with, for example, the above expressions (2-1) to (2-4).

Additionally, if the command current value Iw_cmd inputted thereto every update cycle is less than zero, the pulse calculator 23 of the W-phase generation block 12w calculates, based on the feedback information, values of the respective parameters, i.e., the period T, on-duration $T_{on}$, off-duration $T_{off}$, and phase difference $T_d$, for a multiphase drive-pulse train for the lower-arm switch SW2 of each of the selected converters 5w1 to 5wn in accordance with, for example, the above expressions (2-1) to (2-4).

The gate driver 21 is configured to perform on-and-off switching operations of the upper- and lower-arm switches SW1 and SW2 of the selected converters 5 in accordance with the multiphase drive-pulse train every predetermined period T.

The memory 37 stores map information M2 in data-table format, in mathematical expression format, and/or program format. The map information M2 includes a relationship between
(1) Values of the RPM of the motor 4
(2) Values of the amplitude Vm of the BMF voltage
(3) Values of the phase difference $\phi$ of the BMF voltage for each phase relative to the corresponding phase current Then, the BMF corrector 213 of each of the pulse generators 12u, 12v, and 12w is configured to
1. Refer to the map information M2
2. Extract, from the map information M2, a value of the amplitude Vm of the BMF voltage and a value of the phase difference $\phi$ of the BMF voltage such that the extracted value of the amplitude Vm of the BMF voltage and the extracted value of the phase difference $\phi$ of the BMF voltage correlate with a present value of the RPM of the motor 4, which depends on the rotation angle $\theta$ of the motor 4, in the map information M2
3. Generate, based on the extracted value of the amplitude Vm of the BMF voltage, the corresponding one of the amplitude Vm_u of a U-phase BMF voltage, the amplitude Vm_v of a V-phase BMF voltage, and the amplitude Vm_w of a W-phase BMF voltage
4. Generate, based on the extracted value of the phase difference $\phi$ of the BMF voltage, the corresponding one of the phase difference $\phi\_u$ of the U-phase BMF voltage, the phase difference $\phi\_v$ of the V-phase BMF voltage, and the phase difference $\phi\_w$ of the W-phase BMF voltage Then, the BMF corrector 213 of the pulse generator 12u is configured to calculate, based on the input voltage $V_{in}$ and the phase difference $\phi\_u$ of the U-phase BMF voltage, a corrected U-phase output voltage $VC_{out\_u}$ (see the above expression (8) and FIG. 38)

Figure 38:
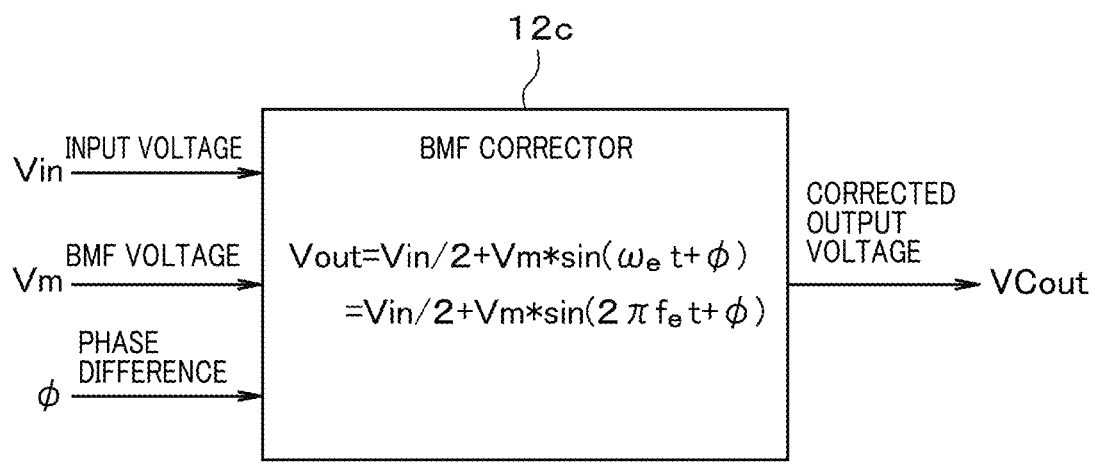
FIG. 38 is a block diagram of a pulse calculator according to the third modification.

Similarly, the BMF corrector 213 of the pulse generator 12v is configured to calculate, based on the input voltage $V_{in}$ and the phase difference $\phi\_v$ of the V-phase BMF voltage, a corrected V-phase output voltage $VC_{out\_v}$, and the BMF corrector 213 of the pulse generator 12w is configured to calculate, based on the input voltage $V_{in}$ and the phase difference $\phi\_w$ of the W-phase BMF voltage, a corrected W-phase output voltage $VC_{out\_w}$ (see the above expression (8) and FIG. 38).

Figure 39A:
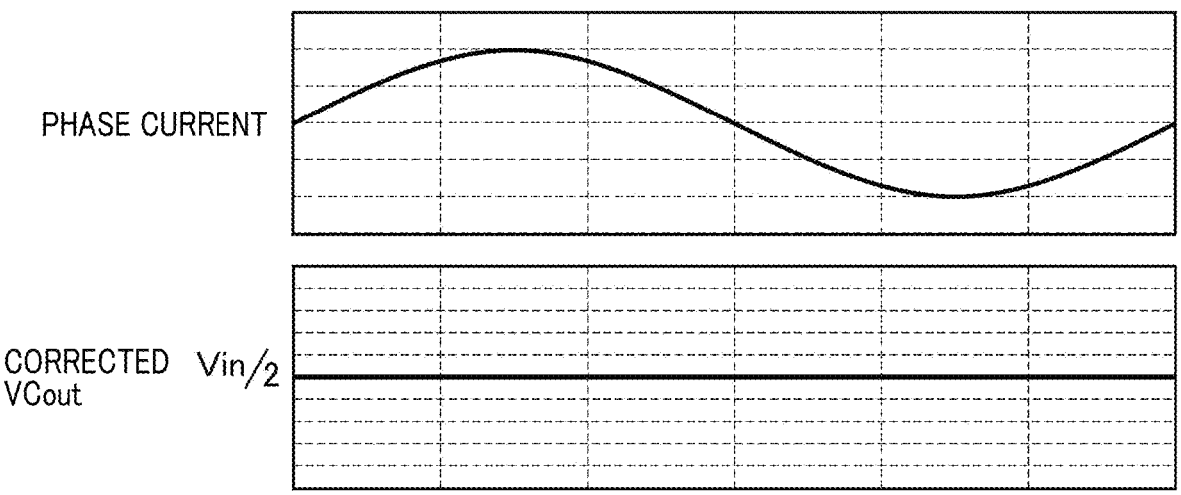
FIG. 39A is a graph schematically illustrating a phase current with no correction of an output voltage as a comparative example for the third modification.
Figure 39B:
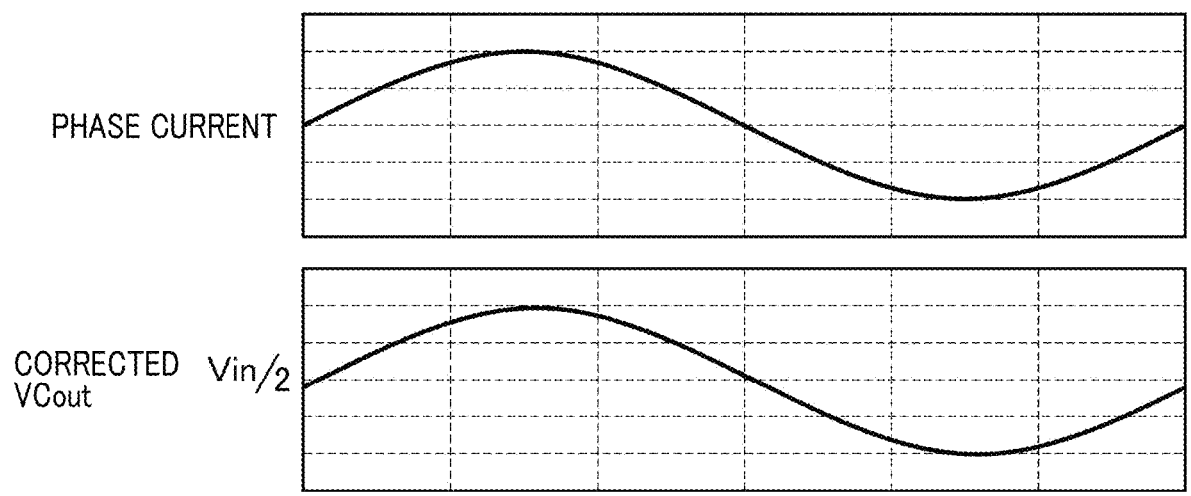
FIG. 39B is a graph schematically illustrating a phase current with correction of the output voltage according to the third modification.

That is, the BMF corrector 213 of each pulse generator 12u, 12v, and 12w corrects, based on the corresponding BMF voltage, the output voltage $V_{out}$ for the corresponding phase (see FIG. 39B). In contrast, FIG. 39A illustrates no correction of the output voltage $V_{out}$.

Figure 40A:
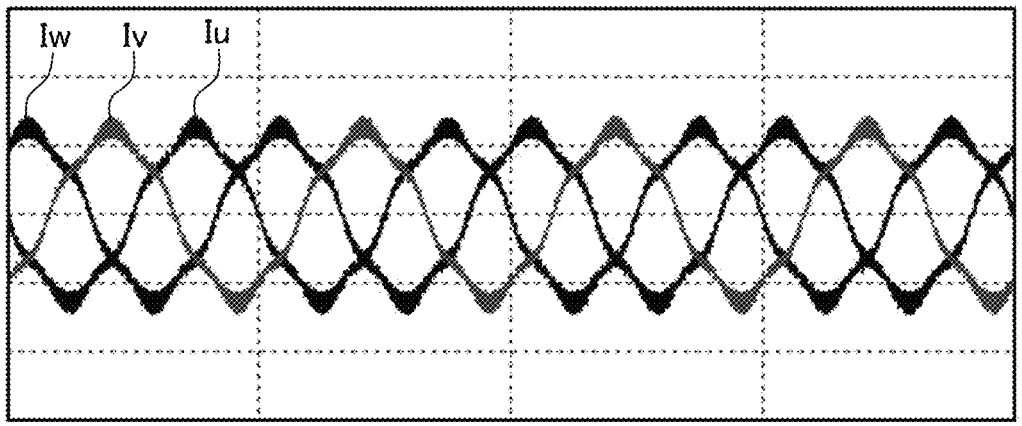
FIGS. 40A and 40B are graphs schematically illustrating an advantageous benefit achieved by the third modification.
Figure 40B:
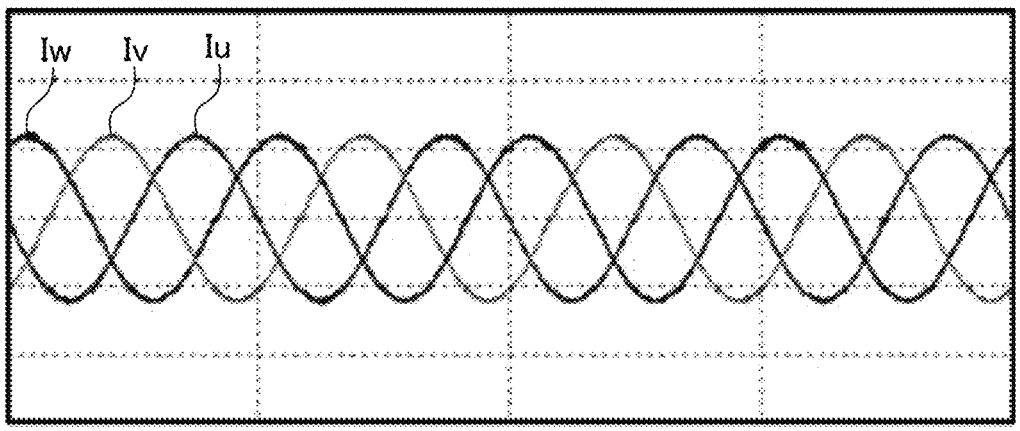

Calculating the corrected U-phase output voltage $VC_{out\_u}$, the corrected V-phase output voltage $VC_{out\_v}$, and the corrected W-phase output voltage $VC_{out\_w}$ based on the BMF voltage reduces an adverse effect due to the BMF voltage from each phase current of the motor 4, enabling each phase current Iu, Iv, and Iw of the motor 4 to have an ideal sinusoidal waveform without harmonic current distortion (see FIGS. 40A and 40B).

The amplitude Vm of the BMF voltage becomes larger as the RPM of the motor 4 becomes higher. The closer the amplitude Vm of the corrected output voltage $VC_{out}$ to the input voltage Via, the smaller a voltage across the inductor L of each selected converter 5, resulting in difficulty of causing the inductor current $I_L$ to flow through the inductor L of each selected converter 5. This may make it difficult to control each selected converter 5.

Figure 41:
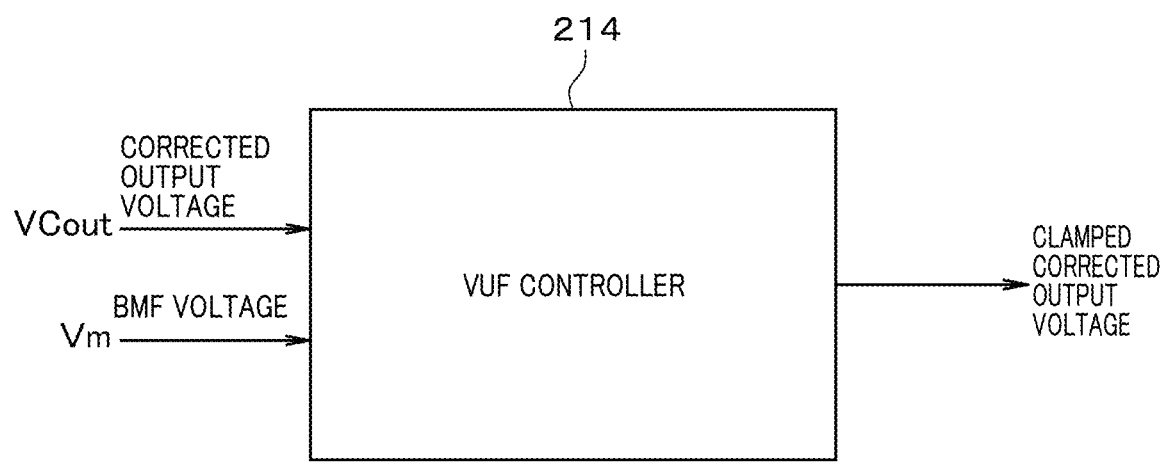
FIG. 41 is a block diagram schematically illustrating a voltage utilization factor controller according to a modification of the sixth embodiment.
Figure 42A:
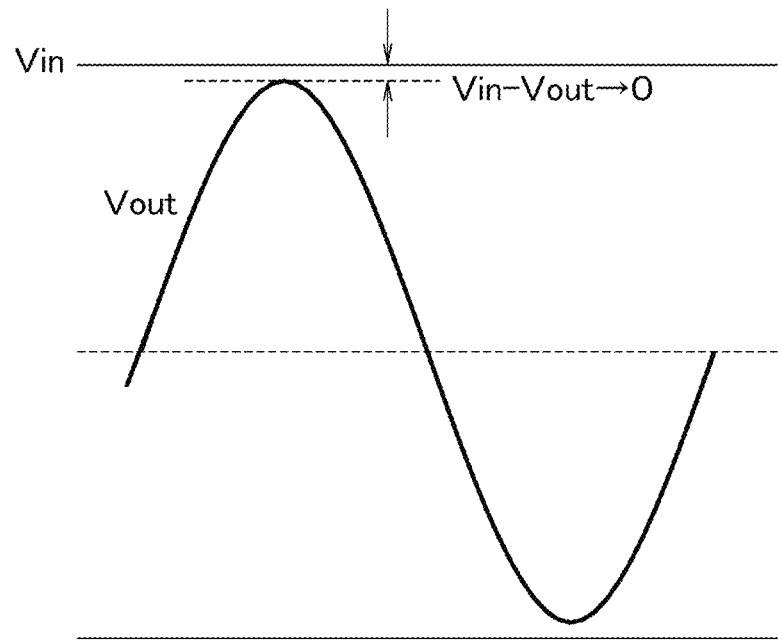
FIGS. 42A and 42B are graphs schematically illustrating an advantageous benefit achieved by this modification of the sixth embodiment.
Figure 42B:
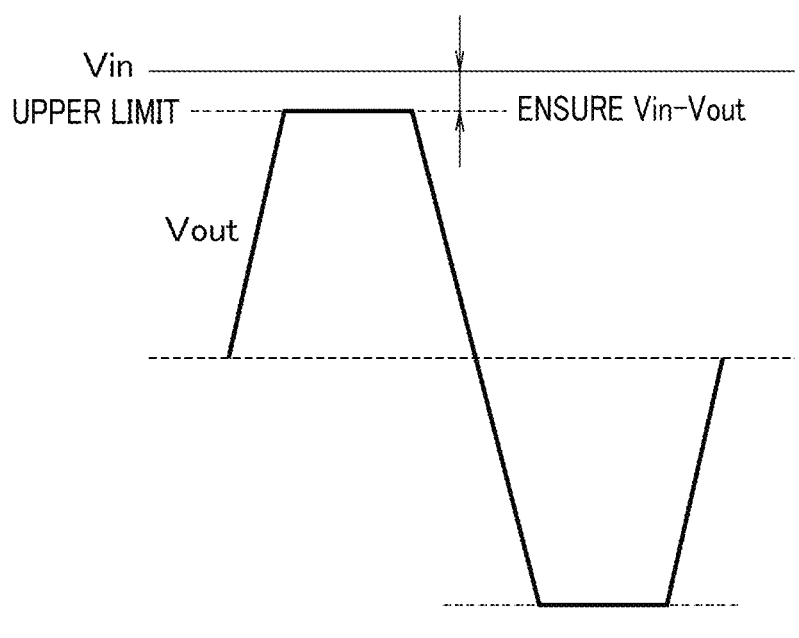
Figure 43:
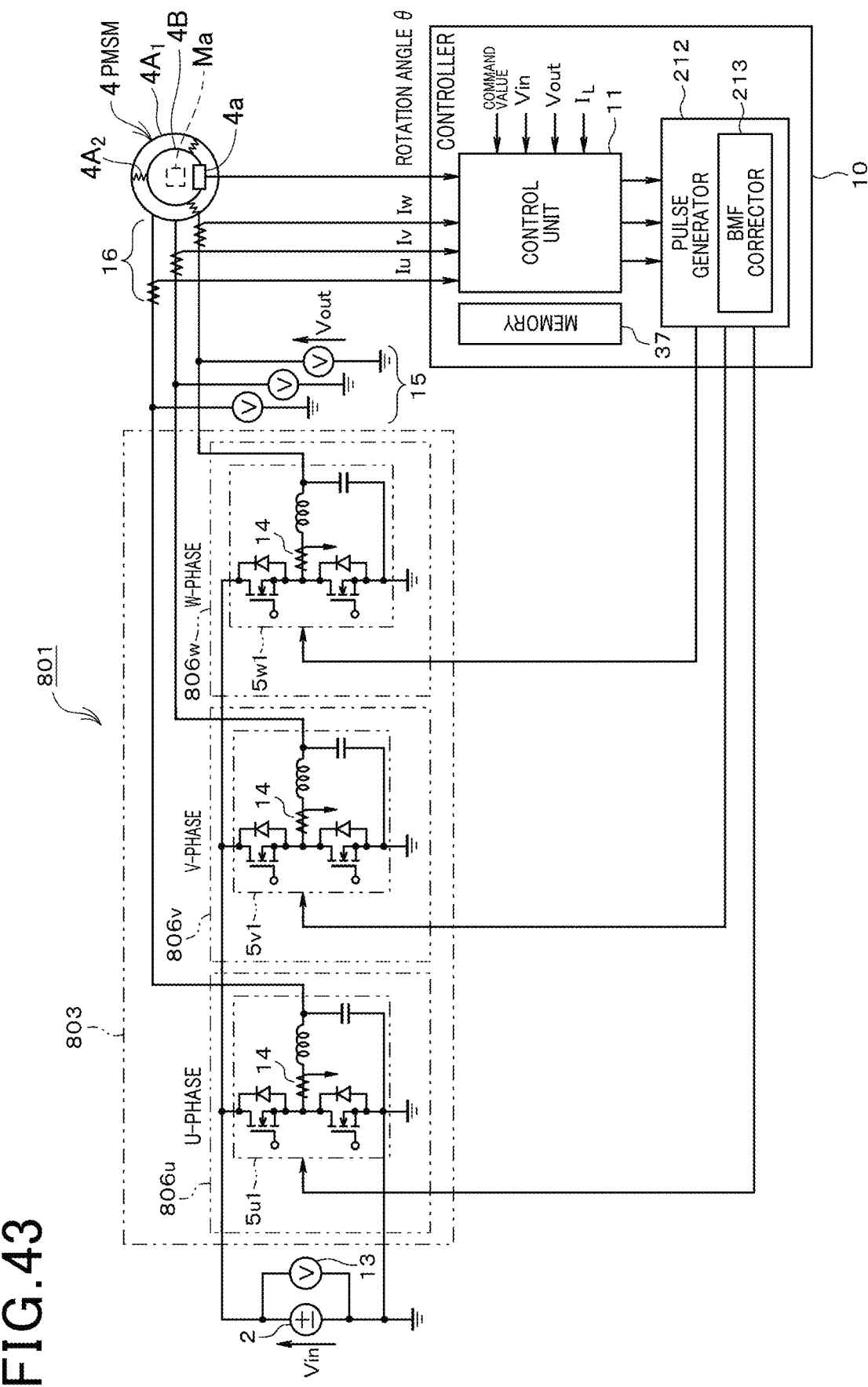
FIG. 43 is a circuit block diagram schematically illustrating an example of the overall configuration of a drive system according to the eighth embodiment of the present disclosure.
Figure 44:
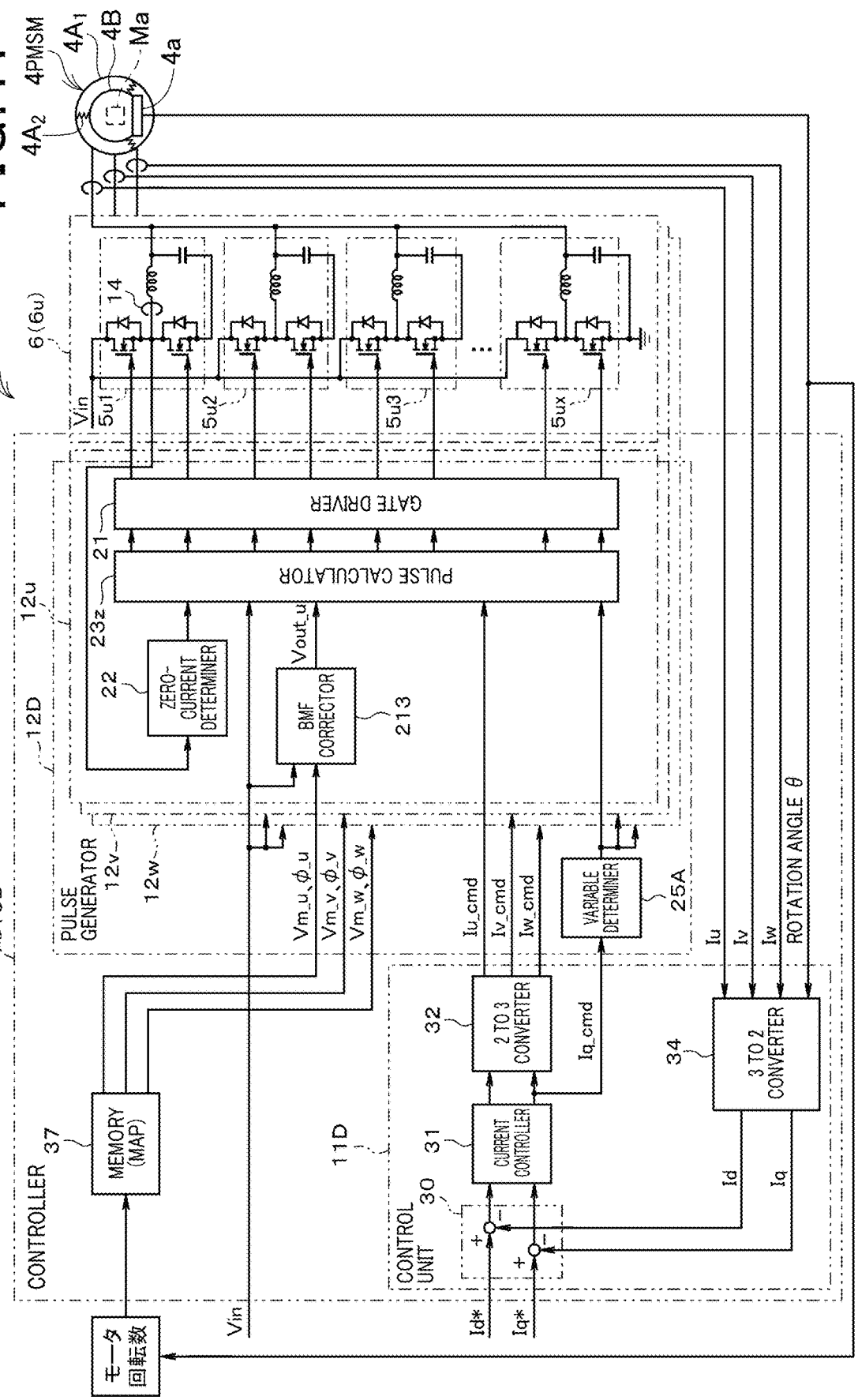
FIG. 44 is a circuit block diagram schematically illustrating an example of the overall configuration of a drive system according to the eighth embodiment of the present disclosure.

From this viewpoint, each of the U-, V-, and W-phase generation blocks 12u, 12v, and 12w includes a voltage utilization factor (VUF) controller 214 for improving the voltage utilization factor of the input voltage $V_{in}$ (see FIG. 41).

Specifically, the amplitude Vm of the BMF voltage and the corrected output voltage $VC_{out}$, which is obtained by the BMF corrector 213, are inputted to the VUF controller 214.

The VUF controller 214 is configured to determine whether the positive peak of the corrected output voltage $VC_{out}$ is higher than a predetermined upper limit, and whether the negative peak of the corrected output voltage $VC_{out}$ is lower than a predetermined lower limit; the upper limit is preferably set to a value slightly lower than the input voltage Via, and the lower limit is preferably set to a value slightly higher than zero as a reference potential of the input voltage $V_{in}$.

If the positive peak of the corrected output voltage $VC_{out}$ is higher than the predetermined upper limit, the VUF controller 214 is configured to clamp the positive peak of the corrected output voltage $VC_{out}$ at the upper limit, and output, to the pulse calculator 23, the corrected output voltage $VC_{out}$ whose positive peak is clamped at the upper limit.

In addition, if the negative peak of the corrected output voltage $VC_{out}$ is lower than the predetermined lower limit, the VUF controller 214 is configured to clamp the negative peak of the corrected output voltage $VC_{out}$ at the lower limit, and output, to the pulse calculator 23, the corrected output voltage $VC_{out}$ whose negative peak is clamped at the lower limit.

This enables the pulse calculator 23 to calculate the multiphase drive-pulse train every predetermined period T while each of the positive and negative peaks of the corrected output voltage $VC_{out}$ is clamped at the corresponding one of the upper limit, which is slightly lower than the input voltage $V_{in}$, and the lower limit, which is slightly higher than zero of the input voltage $V_{in}$.

This therefore maintains the voltage utilization factor of the input voltage $V_{in}$ at a sufficient level while
1. Ensuring a first sufficient level between the input voltage $V_{in}$ and the clamped upper limit of the corrected output voltage $VC_{out}$ and a second sufficient level between the reference value of zero of the input voltage $V_{in}$ and the clamped lower limit of the corrected output voltage $VC_{out}$ (see FIGS. 42A and 42B), thus reliably maintaining the flow of an inductor current $I_L$ through the inductor L
2. Enabling the motor 4 to be rotatably driven even if the amplitude $V_{in}$ of the BMF voltage has a relatively large value, making it possible to expand the operable range of the motor 4

Eighth Embodiment

The following describes a drive system 801 according to the eighth embodiment. The structure and/or functions of the drive system according to the eighth embodiment are mainly identical to those of the drive system 201 of the sixth embodiment except for the following points. The following therefore describes mainly the different points.

The drive system 201 according to the sixth embodiment includes the three-phase inverter 3 that includes (i) the multiphase converter 6u comprised of the parallelly-connected converters 5u1 to 5ux, (ii) the multiphase converter 6v comprised of the parallelly-connected converters 5v1 to 5vx, and (iii) the multiphase converter 6w comprised of the parallelly-connected converters 5w1 to 5wx.

For example, for the U-phase, the controller 10 of the drive system 201 is configured to
1. Select converters 5u1 to 5un to be multiply driven from the parallelly-connected converters 5u1 to 5ux
2. Generate a multiphase drive-pulse train for the selected converters 5u1 to 5un
3. Supply the multiphase drive-pulse train to the selected converters 5u1 to 5un to thereby multiply drive the selected converters 5u1 to 5un The configuration for the U-phase is identical to that for each of the V-phase and W-phase.

In contrast, the drive system 801 according to the eighth embodiment is a modification of the drive system 201 in which the parameter x is set to 1.

Specifically, the drive system 801 includes a three-phase inverter 803 that includes (i) a U-phase converter 806u comprised of a converter 5u1, (ii) a V-phase converter 806v comprised of a converter 5v1, and (iii) a W-phase converter 806w comprised of a converter 5w1.

For example, for the U-phase, the controller 10 of the drive system 801 is configured to
1. Generate a drive pulse for each of the U-, V-, and W-phase
2. Supply the drive pulse to each of the converters 5u1, 5v1, and 5w1 to thereby drive each of the converters 5u1, 5v1, and 5w1

The eighth embodiment achieves the advantageous benefits that are the same as those achieved by the sixth embodiment.

Ninth Embodiment

The following describes a drive system 1D according to the ninth embodiment. The drive system 1D according to this ninth modification includes a controller 10D, which serves as a feedback control system of the drive system 1D according to this ninth embodiment.

The controller 10D according to the ninth embodiment has a configuration that is identical to the configuration of the controller 10A, which includes the variable determiner 25A, illustrated in FIG. 16, the configuration of the controller 10B, which includes the pulse calculator 23Z, illustrated in FIG. 27, and the configuration of the controller 10C, which includes the BMF corrector 213, illustrated in FIG. 37. That is, the controller 10D according to the ninth embodiment is capable of implementing the above features of each of the controllers 10A, 10B, and 10C. In place of the variable determiner 25A, illustrated in FIG. 16, the variable determiner 25 illustrated in, for example, FIG. 1 can be used. In place of the pulse calculator 23Z, the pulse calculator 23 illustrated in, for example, FIG. 1 or the pulse calculator 230 illustrated in FIG. 28A, can be used.

Other Modifications

The present disclosure is not limited to the above embodiments and their modifications, and is applicable to variations of each of the embodiments and their modifications within the scope thereof. For example, the present disclosure can be modified as follows.

Each embodiment discloses the corresponding inverter, which is an example of a power conversion apparatus, comprised of at least one buck converter, but the present disclosure is not limited thereto. Specifically, the present disclosure can include various power conversion apparatuses, each of which is comprised of at least one boost converter or a buck-boost converter. At least one converter included in each of various power conversion apparatuses according to the present disclosure can be designed as an isolated converter or a non-isolated converter. The voltage sensors 15 are not essential components for each embodiment, and can be provided in at least one of the embodiments as needed.

The controller disclosed in each embodiment is configured to set the multiply-driven number n to 2 or 4, but can set the multiply-driven number n to another value, such as 3 or 5 or more.

Each embodiment uses an N-channel power MOSFET as each of the switches SW1 and SW2, but can use another type of power switch as each of the switches SW1 and SW2.

The upper-arm switch device is comprised of the upper-arm switch SW1 and the flyback diode D1 connected in antiparallel thereto for enabling a load current to flow therethrough upon the upper-arm switch SW1 being in the off state, but the present disclosure is not limited thereto. Specifically, the upper-arm switch device is a power MOSFET comprised of (i) a switch section serving as the upper-arm switch SW1 and (ii) an intrinsic diode serving as the flyback diode D1.

Similarly, the lower-arm switch device is comprised of the lower-arm switch SW2 and the flyback diode D2 connected in antiparallel thereto for enabling a load current to flow therethrough upon the lower-arm switch SW2 being in the off state, but the present disclosure is not limited thereto. Specifically, the lower-arm switch device is a power MOSFET comprised of (i) a power switch section serving as the lower-arm switch SW2 and (ii) an intrinsic diode serving as the flyback diode D2.

Each of the upper- and lower-arm switch devices can be a reverse condition switch, such as a reverse conduction IGBT, comprised of a power switch section and a flyback diode connected in antiparallel thereto.

The zero-current determiner 22 of the controller 10 of, for example, the first embodiment can be configured to measure the inductor current $I_L$ flowing in each of the selected second to the nth converters 5u2 to 5un for the U-phase, and the gate driver 21 of the controller 10 can be configured to perform on-off operation of the switch SW1 or SW2 of each of the selected second to the nth converters 5u2 to 5un for the U-phase after the inductor current $I_L$ flowing in the corresponding one of the selected second to the nth converters 5u2 to 5un becomes zero. This switching control procedure for the U-phase can be applied to a switching control procedure for each of the V- and W-phases.

As the actual on-duration of each of the switches SW1 and SW2, the on-duration $T_{on}$ calculated by the expression (1-1), the expression (2-1), or the expression (3-1) is preferably used.

The control unit 11 and the pulse generators 12, 112, 212 can be implemented by one or more hardware circuits each comprised of logic circuits or implemented by one or more processors programmed to carry out the functions of the control unit 11 and the pulse generators 12, 112, 212.

The controllers 10, 10A, 10B, 10C, and 10D and methods performed by each of the controllers 10, 10A, 10B, 10C, and 10D described in the present disclosure can be implemented by a dedicated computer including a memory and a processor programmed to perform one or more functions embodied by one or more computer programs.

The controllers 10, 10A, 10B, 10C, and 10D and methods performed by each of the controllers 10, 10A, 10B, 10C, and 10D described in the present disclosure can also be implemented by a dedicated computer including a processor comprised of one or more dedicated hardware logic circuits.

The controllers 10, 10A, 10B, 10C, and 10D and methods performed by each of the controllers 10, 10A, 10B, 10C, and 10D described in the present disclosure can further be implemented by at least one dedicated computer comprised of a memory, a processor programmed to perform one or more functions embodied by one or more computer programs, and one or more hardware logic circuits.

The programs described in the present disclosure can be stored in a computer-readable non-transitory storage medium as instructions executable by a computer and/or a processor.

While illustrative embodiments of the present disclosure have been described herein, the present disclosure is not limited to the embodiments described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A power conversion apparatus comprising:
    first to xth converters connected in parallel to each other, x being an integer more than or equal to 2;
    a control unit configured to output, based on command information related to an output of the power conversion apparatus, control information; and
    a pulse generator configured to:
        select, based on the control information, a number n of converters from the first to xth converters, n being an integer more than or equal to 2 and smaller than or equal to x, the number n being defined as a multiply-driven number n; and
        generate, based on the control information, at least one multiple drive-pulse train that comprises n drive pulses for multiply driving the n selected converters; and
    a variable determiner configured to variably determine the multiply-driven number n,
    wherein:
    the at least one multiple drive-pulse train comprises a plurality of multiple drive-pulse trains;
    the pulse generator comprises:
        a zero-current determiner configured to determine whether a current outputted from at least one of the n selected converters becomes zero;
        a pulse calculator configured to:
            calculate, based on the control information, values of parameters for each of the multiple drive-pulse trains, the parameters including: (i) an on-duration of each of the n selected converters, (ii) a period representing time between each adjacent pair of the multiple drive-pulse trains, and (iii) a phase difference between each adjacent pair of the drive pulses included in each of the multiple drive-pulse trains; and
            generate, based on the values of the respective parameters, the multiple drive-pulse trains; and
        a driver configured to multiply drive the n selected converters for each of the multiple drive-pulse trains.

2. The power conversion apparatus according to claim 1, wherein:
    the command information includes a command current value;
    each of the first to xth converters is configured as a buck converter comprising:
        a pair of upper- and lower-arm switches connected to each other, a power supply voltage being inputted across the pair of upper- and lower-arm switches;
        an inductor connected to a connection point between the upper- and lower-arm switches; and
        a capacitor connected to the inductor;
    the driver is configured to drive the upper-arm switch of each of the n selected converters if the command current value is positive;
    if the command current value is positive, the pulse calculator is configured to calculate, based on the control information, an on-duration of the upper-arm switch of each of the n selected converters, an off-duration of the upper-arm switch of each of the n selected converters, the value of the period, and the value of the phase difference in accordance with the following expressions (1-1) to (1-4):

$$T_{on1} = 2 \cdot I \times \frac{L}{V_{in} - V_{out}} \quad (1\text{-}1)$$

$$= I_{LP} \times \frac{L}{V_{in} - V_{out}}$$

$$T_{off1} = 2 \cdot I \times \frac{L}{V_{out}} \quad (1\text{-}2)$$

$$= I_{LP} \times \frac{L}{V_{out}}$$

$$T = T_{on1} + T_{off1} \quad (1\text{-}3)$$

$$T_d = \frac{T}{n} \quad (1\text{-}4)$$

where:
$T_{on1}$ represents the on-duration of the upper-arm switch of each of the n selected converters;
$T_{off1}$ represents the off-duration of the upper-arm switch of each of the n selected converters;
$V_{in}$ represents the power supply voltage;
$V_{out}$ represents an output voltage from the power conversion apparatus;
I represents an absolute average current between the n selected converters; and
L represents an inductance of the inductor;
the driver is configured to drive the lower-arm switch of each of the n selected converters if the command current value is negative; and
if the command current value is negative, the pulse calculator is configured to calculate, based on the control information, an on-duration of the lower-arm switch of each of the n selected converters, an off-duration of the lower-arm switch of each of the n selected converters, the value of the period, and the value of the phase difference in accordance with the following expressions (2-1) to (2-4):

$$T_{on2} = 2 \cdot I \times \frac{L}{V_{out}} \quad (2\text{-}1)$$

$$= I_{LP} \times \frac{L}{V_{out}}$$

$$T_{off1} = 2 \cdot I \times \frac{L}{V_{in} - V_{out}} \quad (2\text{-}2)$$

$$= I_{LP} \times \frac{L}{V_{in} - V_{out}}$$

$$T = T_{on2} + T_{off2} \quad (2\text{-}3)$$

-continued $$T_d = \frac{T}{n} \qquad (2\text{-}4)$$

where:

$T_{on2}$ represents the on-duration of the lower-arm switch of each of the n selected converters; and $T_{off2}$ represents the off-duration of the lower-arm switch of each of the n selected converters.

3. The power conversion apparatus according to claim 1, wherein:

the variable determiner is configured to change the multiply-driven number n in accordance with change of the command information.

4. The power conversion apparatus according to claim 1, wherein each of the first to xth converters is configured as a buck converter, a boost converter, or a buck-boost converter.

5. The power conversion apparatus according to claim 1, wherein each of the first to xth converters is configured as a non-isolated or an isolated converter.

6. A power conversion apparatus comprising:

first to xth converters connected in parallel to each other, x being an integer more than or equal to 2;

a control unit configured to output, based on command information related to an output of the power conversion apparatus, control information; and a pulse generator configured to:

select, based on the control information, a number n of converters from the first to xth converters, n being an integer more than or equal to 2 and smaller than or equal to x, the number n being defined as a multiply-driven number n; and generate, based on the control information, at least one multiple drive-pulse train that comprises n drive pulses for multiply driving the n selected converters;

a variable determiner configured to variably determine the multiply-driven number n, wherein the variable determiner is configured to change the multiply-driven number n in accordance with change of the command information, and the variable determiner is configured to change, based on change of the command information, the multiply-driven number n to an updated value $n \times 2^s$ or $n \times (\frac{1}{2}^s)$ where s is an integer more than or equal to 1.

7. A power conversion apparatus comprising:

first to xth converters connected in parallel to each other, x being an integer more than or equal to 2;

a control unit configured to output, based on command information related to an output of the power conversion apparatus, control information; and a pulse generator configured to:

select, based on the control information, a number n of converters from the first to xth converters, n being an integer more than or equal to 2 and smaller than or equal to x, the number n being defined as a multiply-driven number n; and generate, based on the control information, at least one multiple drive-pulse train that comprises n drive pulses for multiply driving the n selected converters; and a variable determiner configured to variably determine the multiply-driven number n, wherein the at least one multiple drive-pulse train comprises a plurality of multiple drive-pulse trains; and if the multiply-driven number n for a present multiple drive-pulse train in the plurality of multiple drive-pulse trains is changed to an updated value for a next multiple drive-pulse train in the plurality of multiple drive-pulse trains, the pulse generator is configured to generate interpolation pulses that smoothly interpolate between the present multiple drive-pulse train and the next multiple drive-pulse train.

\* \* \* \* \*